(12) United States Patent
Morishita

(10) Patent No.: US 10,798,250 B2
(45) Date of Patent: Oct. 6, 2020

(54) MANAGEMENT SERVER, COMMUNICATION SYSTEM, NOTIFICATION METHOD AND PROGRAM

(71) Applicant: NEC Corporation, Minato-ku, Tokyo (JP)

(72) Inventor: Shota Morishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 16/098,163

(22) PCT Filed: Mar. 10, 2017

(86) PCT No.: PCT/JP2017/009827
§ 371 (c)(1),
(2) Date: Nov. 1, 2018

(87) PCT Pub. No.: WO2017/199555
PCT Pub. Date: Nov. 23, 2017

(65) Prior Publication Data
US 2019/0149665 A1  May 16, 2019

(30) Foreign Application Priority Data

May 16, 2016 (JP) .................................. 2016-097709
Aug. 25, 2016 (JP) .................................. 2016-164667

(51) Int. Cl.
*H04N 15/00* (2006.01)
*H04M 3/58* (2006.01)
(Continued)

(52) U.S. Cl.
CPC ............. *H04M 15/47* (2013.01); *H04M 3/58* (2013.01); *H04M 15/00* (2013.01); *H04M 15/70* (2013.01);
(Continued)

(58) Field of Classification Search
CPC .................. H04M 15/47; H04M 3/58; H04M 2203/6027; H04M 2215/0148; H04M 15/00
(Continued)

(56) References Cited

U.S. PATENT DOCUMENTS

| | | | |
|---|---|---|---|
| 6,178,233 B1 * | 1/2001 | Yariv | ...................... H04L 51/24 379/106.01 |
| 9,088,648 B2 * | 7/2015 | Marics | ............... H04M 3/42153 |
| 2006/0217106 A1 * | 9/2006 | Davidson | ................ H04W 4/24 455/405 |

FOREIGN PATENT DOCUMENTS

| | | |
|---|---|---|
| CN | 104602242 A | 5/2015 |
| JP | 2003-289375 A | 10/2003 |

(Continued)

OTHER PUBLICATIONS

International Search Report for PCT Application No. PCT/JP2017/009827, dated May 30, 2017.
(Continued)

*Primary Examiner* — Thjuan K Addy

(57) ABSTRACT

Included are an outgoing call detection unit configured to detect an outgoing call from a first communication terminal to a second communication terminal, a connection control unit configured to cause the outgoing call detected by the outgoing call detection unit to arrive at the second communication terminal, a call duration measurement unit configured to measure a time from when a phone call is started, which is a duration of the phone call, between the first communication terminal and the second communication terminal, and a notification unit configured to transmit, when the duration measured by the call duration measurement unit exceeds a predetermined duration before the phone call ends, a predetermined notification to a third communication terminal.

20 Claims, 36 Drawing Sheets

(51) Int. Cl.
*H04M 3/22* (2006.01)
*H04M 15/00* (2006.01)

(52) U.S. Cl.
CPC ....... *H04M 15/73* (2013.01); *H04M 15/8033* (2013.01); *H04M 15/83* (2013.01); *H04M 15/8353* (2013.01); *H04M 15/84* (2013.01); *H04M 15/85* (2013.01); *H04M 15/852* (2013.01); *H04M 15/853* (2013.01); *H04M 15/886* (2013.01); *H04M 2203/6027* (2013.01); *H04M 2215/0148* (2013.01)

(58) Field of Classification Search
USPC .......................... 379/189, 188, 192, 200, 190
See application file for complete search history.

(56) References Cited

FOREIGN PATENT DOCUMENTS

| | | |
|---|---|---|
| JP | 2006-129252 A | 5/2006 |
| JP | 2007-096962 A | 4/2007 |
| JP | 2008-192096 A | 8/2008 |
| JP | 2008-236328 A | 10/2008 |
| JP | 2010-273071 A | 12/2010 |
| JP | 2011-035499 A | 2/2011 |
| JP | 2011-135328 A | 7/2011 |
| JP | 2012-134647 A | 7/2012 |
| JP | 2013-005205 A | 1/2013 |
| JP | 2014-135607 A | 7/2014 |

OTHER PUBLICATIONS

Japanese Office Action for JP Application No. 2018-518120 dated Jul. 30, 2019 with English Translation.

* cited by examiner

| INCOMING PHONE NUMBER | NOTIFICATION DESTINATION E-MAIL ADDRESS |
|---|---|
| 03-○○○○-△△△△ | aaa@bbb.ne.jp |
| 04-□□□□-×××× | ccc@ddd.ne.jp |
| ⋮ | ⋮ |

Fig. 5

CELLULAR PHONE LOCATION INFORMATION

DATE AND TIME:       01/20/2017 15:34
NUMBER CONTACTED:    050-xxxx-yyyy
LOCATION INFORMATION: x-x-xx AOBADAI, MEGURO-KU, TOKYO

Fig. 7

| INCOMING PHONE NUMBER | NOTIFICATION DESTINATION PHONE NUMBER |
|---|---|
| 03-○○○○-△△△△ | 03-△△△△-○○○○ |
| 04-□□□□-×××× | 04-××××-□□□□ |
| ⋮ | ⋮ |

Fig. 12

| INCOMING PHONE NUMBER | TIME | NOTIFICATION DESTINATION PHONE NUMBER |
|---|---|---|
| 03-○○○○-△△△△ | 7:00～19:00 | 03-△△△△-○○○○ |
|  | 19:00～7:00 | 03-××××-□□□□ |
| ⋮ | ⋮ | ⋮ |

Fig. 21

| CLOUD PHONE BOOK 804 | SPAM PHONE DB 704 | COMMUNICATION TERMINAL 404-2 | OPERATION OF COMMUNICATION TERMINAL 404-2 | COMMUNICATION TERMINAL 404-3 |
|---|---|---|---|---|
| REGISTERED | — | NO DISPLAY | — | NO NOTIFICATION |
| NOT REGISTERED | NOT REGISTERED | DISPLAY POP-UP | NOT ANSWERED | NO NOTIFICATION |
| | | | ANSWERED | NOTIFICATION TRANSMITTED |
| | REGISTERED | DISPLAY POP-UP | NOT ANSWERED | NOTIFICATION TRANSMITTED |
| | | | ANSWERED | NOTIFICATION TRANSMITTED |

Fig. 22

| OUTGOING PHONE NUMBER | NOTIFICATION DESTINATION PHONE NUMBER |
|---|---|
| 03-○○○○-△△△△ | 03-△△△△-○○○○ |
| 04-□□□□-×××× | 04-××××-□□□□ |
| ⋮ | ⋮ |

Fig. 25

| OUTGOING PHONE NUMBER | NOTIFICATION DESTINATION E-MAIL ADDRESS |
|---|---|
| 03-○○○○-△△△△ | aaa@bbb.ne.jp |
| 04-□□□□-×××× | ccc@ddd.ne.jp |
| ⋮ | ⋮ |

Fig. 26

CELLULAR PHONE LOCATION INFORMATION

DATE AND TIME:        01/20/2017 15:34
NUMBER CONTACTED:     050-xxxx-yyyy
LOCATION INFORMATION: x-x-xx AOBADAI, MEGURO-KU, TOKYO

Fig. 28

| OUTGOING PHONE NUMBER | TIME | NOTIFICATION DESTINATION PHONE NUMBER |
|---|---|---|
| 03-○○○○-△△△△ | 7:00~19:00 | 03-△△△△-○○○○ |
| | 19:00~7:00 | 03-××××-□□□□ |
| ⋮ | ⋮ | ⋮ |

Fig. 37

MANAGEMENT SERVER, COMMUNICATION SYSTEM, NOTIFICATION METHOD AND PROGRAM

This application is a National Stage Entry of PCT/JP2017/009827 filed on Mar. 10, 2017, which claims priority from Japanese Patent Application 2016-097709 filed on May 16, 2016 and Japanese Patent Application 2016-164667 filed on Aug. 25, 2016, the contents of all of which are incorporated herein by reference, in their entirety.

TECHNICAL FIELD

The present invention relates to a management server, a communication system, a notification method, and a program.

BACKGROUND ART

Recently, a fraud in which a person is cheated out of his/her cash using a phone as represented by the so-called "phone de fraud" (hereinafter referred to as a phone fraud) has become widespread. Various countermeasures have been considered to reduce the damage from this phone fraud. One of the countermeasures is a technique of recognizing and analyzing voices during a phone call, and when there is a keyword included in a conversion of the phone call, alerting or informing a notification destination is known (e.g., see Patent Literature 1 and 2). A technique of registering outgoing spam phone numbers in a database, and when incoming call information while a subscriber is outside a coverage area has a record of an outgoing call from one of the spam phone numbers registered in the database, notifying the subscriber of the outgoing call when the subscriber returns to the coverage area is known (see, for example, Patent Literature 3).

CITATION LIST

Patent Literature

Patent Literature 1: Japanese Unexamined Patent Application Publication No. 2011-135328
Patent Literature 2: Japanese Unexamined Patent Application Publication No. 2007-096962
Patent Literature 3: Japanese Unexamined Patent Application Publication No. 2006-129252

SUMMARY OF INVENTION

Technical Problem

In the techniques described in Patent literature 1 and 2, a voice recognition function for recognizing and analyzing voices during a phone call needs to be included. However, a considerable processing capacity is necessary to achieve this voice recognition function, which poses a problem of applying a large load on a system to perform the processing. The technique described in Patent Literature 3 also has a problem that special means for determining whether a phone call is a spam phone call needs to be provided.

An object of the present invention is to provide a management server, a communication system, a notification method, and a program that solve the above-described problems.

Solution to Problem

A management server according to the present invention includes: an outgoing call detection unit configured to detect an outgoing call from a first communication terminal to a second communication terminal; a connection control unit configured to cause the outgoing call detected by the outgoing call detection unit to arrive at the second communication terminal; a call duration measurement unit configured to measure a time from when a phone call is started, which is a duration of the phone call, between the first communication terminal and the second communication terminal; and a notification unit configured to transmit, when the duration measured by the call duration measurement unit exceeds a predetermined duration before the phone call ends, a predetermined notification to a third communication terminal.

A communication system according to the present invention includes:
a plurality of communication terminals; and
a management server comprising:
an outgoing call detection unit configured to detect an outgoing call from a first communication terminal to a second communication terminal among the plurality of communication terminals;
a connection control unit configured to cause the outgoing call detected by the outgoing call detection unit to arrive at the second communication terminal;
a call duration measurement unit configured to measure a time from when a phone call is started, which is a duration of the phone call, between the first communication terminal and the second communication terminal; and
a notification unit configured to transmit, when the duration measured by the call duration measurement unit exceeds a predetermined duration before the phone call ends, a predetermined notification to a third communication terminal.

A notification method according to the present invention includes:
a process of detecting an outgoing call from a first communication terminal to a second communication terminal;
a process of causing the detected outgoing call to arrive at the second communication terminal;
a process of measuring a time from when a phone call is started, which is a duration of the phone call, between the first communication terminal and the second communication terminal; and
a process of transmitting, when the measured duration exceeds a predetermined duration before the phone call ends, a predetermined notification to a third communication terminal.

A program according to the present invention is a program for causing a computer to execute:
a procedure of detecting an outgoing call from a first communication terminal to a second communication terminal;
a procedure of causing the detected outgoing call to arrive at the second communication terminal;
a procedure of measuring a time from when a phone call is started, which is a duration of the phone call, between the first communication terminal and the second communication terminal; and
a procedure of transmitting, when the measured duration exceeds a predetermined duration before the phone call ends, a predetermined notification to a third communication terminal.

Advantageous Effects of Invention

As described above, the present invention can attempt to prevent a load of processing from increasing and a damage from a phone fraud from expanding.

BRIEF DESCRIPTION OF DRAWINGS

FIG. 5 is a view showing an example of associations stored in an association storage unit shown in FIG. 4;

FIG. 7 is a view showing a first display form of location information displayed by a communication terminal shown in FIG. 3;

FIG. 12 is a view showing an example of associations stored in an association storage unit shown in FIG. 11;

FIG. 21 is a view showing an example of an association between an incoming phone number and a notification destination phone number;

FIG. 22 is a view showing an example of processing of notification from the management server according to a registration status of an originating phone number;

FIG. 25 is a view showing an example of associations between originating phone numbers and notification destination phone numbers stored in the association storage unit shown in FIG. 24;

FIG. 26 is a view showing an example of associations between originating phone numbers and notification destination e-mail addresses stored in the association storage unit shown in FIG. 24;

FIG. 28 is a view showing a first display form of location information displayed by a communication terminal shown in FIG. 23;

FIG. 37 is a view showing an example of an association between an originating phone number and a notification destination phone number.

DESCRIPTION OF EMBODIMENTS

Hereinafter, embodiments of the present invention will be described with reference to the drawings.

First Embodiment

Figure 1:
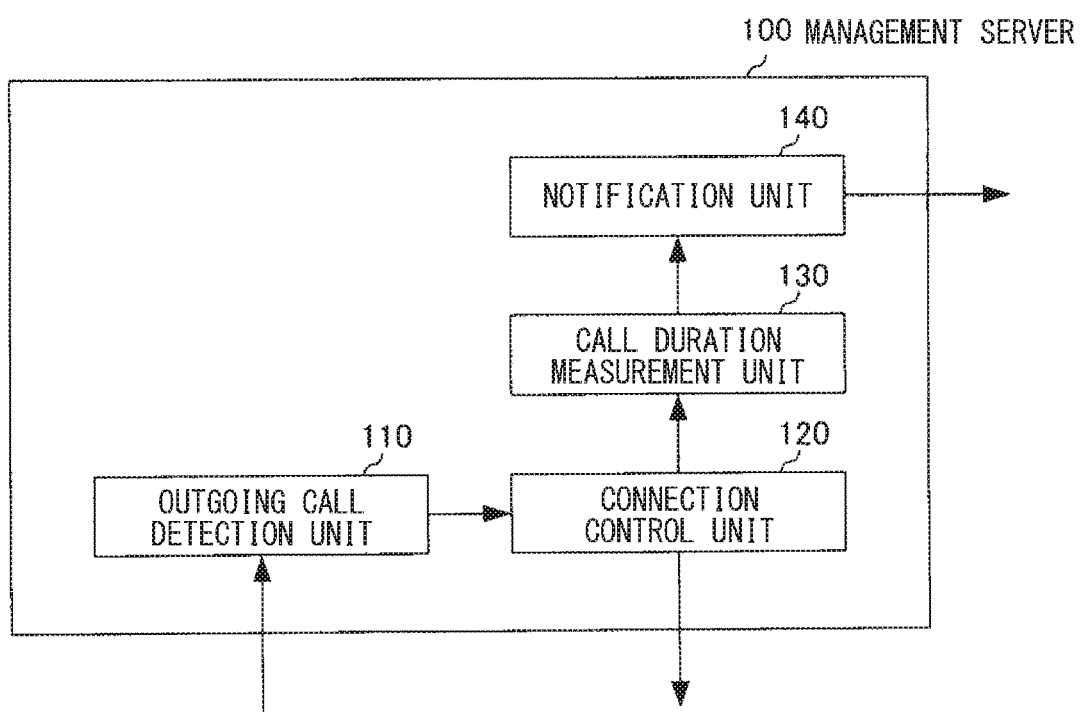
FIG. 1 is a view showing a management server according to a first embodiment of the present invention.

FIG. 1 is a view showing a management server according to a first embodiment of the present invention.

As shown in FIG. 1, a management server 100 according to this embodiment includes an outgoing call detection unit 110, a connection control unit 120, a call duration measurement unit 130, and a notification unit 140. Note that FIG. 1 shows an example of major components related to this embodiment among components of the management server 100 according to the present invention.

The outgoing call detection unit 110 detects an outgoing call from a communication terminal to another communication terminal.

The connection control unit 120 causes the outgoing call detected by the outgoing call detection unit 110 to arrive at the communication terminal that is a call destination.

The call duration measurement unit 130 measures a time from when a phone call is started, which is a duration of the phone call, between the originating communication terminal and the destination communication terminal.

When the duration measured by the call duration measurement unit 130 exceeds the duration set in advance before the phone call ends, the notification unit 140 transmits a predetermined notification to the other communication terminal.

Figure 2:
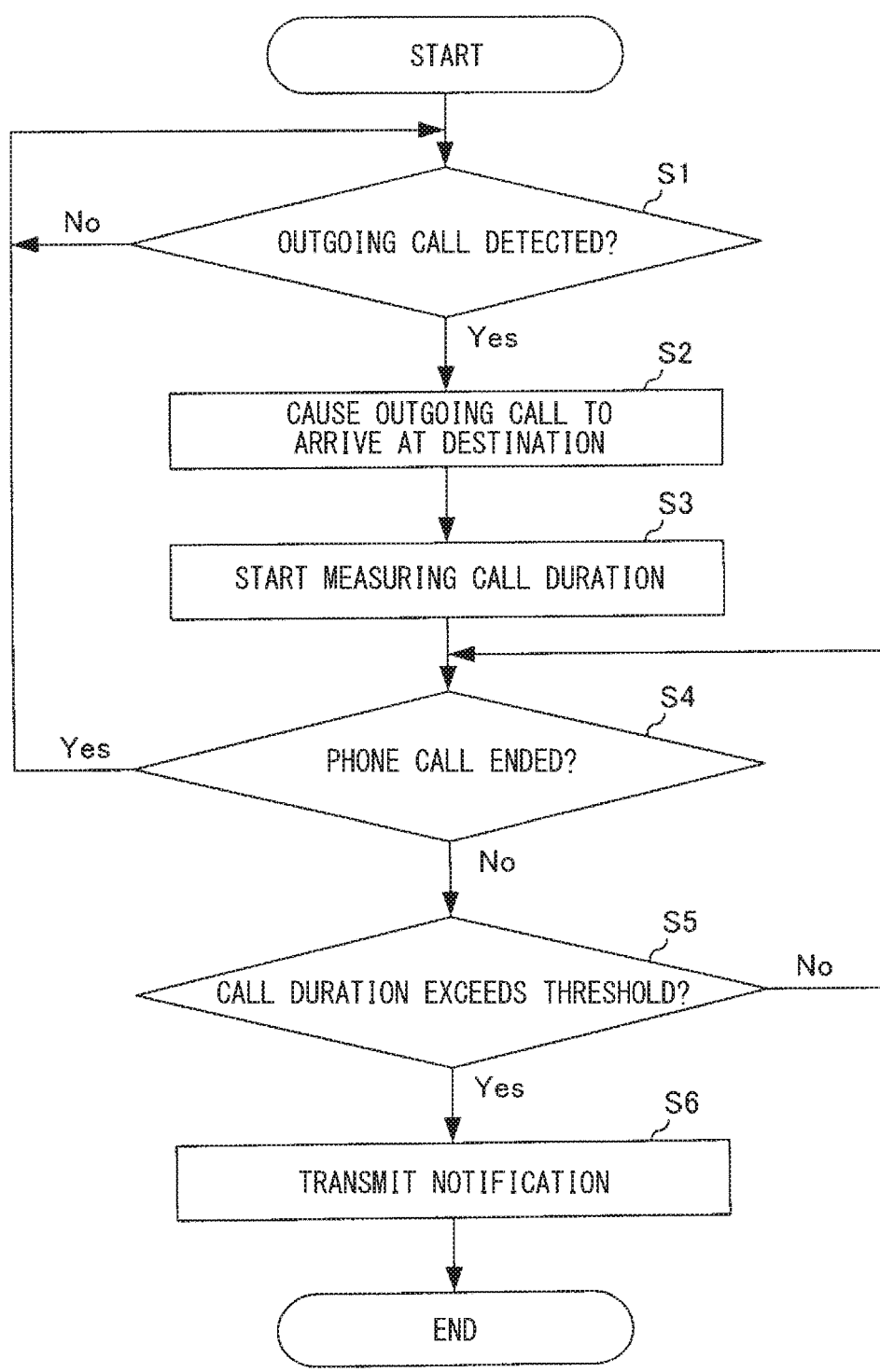
FIG. 2 is a flowchart for explaining an example of a notification method in the management server shown in FIG. 1.

Hereinafter, a notification method in the management server 100 shown in FIG. 1 will be described. FIG. 2 is a flowchart for explaining an example of the notification method in the management server 100 shown in FIG. 1.

First, when the outgoing call detection unit 110 detects an outgoing call from a certain communication terminal (hereinafter referred to as an originating communication terminal) to another communication terminal (hereinafter referred to as a destination communication terminal) (Step S1), the connection control unit 120 causes the outgoing call detected by the outgoing call detection unit 110 to arrive at the destination communication terminal (Step S2). Next, the call duration measurement unit 130 starts measuring the time from when the phone call is started, which is a duration of the phone call, between the originating communication terminal and the destination communication terminal (Step S3). After that, when the duration measured by the call duration measurement unit 130 exceeds a preset duration (Step S5) before the phone call is determined to have ended (Step S4), the notification unit 140 transmits the predetermined notification to the other communication terminal (Step S6).

In this way, the management server 100 transmits the notification to the other communication terminal when the duration of the phone call between the communication terminals exceeds the predetermined duration. This effectively prevents the processing load from increasing and the damage from the phone fraud from expanding.

Second Embodiment

Figure 3:
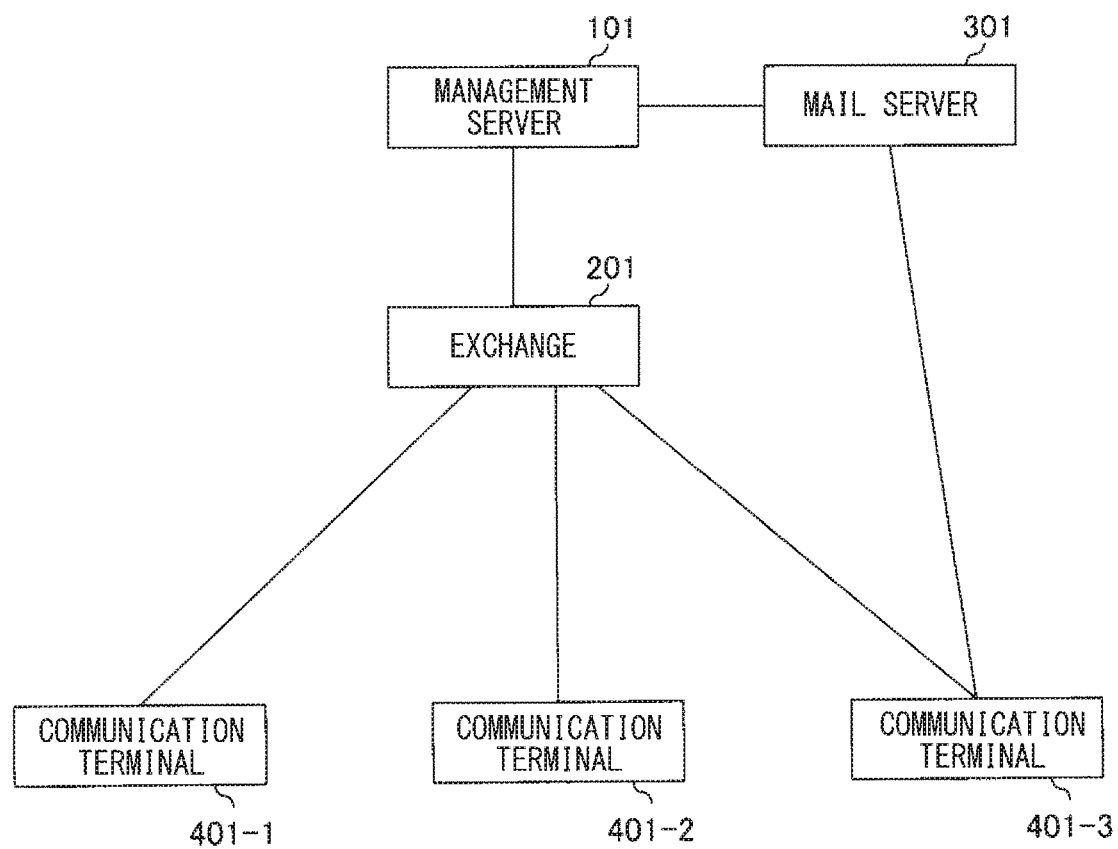
FIG. 3 is a view showing a management server according to a second embodiment of the present invention.

FIG. 3 is a view showing a management server according to a second embodiment of the present invention.

As shown in FIG. 3, a communication system in which a management server 101 according to this embodiment is provided includes the management server 101, an exchange 201, a mail server 301, and communication terminals 401-1 to 401-3. The management server 101 is connected to the exchange 201 and the mail server 301. The exchange 201 is connected to the communication terminals 401-1 to 401-3. The mail server 301 is connected to the communication terminal 401-3.

The communication terminals 401-1 to 401-3 are communication apparatuses capable of transmitting and receiving phone calls and e-mails. Further, the communication terminals 401-1 to 401-3 may be fixed apparatuses or movable portable apparatuses. FIG. 3 shows an example where there are three communication terminals. This configuration is employed for convenience of explanation, which will be given later. However, the number of the communication terminals is not limited to this number.

The exchange 201 is a phone exchange which performs general circuit exchange. The mail server 301 is a server apparatus used for general e-mail transmission/reception.

Figure 4:
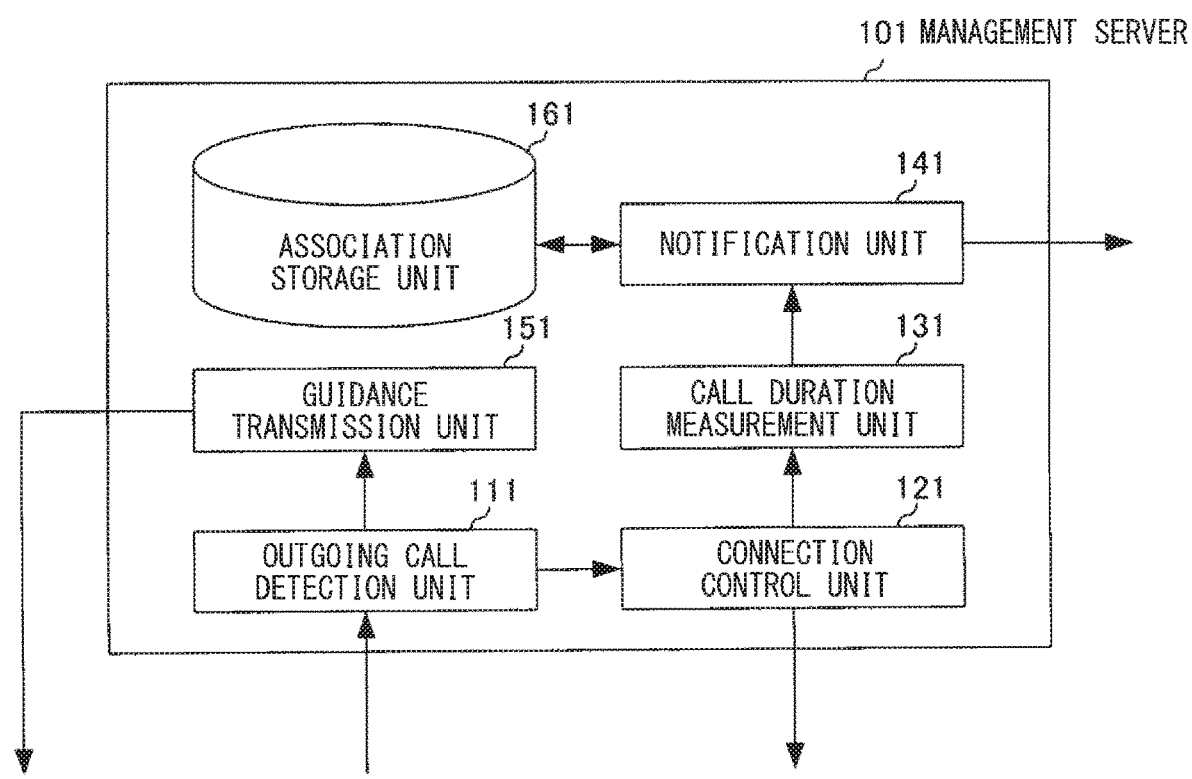
FIG. 4 is a view showing an example of an internal configuration of the management server shown in FIG. 3.

FIG. 4 is a view showing an example of an internal configuration of the management server 101 shown in FIG. 3. As shown in FIG. 4, the management server 101 shown in FIG. 3 includes an outgoing call detection unit 111, a connection control unit 121, a call duration measurement unit 131, a notification unit 141, a guidance transmission unit 151, and an association storage unit 161. Note that FIG. 4 shows an example of major components related to this embodiment among components of the management server 101 shown in FIG. 3.

The outgoing call detection unit 111 detects an outgoing call from the communication terminal 401-1 to the communication terminals 401-2 and 401-3 via the exchange 201. Further, the outgoing call detection unit 111 detects an outgoing call from the communication terminal 401-2 to the communication terminals 401-1 and 401-3 via the exchange 201. Furthermore, the outgoing call detection unit 111 detects an outgoing call from the communication terminal 401-3 to the communication terminals 401-1 and 401-2 via the exchange 201. In the following description, an example where the communication terminal 401-1 makes an outgoing call to the communication terminal 401-2 will be described.

When the outgoing call detection unit 111 detects an outgoing call from the communication terminal 401-1, the guidance transmission unit 151 transmits predetermined guidance to the communication terminal 401-1. This guidance is, for example, a message such as "there is a possibility to notify this call to a family/friend of the receiver". The connection control unit 121 causes an outgoing call from the communication terminal 401-1 detected by the outgoing call detection unit 111 to arrive at the communication terminal 401-2, which is a call destination, via the exchange 201. At this time, when the guidance transmission unit 151 transmits the guidance, the connection control unit 121 may cause the outgoing call to arrive at the communication terminal 401-2. The call duration measurement unit 131 measures a duration of a phone call when the phone call is started between the communication terminal 401-1 as a call originator and the communication terminal 401-2 as a call destination. The notification unit 141 transmits the predetermined notification to the communication terminal 401-3 when the duration measured by the call duration measurement unit 131 exceeds the preset duration before the phone call ends. At this time, when the duration measured by the call duration measurement unit 131 exceeds the preset duration before the phone call ends, the notification unit 141 transmits a notification to the communication terminal 401-3, which is stored in association with the communication terminal 401-2 in the association storage unit 161. When the notification unit 141 transmits the notification to the communication terminal 401-3, it reads out an e-mail address of the communication terminal 401-3 from the association storage unit 161, and instructs the mail server 301 to transmit an e-mail including a predetermined message to the e-mail address.

The association storage unit 161 stores in advance a phone number of the destination (receiver) communication terminal in association with an e-mail address of the communication terminal to which the notification unit 141 transmits the notification.

FIG. 5 is a view showing an example of the association stored in the association storage unit 161 shown in FIG. 4.

As shown in FIG. 5, the association storage unit 161 shown in FIG. 4 stores an incoming phone number and a notification destination e-mail address in association with each other. This association is registered in advance. When there is an outgoing call to the phone number registered as the incoming phone number, the notification destination e-mail address associated with this phone number is the e-mail address of the destination to which the notification unit 141 transmits the notification. For example, as shown in FIG. 5, an incoming phone number "03-○○○○-△△△△" is associated with a notification destination e-mail address "aaa@bbb.ne.jp". Using this association, when there is an outgoing call to the phone number of "03-○○○○-△△△△", the notification unit 141 transmits a predetermined e-mail to the e-mail address of "aaa@bbb.ne.jp". Further, the incoming phone number "04-□□□□-xxxx" is associated with the notification destination e-mail address "ccc@ddd.ne.jp". Using this association, when there is an outgoing call to the phone number "04-□□□□-xxxx", the notification unit 141 transmits a predetermined e-mail to the e-mail address of "ccc@ddd.ne.jp". The number of notification destination e-mail addresses associated with the incoming phone number is not necessarily one and may be plural. This association can be changed from the outside.

Figure 6:
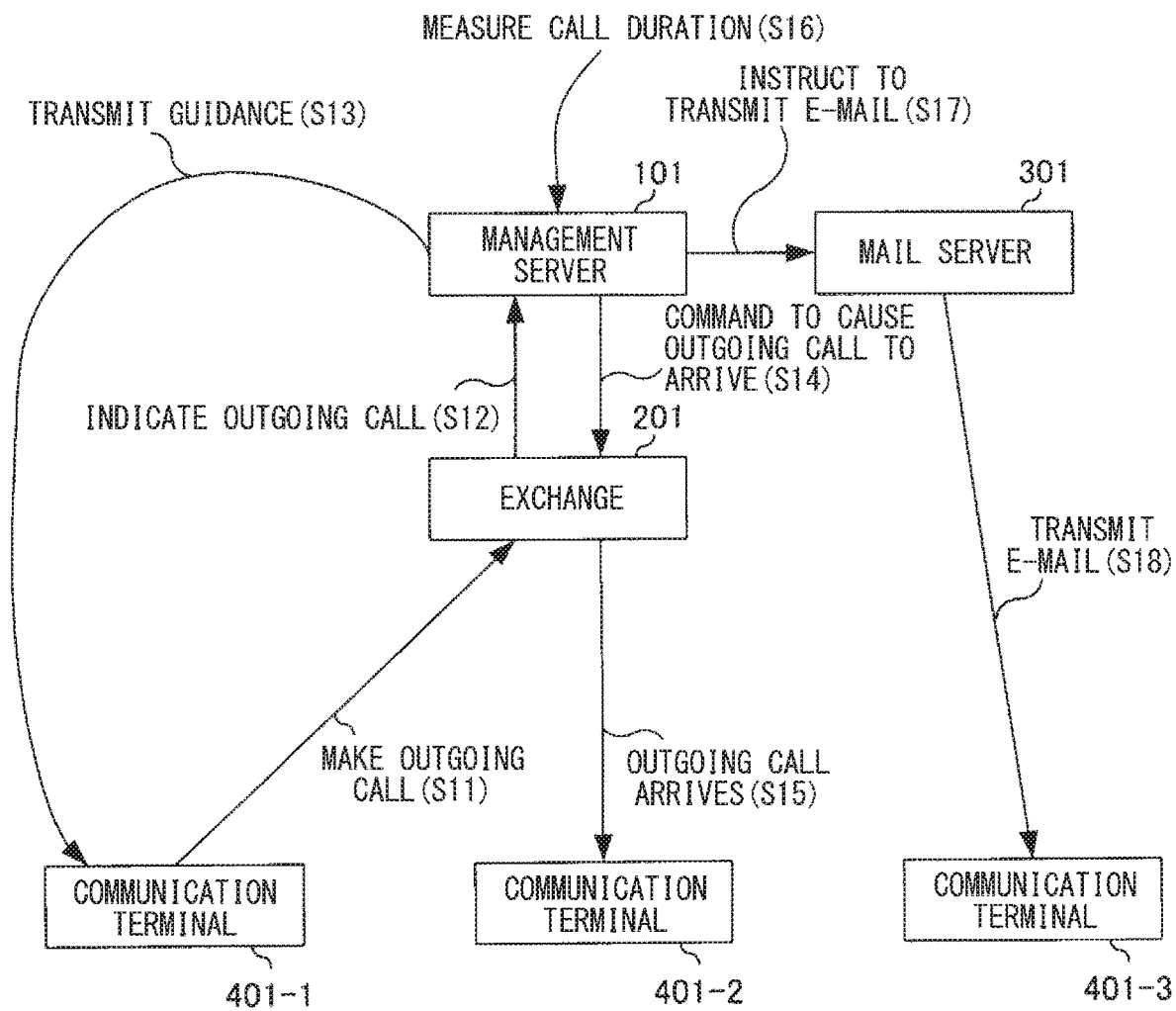
FIG. 6 is a view for explaining an example of a processing flow in a communication system shown in FIG. 3.

Hereinafter, the notification method in the communication system shown in FIG. 3 will be described. FIG. 6 is a view for explaining an example of a processing flow in the communication system shown in FIG. 3.

First, when the communication terminal 401-1 makes an outgoing call to the communication terminal 401-2 (Step S11), the exchange 201 lets the management server 101 know that the outgoing call has been made (Step S12). In the management server 101, when the outgoing call detection unit 111 detects the outgoing call from the communication terminal 401-1 to the communication terminal 401-2, the guidance transmission unit 151 transmits predetermined guidance to the communication terminal 401-1 (Step S13). Next, the connection control unit 121 transmits a command to the exchange 201 to cause the outgoing call detected by the outgoing call detection unit 111 to arrive at the communication terminal 401-2 (Step S14). Then, the exchange 201 causes the outgoing call from the communication terminal 401-1 to arrive at the communication terminal 401-2 (Step S15).

After that, when a phone call is started between the communication terminal 401-1 and the communication terminal 401-2, the call duration measurement unit 131 measures a duration of the phone call (Step S16). Next, when the duration measured by the call duration measurement unit 131 exceeds the preset duration before the phone call ends, the notification unit 141 instructs the mail server 301 to transmit an e-mail (Step S17). Specifically, the notification unit 141 reads out an e-mail address of the communication terminal 401-3 stored in association with the communication terminal 401-2 from the association storage unit 161, and instructs the mail server 301 to transmit the e-mail including the predetermined message to this e-mail address. Then, the mail server 301 transmits the predetermined e-mail to the communication terminal 401-3 (Step S18). Here, the e-mail includes a content that lets an owner of the communication terminal 401-3 know that an owner of the communication terminal registered in advance may be talking for a long time or may be receiving a spam phone call like "your family is talking for a long time" or "your family may be receiving a spam phone call". Note that the time set in advance is preferably the time required for a phone call that does not commonly complete with only simple contents, such as three minutes. This time set in advance can be set and changed by an input operation from the outside. When the notification unit 141 transmits the notification, it may notify the communication terminal 401-3 in real time of the originating phone number and the call duration measured by the call duration measurement unit 131.

After that, the communication terminal 401-3 outputs the transmitted e-mail. This output may be output by a voice or may be displayed. When the communication terminal 401-3 displays the e-mail, for example, "there may have been an incoming call from a spam phone on Mr./Ms. ∘∘'s cellular phone", or "there has been an incoming call from 050-XXXX-XXXX on Mr./Ms. ∘∘'s cellular phone and the call lasted three minutes or longer. Please check Mr./Ms. ∘∘ immediately". At this time, the phone number of the communication terminal 401-1 may be displayed.

As described above, the management server 101 transmits the guidance to the call originator when there is an outgoing call. Further, when the duration of the phone call between the originating communication terminal and the destination communication terminal exceeds the predetermined duration, the management server 101 transmits the notification to the communication terminal associated in advance with the destination communication terminal. This prevents the processing load from increasing and can attempt to prevent the damage of the owner of the destination communication terminal from phone fraud from expanding.

The notification may include the location information indicating a current location of the communication terminal 401-2. The communication terminal 401-2 uses a GPS (Global Positioning System) function included in the communication terminal 401-2 to acquire the location information indicating the current location of the communication terminal 401-2. The method by which the communication terminal 401-2 obtains the location information is not limited to the one using the GPS function and instead may be acquired from a wireless base station connected to the communication terminal 401-2 as long as the information indicating the location of the communication terminal 401-2 can be acquired. Examples of other methods include a method of acquiring the location information using WiFi, BLE (Bluetooth Low Energy), Bluetooth or infrared communication function, and a method of acquiring the location information from Beacon signals, and a method of acquiring the location information using a Cell-ID.

The communication terminal 401-2 transmits the acquired location information to the management server 101. At this time, the communication terminal 401-2 transmits date and time information indicating the date and time when the location information is acquired in the location information. When the notification unit 141 of the management server 101 instructs the mail server 301 to transmit the e-mail, it instructs the mail server 301 to transmit the location information transmitted from the communication terminal 401-2 in the e-mail. At this time, the notification unit 141 may transmit map information including the location information to the mail server 301 and instruct the mail server 301 to include the map information in the e-mail instead of transmitting the location information. Alternatively, the notification unit 141 may transmit, to the mail server 301, URL (Uniform Resource Locator) information of a site that can acquire the map information including the location information and may instruct the mail server 301 to transmit the URL information in the e-mail. The URL information may have various authentications such as phone number authentication and may have restrictions such that the URL can be accessed (can be viewed) only by the receiver of the e-mail or only by the receiver of the e-mail and his/her family. Further alternatively, the notification unit 141 may transmit, to the mail server 301, information that enables the location information to be displayed on a map application which the communication terminal 401-3 can activate, and instructs the mail server 301 to transmit this information in the e-mail.

Further, the communication terminal 401-2 may transmit a plurality of pieces of the location information acquired in a time series at predetermined timings to the management server 101. In this case, the notification unit 141 of the management server 101 instructs the mail server 301 to transmit the plurality of pieces of location information transmitted from the communication terminal 401-2 in the e-mail. When the mail server 301 transmits the plurality of pieces of location information in the e-mail, the communication terminal 401-3 can output information indicating how the communication terminal 401-2 has moved (e.g., a moving route displayed on the map).

Furthermore, the notification unit 141 may instruct the mail server 301 to transmit phone call information (the phone number of the communication terminal 401-1, the call duration, call history such as the number of times and the times at which the communication terminal 401-2 makes phone calls to the phone number of the communication terminal 401-1) in the e-mail. The mail server 301 transmits the e-mail including the notification and the location information to the communication terminal 401-3.

The communication terminal 401-3 which has received the location information of the communication terminal 401-2 together with the notification displays the received e-mail and the location information based on an operation of the owner of the communication terminal 401-3.

FIG. 7 is a view showing a first display form of the location information displayed by the communication terminal 401-3. As shown in FIG. 7, the communication terminal 401-3 displays the location information of the communication terminal 401-2 together with the date and time when the location information is acquired and the phone number of the phone call partner.

The timing at which the communication terminal 401-2 transmits the location information to the management server 101 may be after the phone call ends. In this case, the location information acquired by the communication terminal 401-2 is location information indicating the location of the communication terminal 401-2 after the phone call ends. The management server 101 transmits the location information to the mail server 301 at a timing different from the notification. Then, the mail server 301 transmits the location information transmitted from the management server 101 to the communication terminal 401-3. The communication terminal 401-3 which has received the location information of the communication terminal 401-2 displays the received e-mail and the location information based on an operation of the owner of the communication terminal 401-3.

Figure 8:
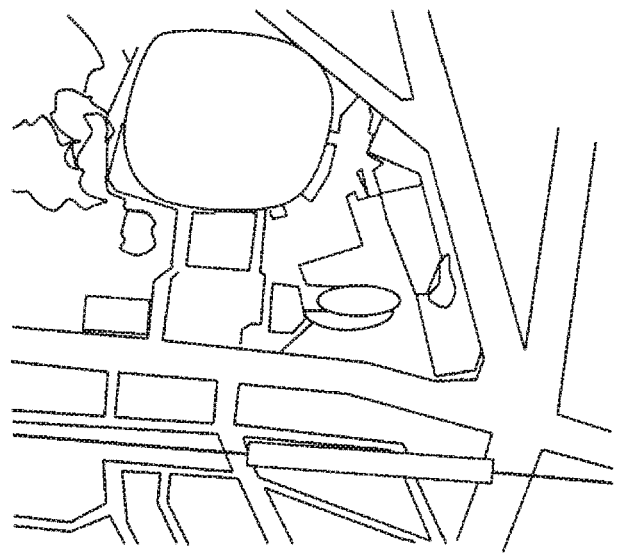
FIG. 8 is a view showing a second display form of the location information displayed by the communication terminal shown in FIG. 3.

FIG. 8 is a view showing a second display form of the location information displayed by the communication terminal 401-3. As shown in FIG. 8, the communication terminal 401-3 displays the location information of the communication terminal 401-2 together with the date and time when the location information is acquired and the phone number of the phone call partner.

As described above, when the mail server 301 transmits the plurality of pieces of location information in the e-mail, the communication terminal 401-3 can output the information indicating how the communication terminal 401-2 has moved.

Figure 9:
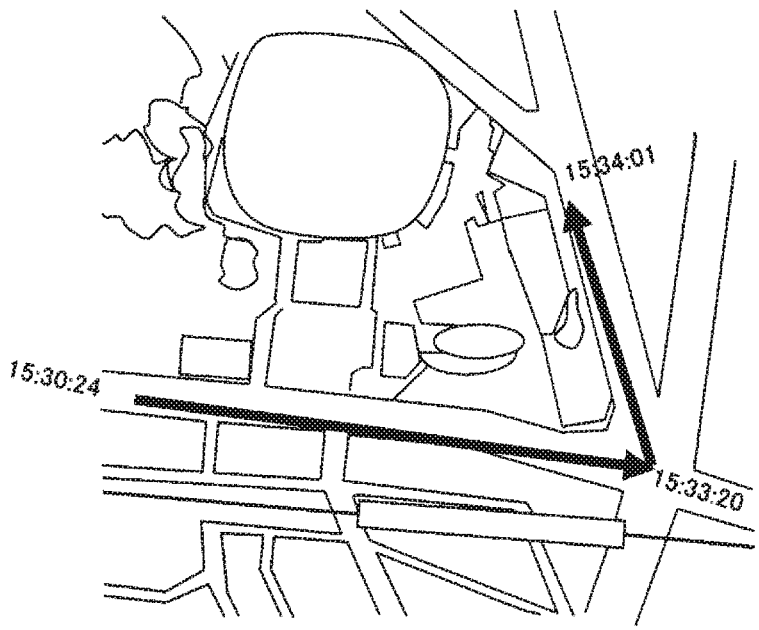
FIG. 9 is a view showing a third display form of the location information displayed by the communication terminal shown in FIG. 3.

FIG. 9 is a view showing a third display form of the location information displayed by the communication terminal 401-3. As shown in FIG. 9, the communication terminal 401-3 displays the plurality of pieces of location information acquired in a time series by the communication terminal 401-2 together with the date and time when the location information is acquired and the phone number of the phone call partner.

Note that the communication terminal 401-3 is not limited to the one possessed by the family or relatives of the owner possessing the communication terminal 401-2 but may be a communication apparatus installed in a facility for conducting business related to police and crime prevention.

Further, in this embodiment, an example in which the notification is transmitted using an e-mail has been described. However, the notification may be transmitted using a postal mail or facsimile, or other transmission medium.

Third Embodiment

Figure 10:
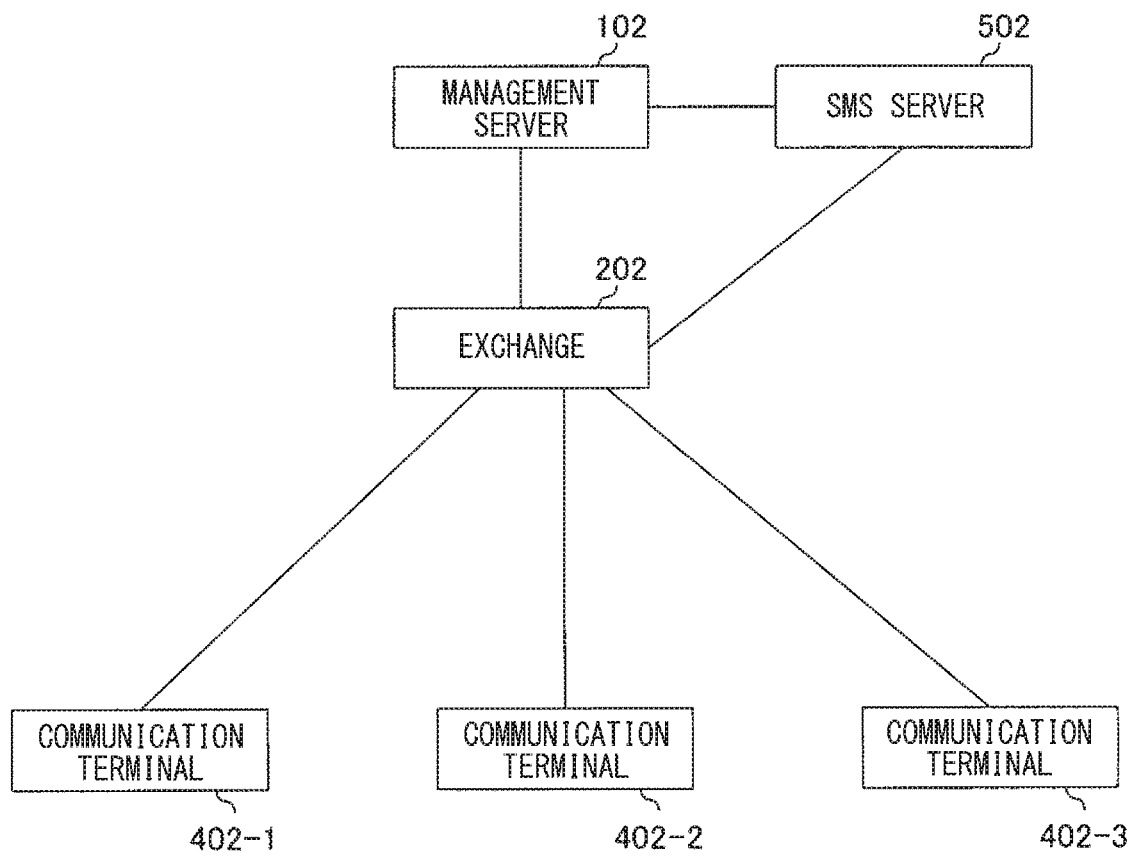
FIG. 10 is a view showing a management server according to a third embodiment of the present invention.

FIG. 10 is a view showing a management server according to a third embodiment of the present invention.

As shown in FIG. 10, a communication system in which a management server 102 according to this embodiment is provided includes the management server 102, an exchange 202, an SMS server 502, and communication terminals 402-1 to 402-3. In this embodiment, the mail server 301 according to the second embodiment is replaced with the SMS server 502. The management server 102 is connected to the exchange 202 and the SMS server 502. The exchange 202 is connected to the SMS server 502 and the communication terminals 402-1 to 402-3.

The communication terminals 402-1 to 402-3 are communication apparatuses capable of transmitting and receiving messages using phone and SMS. Further, the communication terminals 402-1 to 402-3 may be fixed apparatuses or movable portable apparatuses. FIG. 10 shows an example where there are three communication terminals. This configuration is employed for convenience of explanation, which will be given later. However, the number of the communication terminals is not limited to this number.

The exchange 202 is a phone exchange which performs general circuit exchange. The SMS server 502 is a server apparatus used for general message transmission/reception using an SMS. When the SMS server 502 receives an instruction to transmit a message to the designated phone number from the management server 102, the SMS server 502 outputs, to the exchange 202, an instruction to transmit a message using the SMS to the designated phone number.

Figure 11:
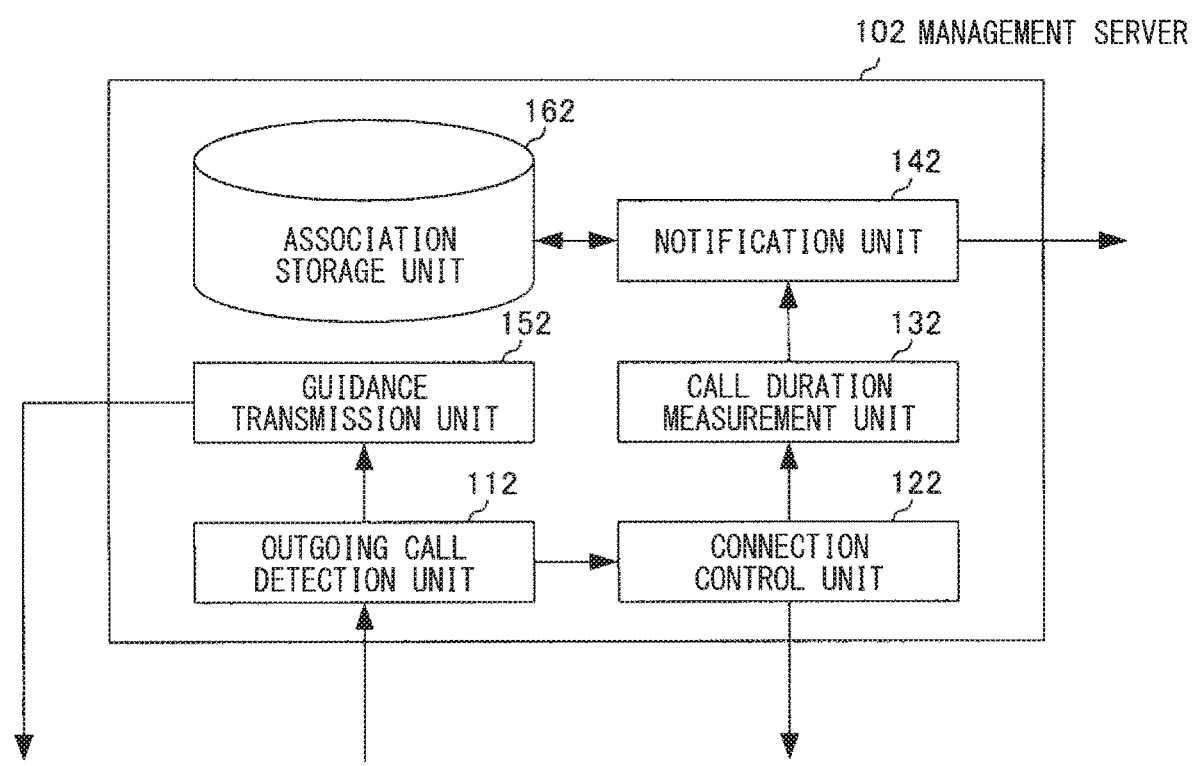
FIG. 11 is a view showing an example of an internal configuration of the management server shown in FIG. 10.

FIG. 11 is a view showing an example of an internal configuration of the management server 102 shown in FIG. 10. As shown in FIG. 11, the management server 102 shown in FIG. 10 includes an outgoing call detection unit 112, a connection control unit 122, a call duration measurement unit 132, a notification unit 142, a guidance transmission unit 152, and an association storage unit 162. Note that FIG. 11 shows an example of major components related to this embodiment among components of the management server 102 shown in FIG. 10.

The outgoing call detection unit 112 detects an outgoing call from the communication terminal 402-1 to the communication terminals 402-2 and 402-3 via the exchange 202. Further, the outgoing call detection unit 112 detects an outgoing call from the communication terminal 402-2 to the communication terminals 402-1 and 402-3 via the exchange 202. Furthermore, the outgoing call detection unit 112 detects an outgoing call from the communication terminal 402-3 to the communication terminals 402-1 and 402-2 via the exchange 202. In the following description, an example where the communication terminal 402-1 makes an outgoing call to the communication terminal 402-2 will be described.

When the outgoing call detection unit 112 detects an outgoing call from the communication terminal 402-1, the guidance transmission unit 152 transmits predetermined guidance to the communication terminal 402-1. This guidance is, for example, a message such as "there is a possibility to notify this call to a family/friend of the receiver".

The connection control unit 122 causes an outgoing call from the communication terminal 402-1 detected by the outgoing call detection unit 112 to arrive at the communication terminal 402-2, which is a call destination, via the exchange 202. At this time, when the guidance transmission unit 152 transmits the guidance, the connection control unit 122 may cause the outgoing call to arrive at the communication terminal 402-2.

The call duration measurement unit 132 measures a duration of a phone call when the phone call is started between the communication terminal 402-1 as a call originator and the communication terminal 402-2 as a call destination.

The notification unit 142 transmits the predetermined notification to the communication terminal 402-3 when the duration measured by the call duration measurement unit 132 exceeds the preset duration before the phone call ends. At this time, when the duration measured by the call duration measurement unit 132 exceeds the preset duration before the phone call ends, the notification unit 142 transmits the notification to the communication terminal 402-3, which is stored in association with the communication terminal 402-2 in the association storage unit 162. When the notification unit 142 transmits the notification, it reads out a phone number of the communication terminal 402-3 from the association storage unit 162, and instructs the SMS server 502 to transmit a message using the SMS to the phone number.

The association storage unit 162 stores in advance a phone number of the destination (receiver) communication terminal in association with a phone number of the communication terminal to which the notification unit 142 transmits the notification.

FIG. 12 is a view showing an example of the association stored in the association storage unit 162 shown in FIG. 11.

As shown in FIG. 12, the association storage unit 162 shown in FIG. 11 stores an incoming phone number and a notification destination phone number in association with each other. This association is registered in advance. When there is an outgoing call to the phone number registered as the incoming phone number, the notification destination phone number associated with this phone number becomes the destination phone number to which the notification unit 142 transmits the notification. For example, as shown in FIG. 12, the incoming phone number "03-○○○○-ΔΔΔΔ" and the notification destination phone number "03-○○○○-ΔΔΔΔ" are associated with each other. Using this association, when there is an outgoing call to the phone number of "03-○○○○-ΔΔΔΔ", the notification unit 142 transmits a message using the SMS to the phone number of "03-○○○○-ΔΔΔΔ". Further, the incoming phone number "04-□□□□-xxxx" and the notification destination phone number "04-xxxx-□□□□" are associated with each other. Using this association, when there is an outgoing call to the phone number of "04-□□□□-xxxx", the notification unit 142 transmits a message using the SMS to the phone number of "04-xxxx-□□□□". Note that the number of notification destination phone numbers associated with the incoming phone number may not be only one and instead may be plural. In addition, this association can be changed from the outside.

Figure 13:
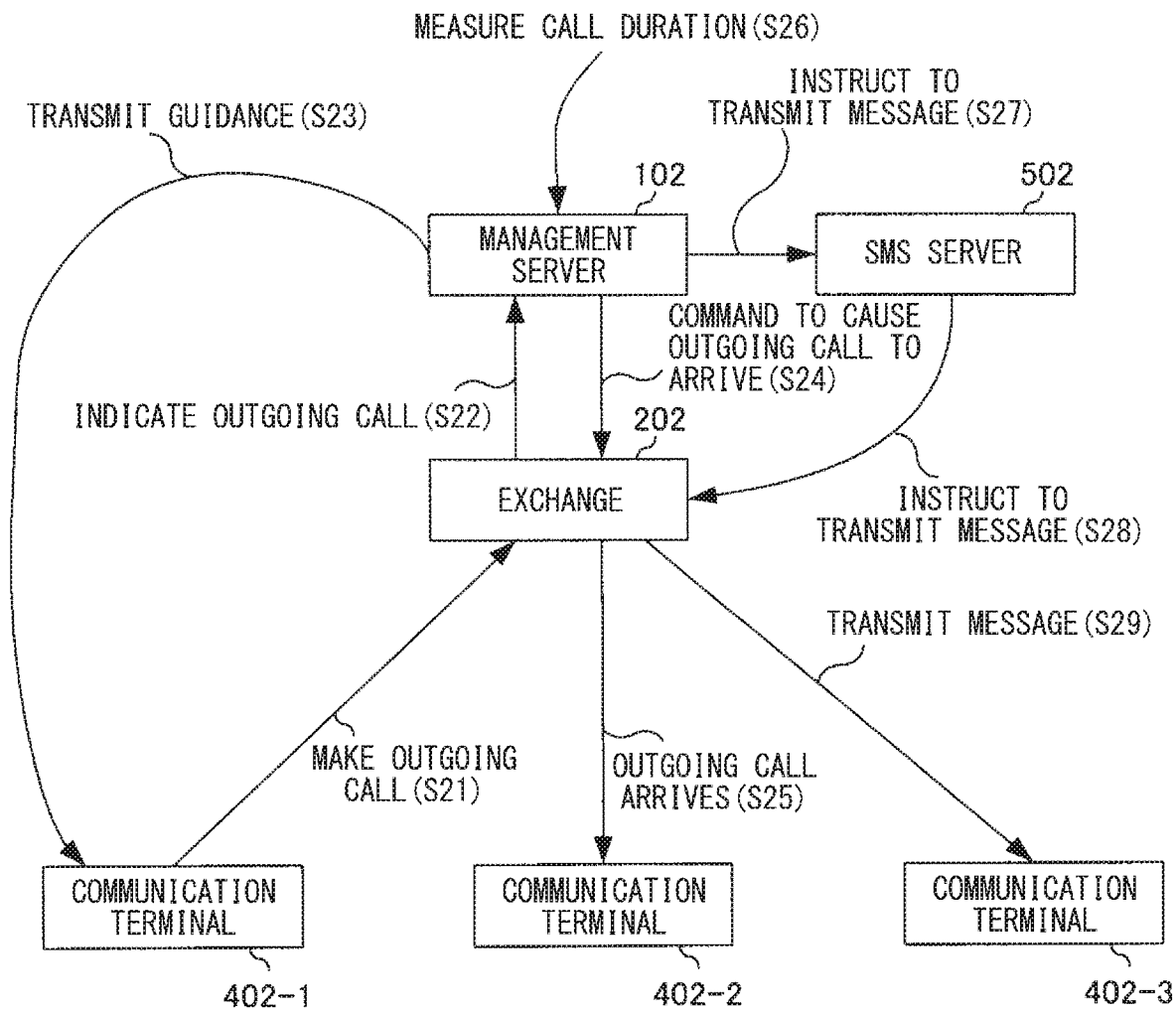
FIG. 13 is a view for explaining an example of a processing flow in a communication system shown in FIG. 10.

Hereinafter, the notification method in the communication system shown in FIG. 10 will be described. FIG. 13 is a view for explaining an example of a processing flow in the communication system shown in FIG. 10.

First, when the communication terminal 402-1 makes an outgoing call to the communication terminal 402-2 (Step S21), the exchange 202 lets the management server 102 know that the outgoing call has been made (Step S22). In the management server 102, when the outgoing call detection unit 112 detects the outgoing call from the communication terminal 402-1 to the communication terminal 402-2, the guidance transmission unit 152 transmits predetermined guidance to the communication terminal 402-1 (Step S23). Next, the connection control unit 122 transmits a command to the exchange 202 to cause the outgoing call detected by the outgoing call detection unit 112 to arrive at the communication terminal 402-2 (Step S24). Then, the exchange 202 causes the outgoing call from the communication terminal 402-1 to arrive at the communication terminal 402-2 (Step S25).

After that, when a phone call is started between the communication terminal 402-1 and the communication terminal 402-2, the call duration measurement unit 132 measures a duration of the phone call (Step S26). Next, when the duration measured by the call duration measurement unit 132 exceeds the preset duration before the phone call ends, the notification unit 142 instructs the SMS server 502 to transmit a message using the SMS (Step S27). Specifically, the notification unit 142 reads a phone number of the communication terminal 402-3 stored in association with the communication terminal 402-2 from the association storage unit 162, and instructs the SMS server 502 to transmit the message using the SMS to this phone number. This message includes a content that lets an owner of the communication terminal 402-3 know that an owner of the communication terminal registered in advance may be talking for a long time or may be receiving a spam phone call like "your family is talking for a long time" or "your family may be receiving a spam phone call". This message may include the phone number of the communication terminal 402-2. Note that the time set in advance is preferably the time required for a phone call that does not commonly complete with only simple contents, such as three minutes. This time set in advance can be set and changed by an input operation from the outside. When the notification unit 142 transmits the notification, it may notify the communication terminal 402-3 in real time of the originating phone number and the call duration measured by the call duration measurement unit 132.

The SMS server 502, which have been instructed to transmit the message, outputs, to the exchange 202, an instruction for transmitting the message using the SMS to the designated phone number (Step S28). Then, the exchange 202 transmits the message to the communication terminal 402-3 having the designated phone number (Step S29).

After that, the communication terminal 402-3 outputs the transmitted message. This output may be output by a voice or may be displayed.

As described above, the management server 102 transmits the guidance to the call originator when there is an outgoing call. Further, when the duration of the phone call between the originating communication terminal and the destination communication terminal exceeds the predetermined duration, the management server 102 transmits the notification to the communication terminal associated in advance with the destination communication terminal. This prevents the processing load from increasing and can attempt to prevent the damage of the owner of the destination communication terminal from phone fraud from expanding. In this embodiment, the message using the SMS is used for the notification. Thus, the notification can be received even when a communication terminal that cannot transmit/receive e-mails (that is not provided with the e-mail service) is used. Additionally, the message transmission/reception using the SMS is more advantageous in terms of immediacy as compared with transmission/reception using e-mails.

Fourth Embodiment

Figure 14:
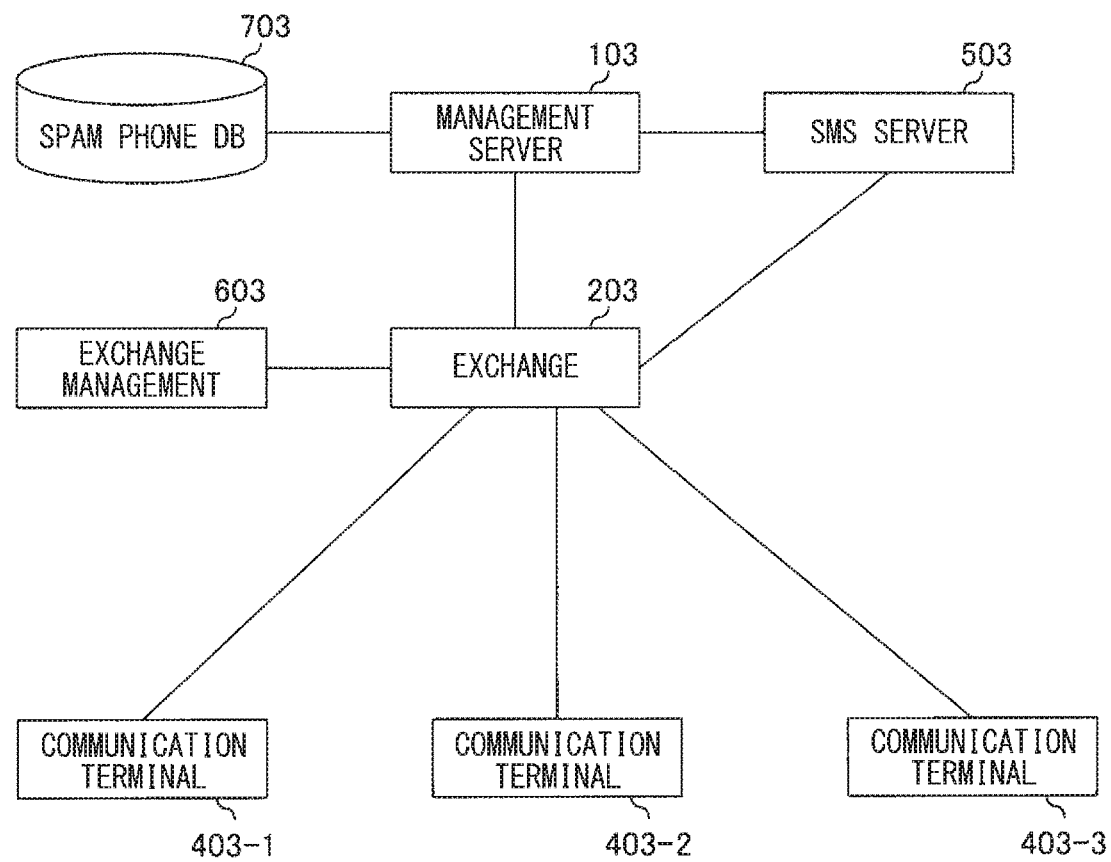
FIG. 14 is a view showing a management server according to a fourth embodiment of the present invention.

FIG. 14 is a view showing a management server according to a fourth embodiment of the present invention.

As shown in FIG. 14, a communication system in which a management server 103 according to this embodiment is provided includes the management server 103, an exchange 203, an SMS server 503, communication terminals 403-1 to 403-3, an exchange management 603, and a spam phone DB 703. In this embodiment, the SMS server 503 is disposed. However, like the second embodiment, the mail server 301 may be disposed. The management server 103 is connected to the exchange 203, the SMS server 503, and the spam phone DB 703. The exchange 203 is connected to the management server 103, the communication terminals 403-1 to 403-3, the SMS server 503, and the exchange management 603.

The communication terminals 403-1 to 403-3 are communication apparatuses capable of transmitting and receiving messages using phone and SMS. Further, the communication terminals 403-1 to 403-3 may be fixed apparatuses or movable portable apparatuses. FIG. 14 shows an example where there are three communication terminals. This configuration is employed for convenience of explanation, which will be given later. However, the number of the communication terminals is not limited to this number.

The exchange 203 is a phone exchange which performs general circuit exchange. The SMS server 503 is a server apparatus used for general message transmission/reception using an SMS. When the SMS server 503 receives an instruction to transmit a message to the designated phone number from the management server 103, the SMS server 503 outputs, to the exchange 203, an instruction to transmit a message using the SMS to the designated phone number.

The exchange management 603 manages the exchange 203. The spam phone DB 703 stores pre-registered spam phone numbers. The spam phone number here is, for example, the phone number of the call originator who has made an outgoing call to a victim who has suffered from phone fraud or who has been about to be scammed. Such a phone number may be registered in advance in the spam phone DB 703 according to a report from this victim.

Figure 15:
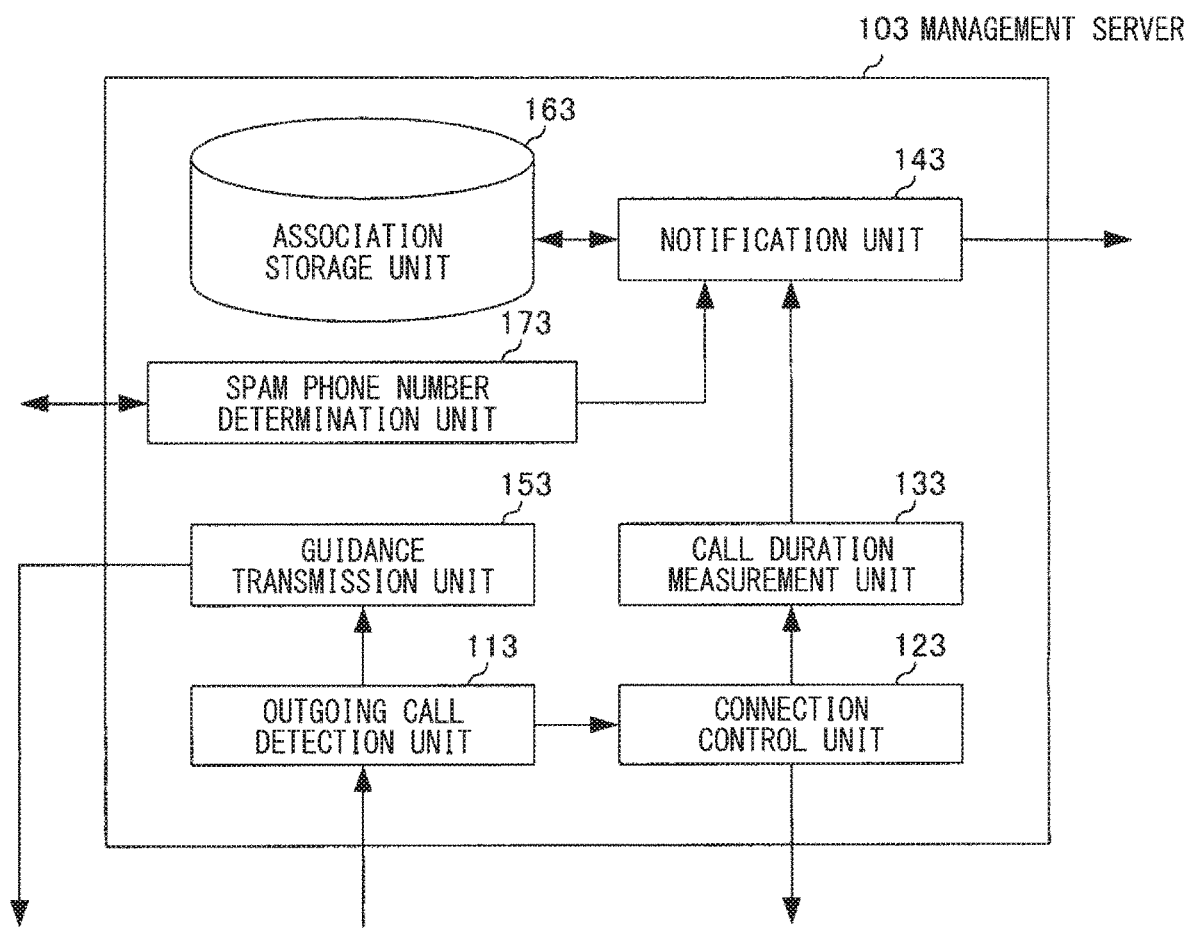
FIG. 15 is a view showing an example of an internal configuration of the management server shown in FIG. 14.

FIG. 15 is a view showing an example of an internal configuration of the management server 103 shown in FIG. 14. As shown in FIG. 15, the management server 103 shown in FIG. 14 includes an outgoing call detection unit 113, a connection control unit 123, a call duration measurement unit 133, a notification unit 143, a guidance transmission unit 153, an association storage unit 163, and a spam phone number determination unit 173. Note that FIG. 15 shows an example of major components related to this embodiment among components of the management server 103 shown in FIG. 14.

The outgoing call detection unit 113 detects an outgoing call from the communication terminal 403-1 to the communication terminals 403-2 and 403-3 via the exchange 203. Further, the outgoing call detection unit 113 detects an outgoing call from the communication terminal 403-2 to the communication terminals 403-1 and 403-3 via the exchange 203. Furthermore, the outgoing call detection unit 113 detects an outgoing call from the communication terminal 403-3 to the communication terminals 403-1 and 403-2 via the exchange 203. In the following description, an example where the communication terminal 403-1 makes an outgoing call to the communication terminal 403-2 will be described.

When the outgoing call detection unit 113 detects an outgoing call, the spam phone number determination unit 173 determines whether the phone number of the communication terminal that has made the outgoing call, which is detected by the outgoing call detection unit 113, is the spam phone number registered in advance in the spam phone DB 703.

When the outgoing call detection unit 113 detects an outgoing call from the communication terminal 403-1, the guidance transmission unit 153 transmits predetermined guidance to the communication terminal 403-1. This guidance is, for example, a message such as "there is a possibility to notify this call to a family/friend of the receiver". When the spam phone number determination unit 173 determines that the phone number of the communication terminal that has made the outgoing call, which is detected by the outgoing call detection unit 113, is the spam phone number registered in advance in the spam phone DB 703, the guidance transmission unit 153 may transmit the predetermined guidance to the communication terminal that has made the outgoing call. This guidance is, for example, a message of an alert such as "there is a possibility to notify this call to a family/friend of the receiver" and "this phone call is being recorded". When the spam phone number determination unit 173 determines that the phone number of the communication terminal that has made the outgoing call, which is detected by the outgoing call detection unit 113, is the spam phone number registered in advance in the spam phone DB 703, the guidance transmission unit 153 may transmit the predetermined guidance to the destination communication terminal after the connection control unit 123 causes the outgoing call to arrive at the destination communication terminal. This guidance may be any message as long as it alerts the owner of the destination communication terminal, for example, "a phone call from an unknown person, please beware".

The connection control unit 123 causes an outgoing call from the communication terminal 403-1 detected by the outgoing call detection unit 113 arrive at the communication terminal 403-2, which is a call destination, via the exchange 203. At this time, when the guidance transmission unit 153 transmits the guidance, the connection control unit 123 may cause the outgoing call to arrive at the communication terminal 403-2.

The call duration measurement unit 133 measures a duration of a phone call when the phone call is started between the communication terminal 403-1 as a call originator and the communication terminal 403-2 as a call destination.

When the spam phone number determination unit 173 determines that the phone number of the communication terminal that has made the outgoing call, which is detected by the outgoing call detection unit 113, is the spam phone number registered in advance in the spam phone DB 703, the notification unit 143 transmits the predetermined notification to the communication terminal 403-3. At this time, the notification unit 143 transmits the notification to the communication terminal 403-3 stored in association with the communication terminal 403-2 in the association storage unit 163. This notification includes, for example, a content informing the communication terminal 403-3 that there has been an incoming call from the spam phone, such as "there has been an incoming call from a spam phone on your family's phone". The notification unit 143 transmits the predetermined notification to the communication terminal 403-3 when the duration measured by the call duration measurement unit 133 exceeds the preset duration before the phone call ends. At this time, when the duration measured by the call duration measurement unit 133 exceeds the preset duration before the phone call ends, the notification unit 143 transmits the notification to the communication terminal 403-3, which is stored in association with the communication terminal 403-2 in the association storage unit 163. When the notification unit 143 transmits the notification, it reads out a phone number of the communication terminal 403-3 from the association storage unit 163, and instructs the SMS server 503 to transmit a message using the SMS to the phone number.

The association storage unit 163 stores in advance a phone number of the destination (receiver) communication terminal in association with a phone number of the communication terminal to which the notification unit 143 transmits the notification. The association is the same as the one shown in FIG. 12.

Figure 16:
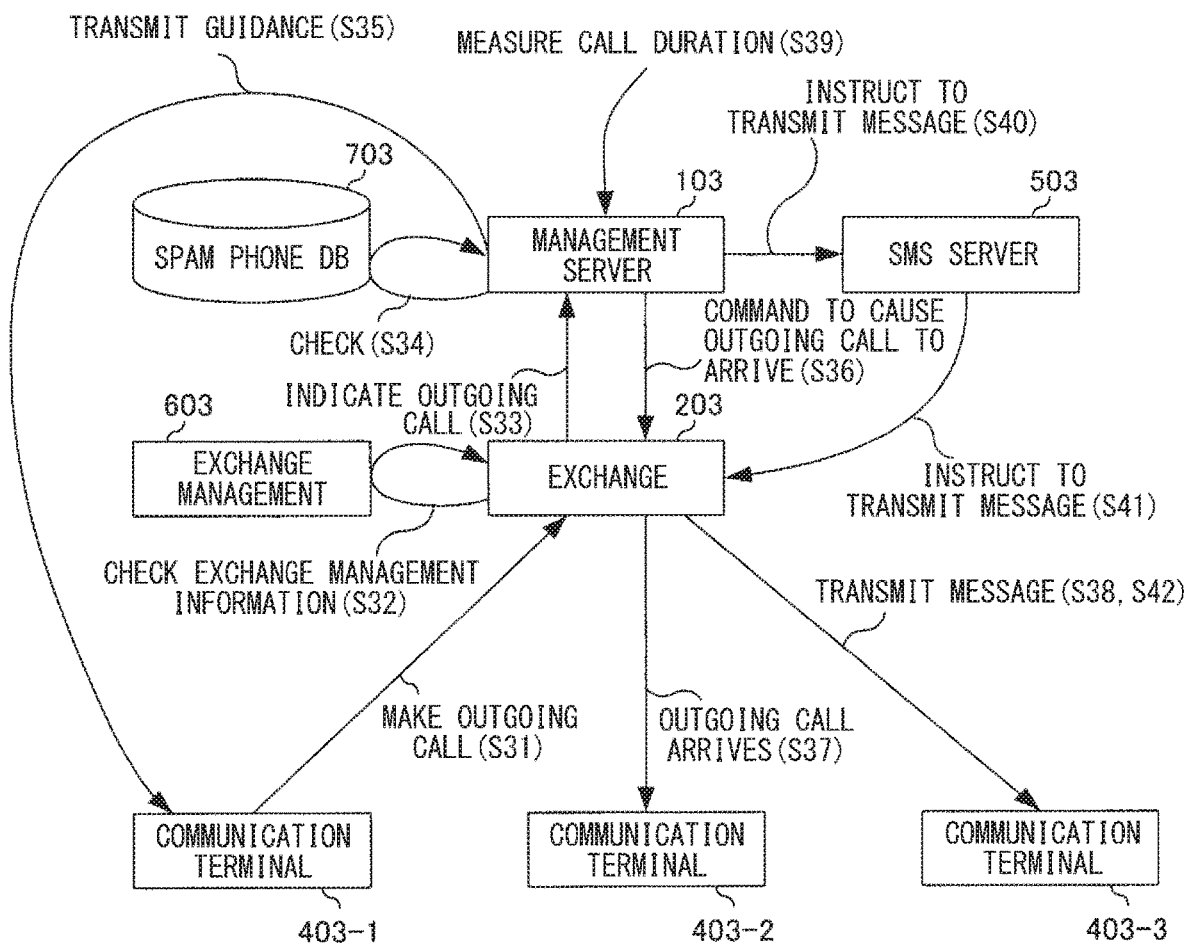
FIG. 16 is a view for explaining an example of a processing flow in a communication system shown in FIG. 14.

Hereinafter, the notification method in the communication system shown in FIG. 14 will be described. FIG. 16 is a view for explaining an example of a processing flow in the communication system shown in FIG. 14. The processing described with reference to FIG. 16 is processing when the phone number of the communication terminal 403-1 is the spam phone number registered in advance in the spam phone DB 703.

First, when the communication terminal 403-1 makes an outgoing call to the communication terminal 403-2 (Step S31), the exchange 203 checks exchange management information in the exchange management 603 (Step S32), and lets the management server 103 know that the outgoing call has been made (Step S33). In the management server 103, when the outgoing call detection unit 113 detects the outgoing call from the communication terminal 403-1 to the communication terminal 403-2, the spam phone number determination unit 173 determines whether the phone number of the communication terminal 403-1 is the spam phone number registered in advance in the spam phone DB 703 (Step S34). Further, the guidance transmission unit 153 transmits predetermined guidance to the communication terminal 403-1 (Step S35). Next, the connection control unit 123 transmits a command to the exchange 203 to cause the outgoing call detected by the outgoing call detection unit 113 to arrive at the communication terminal 403-2 (Step S36). Then, the exchange 203 causes the outgoing call from the communication terminal 403-1 to arrive at the communication terminal 403-2 (Step S37). The notification unit 143 transmits the message using the SMS to the communication terminal 403-3 via the SMS server 503 and the exchange 203 (Step S38). This message includes a content informing the communication terminal 403-3 that there has been an incoming call from the spam phone.

After that, when a phone call is started between the communication terminal 403-1 and the communication terminal 403-2, the call duration measurement unit 133 measures a duration of the phone call (Step S39). Next, when the duration measured by the call duration measurement unit 133 exceeds the preset duration before the phone call ends, the notification unit 143 instructs the SMS server 503 to transmit a message using the SMS (Step S40). Specifically, the notification unit 143 reads a phone number of the communication terminal 403-3 stored in association with the communication terminal 403-2 from the association storage unit 163, and instructs the SMS server 503 to transmit the message using the SMS to this phone number. This message includes a content that lets an owner of the communication terminal 403-3 know that an owner of the communication terminal registered in advance may be talking for a long time or may be receiving a spam phone call like "your family is talking for a long time" or "your family may be receiving a spam phone call". Note that the time set in advance is preferably the time required for a phone call that does not commonly complete with only simple contents, such as three minutes. This time set in advance can be set and changed by an input operation from the outside. When the notification unit 143 transmits the notification, it may notify the communication terminal 403-3 in real time of the originating phone number and the call duration measured by the call duration measurement unit 133.

The SMS server 503, which have been instructed to transmit the message, outputs, to the exchange 203, an instruction for transmitting the message using the SMS to the designated phone number (Step S41). Then, the exchange 203 transmits the message to the communication terminal 403-3 having the designated phone number (Step S42).

After that, the communication terminal 403-3 outputs the transmitted message. This output may be output by a voice or may be displayed.

Figure 17:
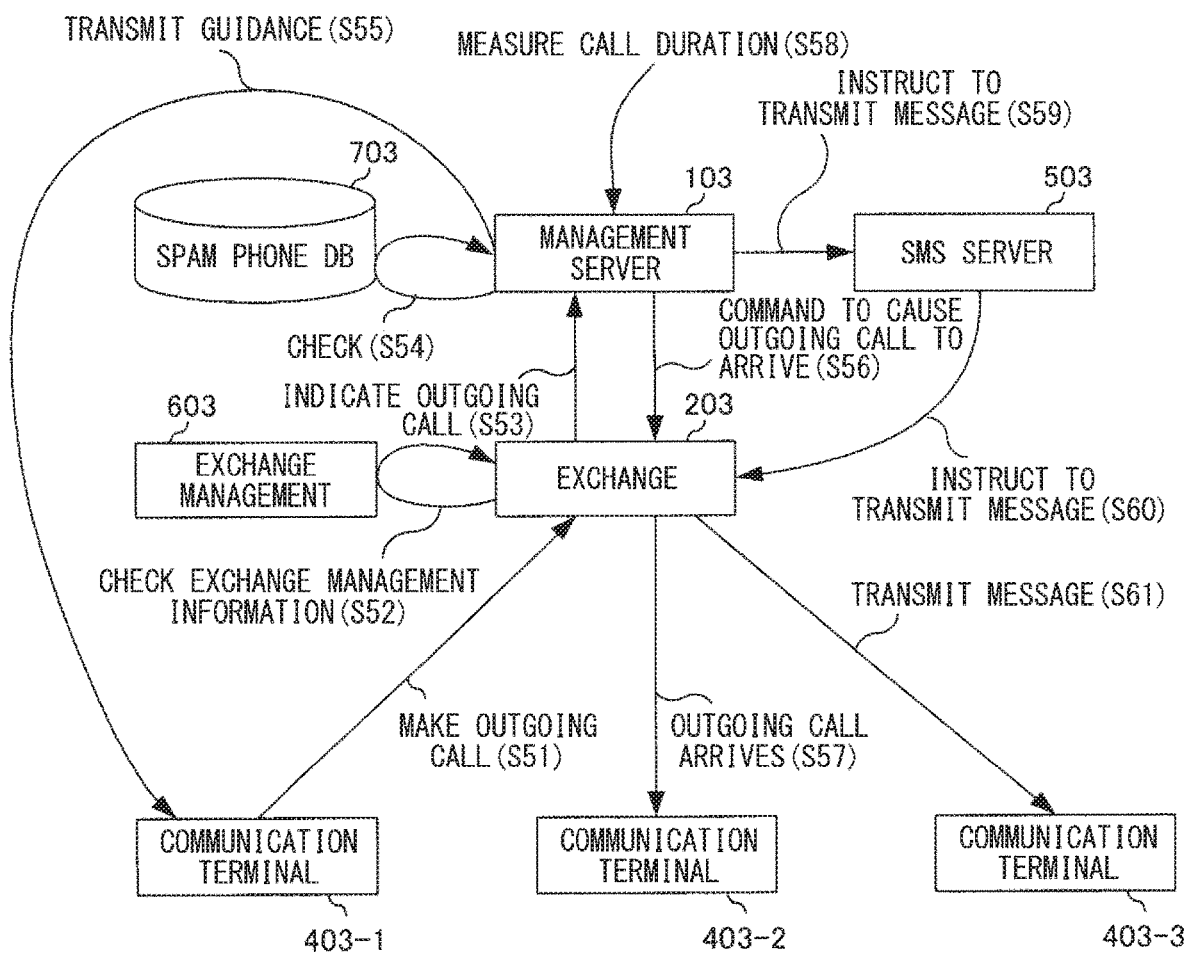
FIG. 17 is a view for explaining another example of the processing flow in the communication system shown in FIG. 14.

FIG. 17 is a view for explaining another example of the processing flow in the communication system shown in FIG. 14. The processing described with reference to FIG. 17 is processing when the phone number of the communication terminal 403-1 is not registered in the spam phone DB 703.

First, when the communication terminal 403-1 makes an outgoing call to the communication terminal 403-2 (Step S51), the exchange 203 checks exchange management information in the exchange management 603 (Step S52), and lets the management server 103 know that the outgoing call has been made (Step S53). In the management server 103, when the outgoing call detection unit 113 detects the outgoing call from the communication terminal 403-1 to the communication terminal 403-2, the spam phone number determination unit 173 determines whether the phone number of the communication terminal 403-1 is the spam phone number registered in advance in the spam phone DB 703 (Step S54). Further, the guidance transmission unit 153 transmits predetermined guidance to the communication terminal 403-1 (Step S55). Next, the connection control unit 123 transmits a command to the exchange 203 to cause the outgoing call detected by the outgoing call detection unit 113 to arrive at the communication terminal 403-2 (Step S56). Then, the exchange 203 causes the outgoing call from the communication terminal 403-1 to arrive at the communication terminal 403-2 (Step S57).

After that, when a phone call is started between the communication terminal 403-1 and the communication terminal 403-2, the call duration measurement unit 133 measures a duration of the phone call (Step S58). Next, when the duration measured by the call duration measurement unit 133 exceeds the preset duration before the phone call ends, the notification unit 143 instructs the SMS server 503 to transmit a message using the SMS (Step S59). Specifically, the notification unit 143 reads a phone number of the communication terminal 403-3 stored in association with the communication terminal 403-2 from the association storage unit 163, and instructs the SMS server 503 to transmit the message using the SMS to this phone number. This message includes a content that lets an owner of the communication terminal 403-3 know that an owner of the communication terminal registered in advance may be talking for a long time or may be receiving a spam phone call like "your family is talking for a long time" or "your family may be receiving a spam phone call". When the notification unit 143 transmits the notification, it may notify the communication terminal 403-3 in real time of the originating phone number and the call duration measured by the call duration measurement unit 133.

The SMS server 503, which have been instructed to transmit the message, outputs, to the exchange 203, an instruction for transmitting the message using the SMS to the designated phone number (Step S60). Then, the exchange 203 transmits the message to the communication terminal 403-3 having the designated phone number (Step S61).

After that, the communication terminal 403-3 outputs the transmitted message. This output may be output by a voice or may be displayed.

As described above, the management server 103 transmits the guidance to the call originator when there is an outgoing call. Further, when the duration of the phone call between the originating communication terminal and the destination communication terminal exceeds the predetermined duration, the management server 103 transmits the notification to the communication terminal associated in advance with the destination communication terminal. Furthermore, the management server 103 determines whether the phone number of the communication terminal that has made the outgoing call is the spam phone number registered in advance. When the phone number of the communication terminal that has made the outgoing call is the spam phone number registered in advance, the management server 103 transmits the notification to the communication terminal associated in advance with the destination communication terminal. This further prevents the processing load from increasing and can attempt to prevent the damage of the owner of the destination communication terminal from phone fraud from expanding.

Fifth Embodiment

Figure 18:
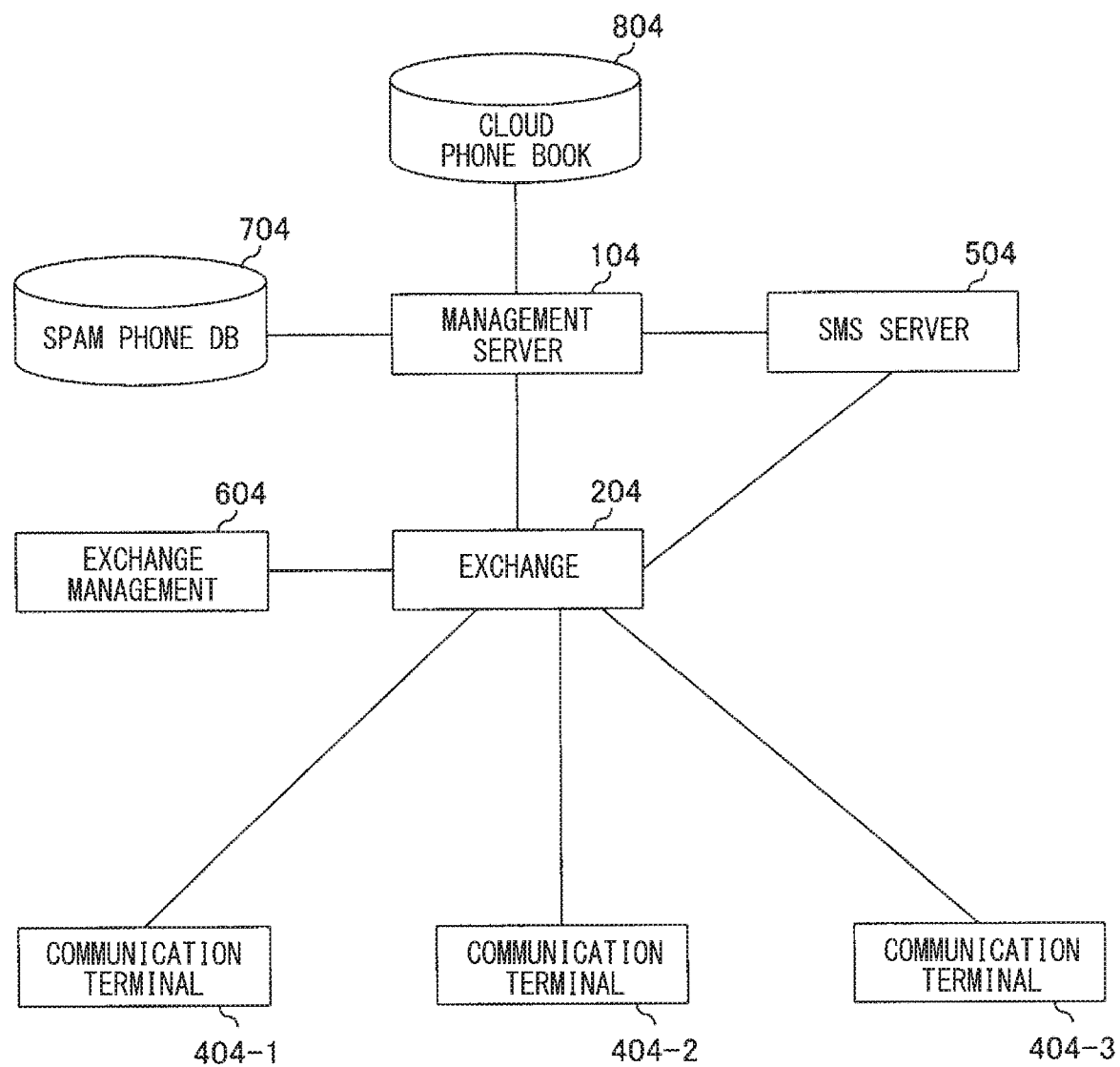
FIG. 18 is a view showing a management server according to a fifth embodiment of the present invention.

FIG. 18 is a diagram showing a management server according to a fifth embodiment of the present invention.

As shown in FIG. 18, a communication system in which a management server 104 according to this embodiment is provided includes the management server 104, an exchange 204, an SMS server 504, communication terminals 404-1 to 404-3, an exchange management 604, a spam phone DB 704, and a cloud phone book 804. In this embodiment, the SMS server 504 is disposed. However, like the second embodiment, the mail server 301 may be disposed. The management server 104 is connected to the exchange 204, the SMS server 504, the spam phone DB 704, and the cloud phone book 804. The exchange 204 is connected to the management server 104, the communication terminals 404-1 to 404-3, the SMS server 504, and the exchange management 604.

The communication terminals 404-1 to 404-3 are communication apparatuses capable of transmitting and receiving messages using phone and SMS. Further, the communication terminals 404-1 to 404-3 may be fixed apparatuses or movable portable apparatuses. FIG. 18 shows an example where there are three communication terminals. This configuration is employed for convenience of explanation, which will be given later. However, the number of the communication terminals is not limited to this number.

The exchange 204 is a phone exchange which performs general circuit exchange. The SMS server 504 is a server apparatus used for general message transmission/reception using an SMS. When the SMS server 504 receives an instruction to transmit a message to the designated phone number from the management server 104, the SMS server 504 outputs, to the exchange 204, an instruction to transmit a message using the SMS to the designated phone number. The exchange management 604 manages the exchange 204. The spam phone DB 704 stores pre-registered spam phone numbers. The spam phone number here is, for example, the phone number of the call originator who has made an outgoing call to a victim who has suffered from phone fraud or who has been about to be scammed. Such a phone number is registered in advance in the spam phone DB 704 according to a report from this victim. The cloud phone book 804 is a database present on a communication network to which the management server 104 is connected, and corresponds to a common phone book. That is, the cloud phone book is a list of phone numbers registered for each of the communication terminals 404-1 to 404-3. Commonly, this list is set by the owners of the communication terminals 404-1 to 404-3 through an input operation from the outside. This list includes phone numbers that the owners of the communication terminals 404-1 to 404-3 may usually contact such as family, relatives, friends, workplaces, schools, etc. That is, there is a high possibility that the phone number not registered in the cloud phone book 804 is the phone number of a person unknown to the owners of the communication terminals 404-1 to 404-3.

Figure 19:
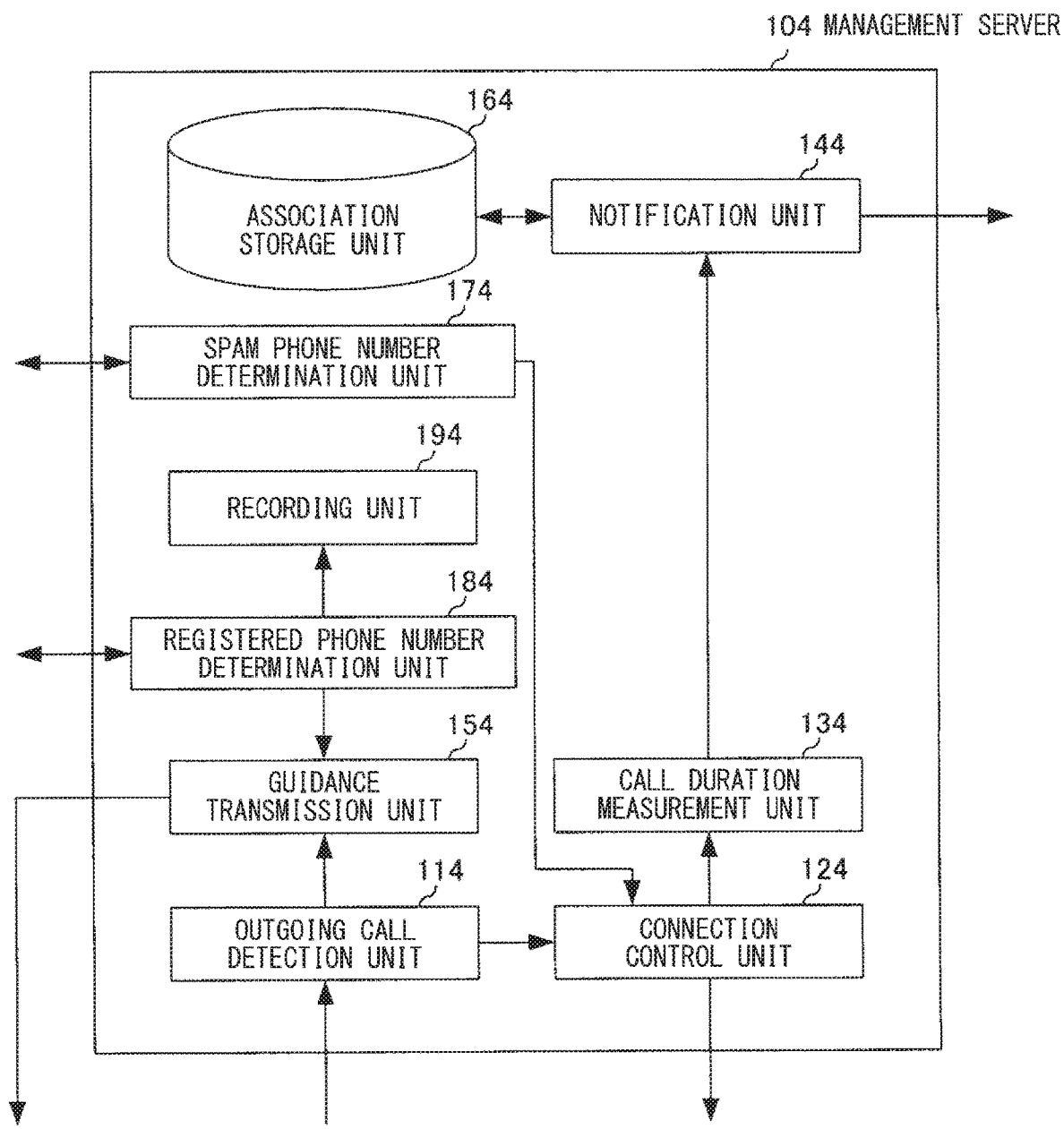
FIG. 19 is a view showing an example of an internal configuration of the management server shown in FIG. 18.

FIG. 19 is a view showing an example of an internal configuration of the management server 104 shown in FIG. 18. As shown in FIG. 19, the management server 104 shown in FIG. 18 includes an outgoing call detection unit 114, a connection control unit 124, a call duration measurement unit 134, a notification unit 144, a guidance transmission unit 154, an association storage unit 164, a spam phone number determination unit 174, a registered phone number determination unit 184, and a recording unit 194. Note that FIG. 19 shows an example of major components related to this embodiment among components of the management server 104 shown in FIG. 18.

The outgoing call detection unit 114 detects an outgoing call from the communication terminal 404-1 to the communication terminals 404-2 and 404-3 via the exchange 204. Further, the outgoing call detection unit 114 detects an outgoing call from the communication terminal 404-2 to the communication terminals 404-1 and 404-3 via the exchange 204. Furthermore, the outgoing call detection unit 114 detects an outgoing call from the communication terminal 404-3 to the communication terminals 404-1 and 404-2 via the exchange 204. In the following description, an example where the communication terminal 404-1 makes an outgoing call to the communication terminal 404-2 will be described.

When the outgoing call detection unit 114 detects an outgoing call, the spam phone number determination unit 174 determines whether the phone number of the communication terminal that has made the outgoing call, which is detected by the outgoing call detection unit 114, is the spam phone number registered in advance in the spam phone DB 704.

The registered phone number determination unit 184 determines whether the phone number of the communication terminal that has made the outgoing call, which is detected by the outgoing call detection unit 114, is the phone number registered in advance in the cloud phone book 804.

The recording unit 194 records phone calls between the communication terminals 404-1 to 404-3. Note that the recording unit 194 may be provided outside the management server 104.

When the registered phone number determination unit 184 determines that the phone number of the communication terminal that has made the outgoing call, which is detected by the outgoing call detection unit 114, is not the phone number registered in advance in the cloud phone book 804, the guidance transmission unit 154 transmits the predetermined guidance to the communication terminal 404-1. That is, when the phone number of the communication terminal that has made the outgoing call, which is detected by the outgoing call detection unit 114, is not registered in advance in the cloud phone book 804, the guidance transmission unit 154 transmits the predetermined guidance to the communication terminal 404-1. This guidance is, for example, a message such as "there is a possibility to notify this call to a family/friend of the receiver" and "this phone call is being recorded". At this time, the guidance transmission unit 154 may transmit a signal for sounding an alarm to the communication terminal 404-1. Further, when the registered phone number determination unit 184 determines that the phone number of the communication terminal that has made the outgoing call, which is detected by the outgoing call detection unit 114, is not the phone number registered in advance in the cloud phone book 804, the guidance transmission unit 154 may transmit the predetermined guidance to the communication terminal 404-2 after the connection control unit 124 causes the outgoing call to arrive at the communication terminal 404-2. This guidance may be any message as long as it alerts the owner of the communication terminal 404-2, for example, "a phone call from an unknown person, please beware" and "this phone call is dangerous". Moreover, the guidance transmission unit 154 may transmit the guidance to the communication terminal 404-2 a plurality of times. For example, the guidance transmission unit 154 may transmit guidance "this phone call is dangerous" to the communication terminal 404-2 at the time of receiving an incoming call and transmit guidance "watch out" to the communication terminal 404-2 a plurality of times or transmit a signal for sounding an alarm to the communication terminal 404-1 when a predetermined duration has elapsed during the phone call. The guidance transmission unit 154 may transmit guidance to the communication terminal 404-2 to make a future alert such as "this phone call was dangerous, this attention will be sent to you again" after the phone call ends. Note that such guidance may be transmitted from the guidance transmission unit 154 to the communication terminal 404-2 when the phone number of the communication terminal that has made the outgoing call, which is detected by the outgoing call detection unit 114, is neither the spam phone number registered in advance in the spam phone DB 704 nor the phone number registered in advance in the cloud phone book 804.

The guidance transmission unit 154 may transmit the predetermined guidance to the receiver communication terminal 404-2 when the registered phone number determination unit 184 determines that the phone number of the communication terminal that has made the outgoing call, which is detected by the outgoing call detection unit 114, is the phone number registered in advance in the cloud phone book 804. The guidance in this case may be guidance indicating that it is an incoming call from the registered phone number registered in advance in the cloud phone book 804, such as "the caller this time is your family, Mr./Ms. ∘∘". Further, the guidance transmission unit 154 may transmit the predetermined guidance to the caller communication terminal 404-1 while such guidance is being transmitted. The guidance in this case may be guidance indicating that the phone call partner is being called, such as "connecting to the customer, please wait for a while". The guidance transmission unit 154 may transmit, to the communication terminals 404-1 and 404-2, guidance that gives a notice to disconnect the phone call (outgoing call), such as "as this phone call may be dangerous, this phone call is ended" when the connection control unit 124 disconnects the phone call (outgoing call). Further, the guidance transmission unit 154 may transmit a signal for sounding an alarm to the communication terminals 404-1 and 404-2 when the connection control unit 124 disconnects the phone call (outgoing call).

The connection control unit 124 causes an outgoing call from the communication terminal 404-1 detected by the outgoing call detection unit 114 to arrive at the communication terminal 404-2, which is a call destination, via the exchange 204. At this time, when the guidance transmission unit 154 transmits the guidance, the connection control unit 124 may cause the outgoing call to arrive at the communication terminal 404-2. When the spam phone number determination unit 174 determines that the phone number of the communication terminal that has made the outgoing call, which is detected by the outgoing call detection unit 114, is the spam phone number registered in advance in the spam phone DB 704, the connection control unit 124 disconnects the outgoing call. Note that when the spam phone number determination unit 174 determines that the phone number of the communication terminal that has made the outgoing call, which is detected by the outgoing call detection unit 114, is the spam phone number registered in advance in the spam phone DB 704, the connection control unit 124 may disconnect the outgoing call when the predetermined duration has elapsed since the phone call is started. For an incoming call, the connection control unit 124 may disconnect the incoming call.

The call duration measurement unit 134 measures a duration of a phone call when the phone call is started between the communication terminal 404-1 as a call originator and the communication terminal 404-2 as a call destination.

The notification unit 144 transmits the predetermined notification to the communication terminal 404-3 when the duration measured by the call duration measurement unit 134 exceeds the preset duration before the phone call ends. At this time, when the duration measured by the call duration measurement unit 134 exceeds the preset duration before the phone call ends, the notification unit 144 transmits the notification to the communication terminal 404-3, which is stored in association with the communication terminal 404-2 in the association storage unit 164. When the notification unit 144 transmits the notification, it reads out a phone number of the communication terminal 404-3 from the association storage unit 164, and instructs the SMS server 504 to transmit a message using the SMS to the phone number.

The association storage unit 164 stores in advance a phone number of the destination (receiver) communication terminal in association with a phone number of the communication terminal to which the notification unit 144 transmits the notification. The association is the same as the one shown in FIG. 12.

Figure 20:
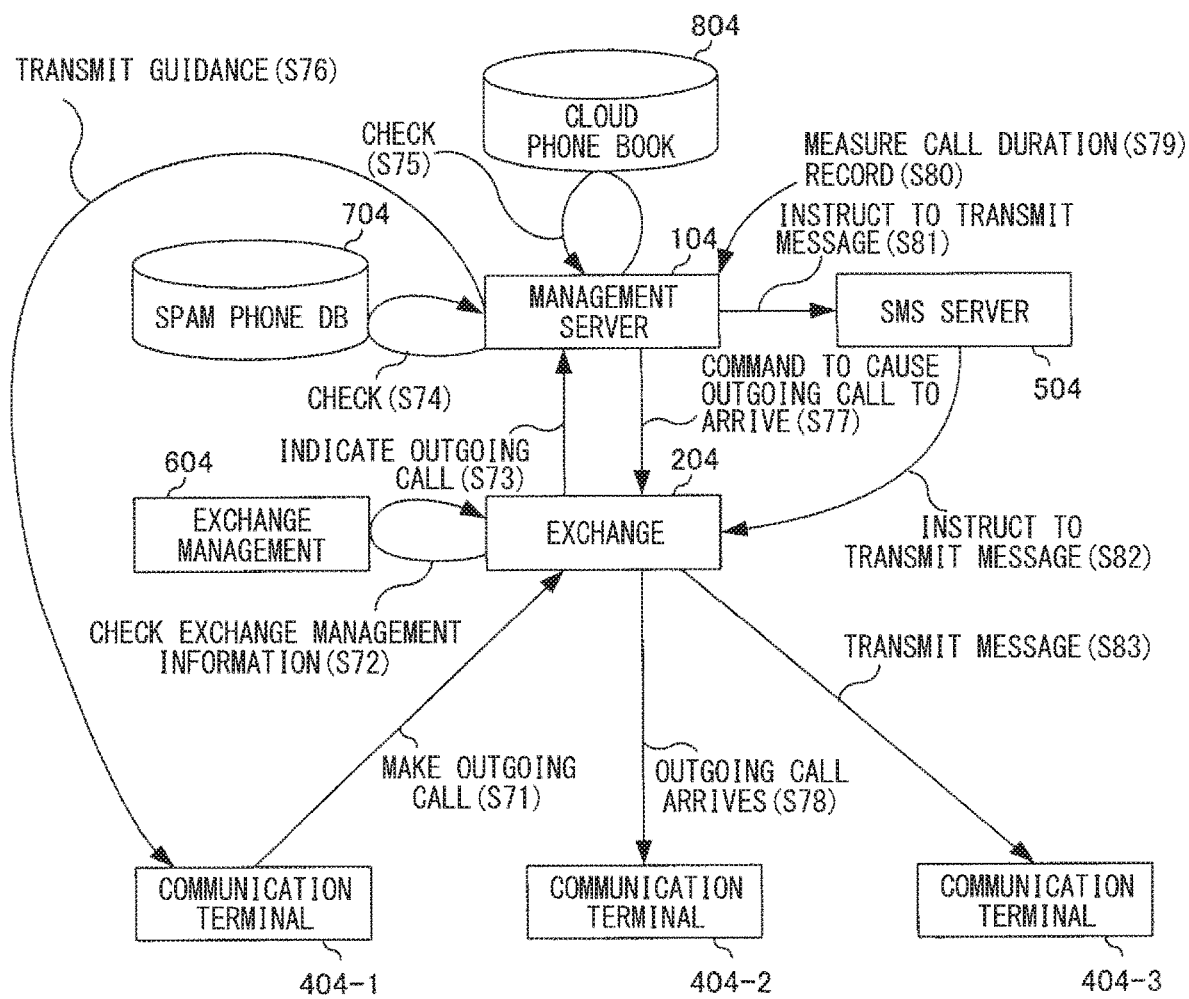
FIG. 20 is a view for explaining an example of a processing flow in a communication system shown in FIG. 18.

Hereinafter, the notification method in the communication system shown in FIG. 18 will be described. FIG. 20 is a view for explaining an example of a processing flow in the communication system shown in FIG. 18.

First, when the communication terminal 404-1 makes an outgoing call to the communication terminal 404-2 (Step S71), the exchange 204 checks exchange management information in the exchange management 604 (Step S72), and lets the management server 104 know that the outgoing call has been made (Step S73). In the management server 104, when the outgoing call detection unit 114 detects the outgoing call from the communication terminal 404-1 to the communication terminal 404-2, the spam phone number determination unit 174 determines whether the phone number of the communication terminal 404-1 is the spam phone number registered in advance in the spam phone DB 704 (Step S74). When the spam phone number determination unit 174 determines that the phone number of the communication terminal 404-1 is a phone number such as the spam phone number registered in advance in the spam phone DB 704, the connection control unit 124 disconnects the outgoing call. When the spam phone number determination unit 174 determines that the phone number of the communication terminal 404-1 is the spam phone number registered in advance in the spam phone DB 704, the connection control unit 124 may disconnect the outgoing call when the predetermined duration has elapsed since the phone call is started. Such a mechanism is a system in which a family or the like can recognize in real time that the phone call is a suspicious phone call such as a spam phone call during the phone call between the communication terminals, and the connection control unit 124 may disconnect the phone call.

On the other hand, when the spam phone number determination unit 174 determines that the phone number of the communication terminal 404-1 is not the spam phone number registered in advance in the spam phone DB 704, the registered phone number determination unit 184 determines whether the communication terminal 404-1 is the phone number registered in advance in the cloud phone book 804 (Step S75). When the registered phone number determination unit 184 determines that the phone number of the communication terminal 404-1 is not the phone number registered in advance in the cloud phone book 804, the guidance transmission unit 154 transmits the predetermined guidance to the communication terminal 404-1 (Step S76).

Next, the connection control unit 124 transmits a command to the exchange 204 to cause the outgoing call detected by the outgoing call detection unit 114 to arrive at the communication terminal 404-2 (Step S77). Then, the exchange 204 causes the outgoing call from the communication terminal 404-1 to arrive at the communication terminal 404-2 (Step S78).

After that, when a phone call is started between the communication terminal 404-1 and the communication terminal 404-2, the call duration measurement unit 134 measures a duration of the phone call (Step S79). The recording unit 194 records the phone call (Step S80). The phone call data recorded by the recording unit 194 is temporarily stored as a file.

When the duration measured by the call duration measurement unit 134 exceeds the preset duration before the phone call ends, the notification unit 144 instructs the SMS server 504 to transmit a message using the SMS (Step S81). Specifically, the notification unit 144 reads a phone number of the communication terminal 404-3 stored in association with the communication terminal 404-2 from the association storage unit 164, and instructs the SMS server 504 to transmit the message using the SMS to this phone number. This message includes a content that lets an owner of the communication terminal 404-3 know that an owner of the communication terminal registered in advance may be talking for a long time or may be receiving a spam phone call like "your family is talking for a long time" or "your family may be receiving a spam phone call". Note that the time set in advance is preferably the time required for a phone call that does not commonly complete with only simple contents, such as three minutes. This time set in advance can be set and changed by an input operation from the outside. When the notification unit 144 transmits the notification, it may notify the communication terminal 404-3 in real time of the originating phone number and the call duration measured by the call duration measurement unit 134.

The SMS server 504, which have been instructed to transmit the message, outputs, to the exchange 204, an instruction for transmitting the message using the SMS to the designated phone number (Step S82). Then, the exchange 204 transmits the message to the communication terminal 404-3 having the designated phone number (Step S83). The message to be transmitted may include link information indicating a storage location of a temporary storage folder of a recording file in which the recording unit 194 recorded the phone call.

After that, the communication terminal 404-3 outputs the transmitted message. This output may be output by a voice or may be displayed.

When the connection control unit 124 detects the end of the phone call, the recording unit 194 terminates the recording and stores the recorded call data as a file. This file can be reproduced from the communication terminal 404-3.

In this manner, when there is an outgoing call, and the phone number of the call originator of this outgoing call is the spam phone number registered in advance, the management server 104 disconnects the outgoing call, while when the phone number of the call originator of this outgoing call is neither the spam phone number nor the phone number registered in advance in the phone book, the management server 104 transmits the guidance to the call originator. Then, when the duration of the phone call between the originating communication terminal and the destination communication terminal exceeds the predetermined duration, the management server 104 transmits the notification to the communication terminal associated in advance with the destination communication terminal. The management server 104 records the phone call. This further prevents the processing load from increasing and can attempt to prevent the damage of the owner of the destination communication terminal from phone fraud from expanding.

Modified Example

The management server may change the notification destination according to the time and date such as the time of day or the day of the week when the duration measured by the call duration measurement unit exceeds the predetermined duration before the phone call ends. For example, the management server may transmit the notification to Mr. A in the daytime and transmit the notification to Mr. B in the nighttime. The management server may transmit the notification to Mr. C on weekdays and transmit the notification to Mr. D on holidays.

FIG. 21 is a view showing an example of an association between an incoming phone number and a notification destination phone number. As shown in FIG. 21, an incoming phone number, a time of day, and a notification destination phone number are associated with each other. This association may be, for example, one stored in the association storage unit 162 of the management server 102 shown in FIG. 11. In this case, the association is registered in advance. When there is an outgoing call to the phone number registered as the incoming phone number, the notification destination phone number associated with the time of day when the duration measured by the call duration measurement unit exceeds the predetermined duration before the phone call ends becomes the destination phone number to which the notification is transmitted. For example, as shown in FIG. 21, the incoming phone number "03-○○○○-ΔΔΔΔ", the time of day "7: 00-19: 00", the notification destination phone number "03-ΔΔΔΔ-○○○○" are associated with each other. Using this association, when there is an outgoing call to the phone number of "03-□□□□-ΔΔΔΔ", the notification unit transmits a message using the SMS to the phone number of "03-□□□□-ΔΔΔΔ" if the time of day when the duration measured by the call duration measurement unit exceeds the predetermined duration before the phone call ends is between 7:00 and 19:00. Moreover, the incoming phone number "03-○○○○-ΔΔΔΔ", the time of day "19: 00 to 7: 00", and the notification destination phone number "03-xxxx-☐☐☐☐" are associated with each other. Using this association, when there is an outgoing call to the phone number of "03-☐☐☐☐-ΔΔΔΔ", the notification unit transmits a message using the SMS to the phone number of "03-xxxx-☐☐☐☐" if the time of day when the duration measured by the call duration measurement unit exceeds the predetermined duration before the phone call ends is between 19:00 and 7:00. Note that the number of notification destination phone numbers associated with the time of day may not be only one and instead may be plural.

The management server may change the notification destination according to the type of the phone or the phone number system such as whether the phone number of the call originator is withheld or not or whether the phone number is a landline phone number or the cellular phone number. For example, the management server may transmit the notification to Mr. A when the originating phone number is not withheld, while the management server may transmit the notification to Mr. B when the originating phone number is withheld. Further, the management server may transmit the notification to Mr. C when the originating phone number is a phone number of a landline phone, and transmits the notification to Mr. D when the originating phone number is a phone number of a cellular phone.

Hereinafter, a specific notification method according to a registration status of the originating phone number will be described below.

FIG. 22 is a view showing an example of processing of notification from the management server 104 according to the registration status of the originating phone number.

First, when the phone number of the originating communication terminal 404-1 is registered in the cloud phone book 804, the management server 104 does not transmit, to the communication terminal 404-2, information for the communication terminal 404-2 which is the destination of the outgoing call made by the communication terminal 404-1 to display it. Further, the management server 104 does not transmit the notification to the communication terminal 404-3 associated with the communication terminal 404-2.

When the phone number of the originating communication terminal 404-1 is neither registered in the cloud phone book 804 nor registered in the spam phone DB 704, the management server 104 transmits, to the communication terminal 404-2, information for the communication terminal 404-2, which is the destination of the phone call made by the communication terminal 404-1, to display a pop-up. For example, this pop-up display may be a message for making an alert such as "this call may be a fraud phone, please beware". At this time, when an owner of the communication terminal 404-2 does not answer the incoming call (the communication terminal 404-2 does not become off-hook), the management server 104 does not transmit the notification to the communication terminal 404-3 associated with the communication terminal 404-2. On the other hand, when the owner of the communication terminal 404-2 answers the incoming call (the communication terminal 404-2 becomes off-hook), the management server 104 transmits the notification to the communication terminal 404-3 associated with the communication terminal 404-2. This notification is a notification that enables the owner of the communication terminal 404-3 to recognize that the communication terminal 404-2 has received the incoming call. For example, this notification may be for the communication terminal 404-3 to display a message such as "there has been an incoming call from AA on Mr. ○○'s cellular phone" or "there has been an incoming call from AA on Mr. ○○'s cellular phone. Mr. 00 was talking to someone not registered in the phone book for one minute". At this time, information for displaying the date and time when the incoming call is answered and the phone number of the communication terminal 404-2 may be included in this notification. Note that the management server 104 may be configured to transmit the notification for displaying an alert message after the phone call ends.

When the phone number of the originating communication terminal 404-1 is not registered in the cloud phone book 804 and is registered in the spam phone DB 704, the management server 104 transmits, to the communication terminal 404-2, information for the communication terminal 404-2, which is the destination of the phone call made by the communication terminal 404-1, to display a pop-up. The pop-up display may be, for example, a message for making an alert such as "this phone call is a fraud phone, please beware". In addition, the management server 104 transmits the notification to the communication terminal 404-3 associated with the communication terminal 404-2. This notification is a notification to enable the owner of the communication terminal 404-3 to recognize that the communication terminal 404-2 has received an incoming call, which is considered as a spam phone call. For example, this notification may be for the communication terminal 404-3 to display a message such as "this is an alert message as there has been an outgoing call from a spam phone. Please check immediately", "there has been a talk with a spam phone agent for 10 seconds, this is an alert message", and "there has been a talk with a spam phone agent for 50 seconds, this is another alert message". At this time, information for displaying the date and time when the incoming call is answered and the phone number of the communication terminal 404-2 may be included in this notification. Note that the management server 104 may be configured to transmit the notification to display an alert message after the phone call ends.

IoT (Internet of Things) technology may be used for the notification. For example, when the server 104 transmits the message at the time of making an outgoing call or receiving an incoming call, a lighting device and an IoT device connected to the server 104 may blink or a text such as "please beware" may be displayed on a liquid crystal screen of the IoT device or tablet. Further, when the server 104 transmits the message while the phone call continues for a preset duration or longer, the blinking speed of the lighting device, the IoT device, or the like increases, or a text such as "please beware" may be displayed on the liquid crystal screen of the IoT device or tablet. When the server 104 transmits the message when the phone call continues for the preset duration or longer, the IoT device or the like may output a guidance sound or an alarm sound, or a message such as "please beware" may be displayed on the liquid crystal display of the IoT device or tablet.

The transmission of the message using the e-mail or SMS has been described as an example of means used for the notification. However, other communication tools may be used.

In this way, in the present invention, when the duration of the phone call between the communication terminals exceeds the predetermined duration, the notification is transmitted to another communication terminal. This effectively prevents a person who usually talks on the phone with particular persons or who does not usually talk on the phone for a long time from being suffered from phone fraud after talking with someone who suddenly makes an outgoing call to the person for a specified time or longer and then the person is deceived. Furthermore, as the function that puts a load on the processing of the voice recognition function and the like is not used, it is possible to effectively prevent an increase in the processing load.

In the above-described embodiments, for example, phone calls from strangers are handled. However, the present invention can handle phone calls made to strangers. That is, the present invention can be applied to the case when the notification is transmitted to the communication terminal associated with the originating communication terminal instead of the communication terminal associated with the destination communication terminal. Hereinafter, the sixth embodiment and the seventh embodiment will be described in detail.

Sixth Embodiment

Figure 23:
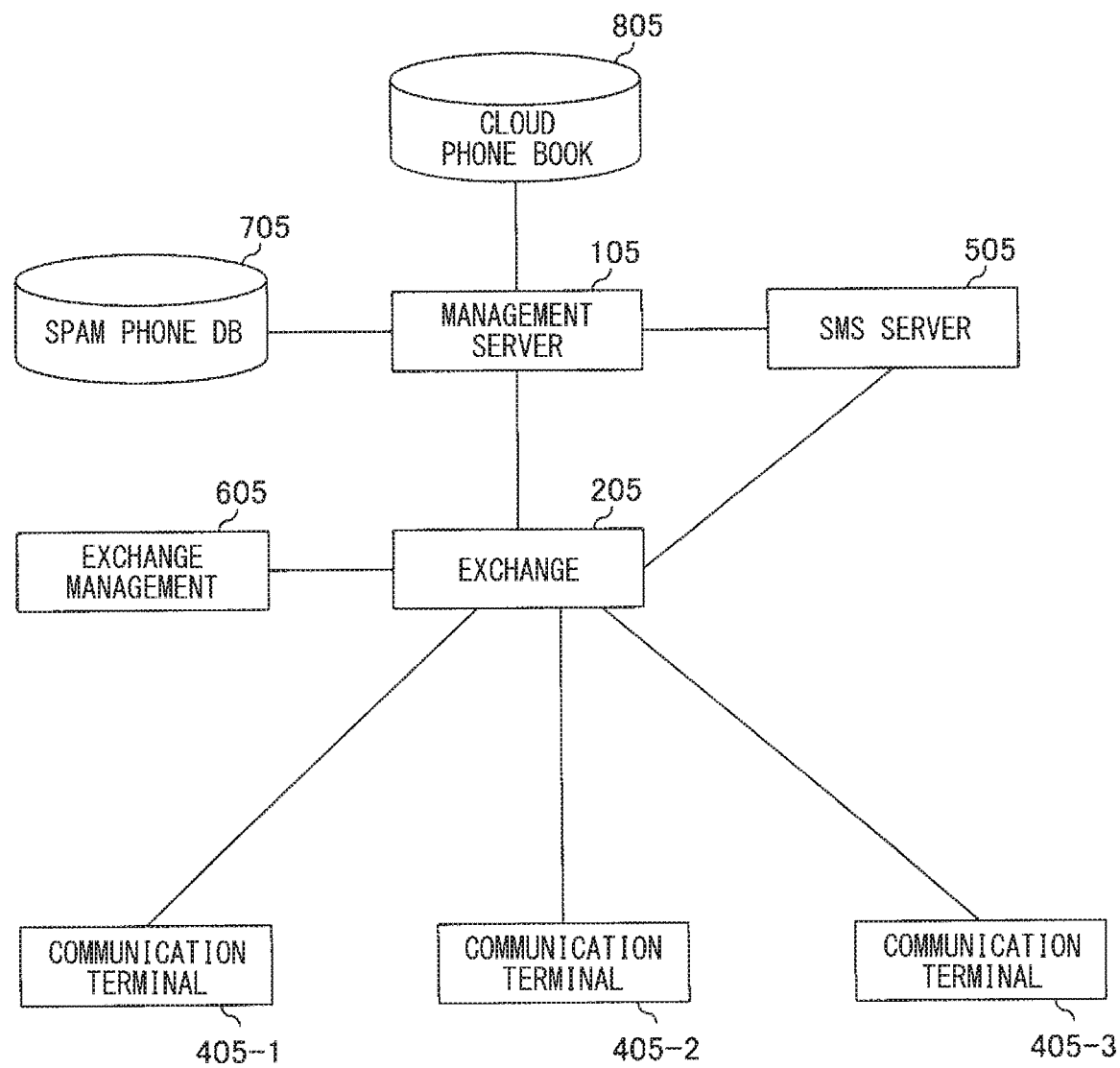
FIG. 23 is a view showing a management server according to a sixth embodiment of the present invention.

FIG. 23 is a view showing a management server according to a sixth embodiment of the present invention.

As shown in FIG. 23, a communication system in which a management server 105 according to this embodiment is provided includes the management server 105, an exchange 205, an SMS server 505, and communication terminals 405-1 to 405-3, an exchange management 605, a spam phone DB 705, and a cloud phone book 805. In this embodiment, the SMS server 505 is disposed. However, like the second embodiment, the mail server 301 may be disposed. The management server 105 is connected to the exchange 205, the SMS server 505, the spam phone DB 705, and the cloud phone book 805. The exchange 205 is connected to the management server 105, the communication terminals 405-1 to 405-3, the SMS server 505, and the exchange management 605.

The communication terminals 405-1 to 405-3 are communication apparatuses capable of transmitting and receiving messages using phone, e-mail, and SMS. Further, the communication terminals 405-1 to 405-3 may be fixed apparatuses or movable portable apparatuses. FIG. 23 shows an example where there are three communication terminals. This configuration is employed for convenience of explanation, which will be given later. However, the number of the communication terminals is not limited to this number.

The exchange 205 is a phone exchange which performs general circuit exchange. The SMS server 505 is a server apparatus used for general message transmission/reception using an SMS. When the SMS server 505 receives an instruction to transmit a message to the designated phone number from the management server 105, the SMS server 505 outputs, to the exchange 205, an instruction to transmit a message using the SMS to the designated phone number. When the mail server 301 as in the second embodiment is included in place of the SMS server 505, the mail server 301 transmits an e-mail to the designated e-mail address in response to an instruction to transmit a message to a designated e-mail address from the management server 105.

The exchange management 605 manages the exchange 205. The spam phone DB 705 stores pre-registered spam phone numbers. The spam phone number here is, for example, the phone number of the call originator who has made an outgoing call to a victim who has suffered from phone fraud or who has been about to be scammed. Such a phone number is registered in advance in the spam phone DB 705 according to a report from this victim.

The cloud phone book 805 is a database present on a communication network to which the management server 105 is connected, and corresponds to a common phone book. That is, the cloud phone book is a list of phone numbers registered for each of the communication terminals 405-1 to 405-3. Commonly, this list is set by the owners of the communication terminals 405-1 to 405-3 through an input operation from the outside. This list includes phone numbers that the owners of the communication terminals 405-1 to 405-3 may usually contact such as family, relatives, friends, workplaces, schools, etc. That is, there is a high possibility that the phone number not registered in the cloud phone book 805 is the phone number of a person unknown to the owners of the communication terminals 405-1 to 405-3.

Figure 24:
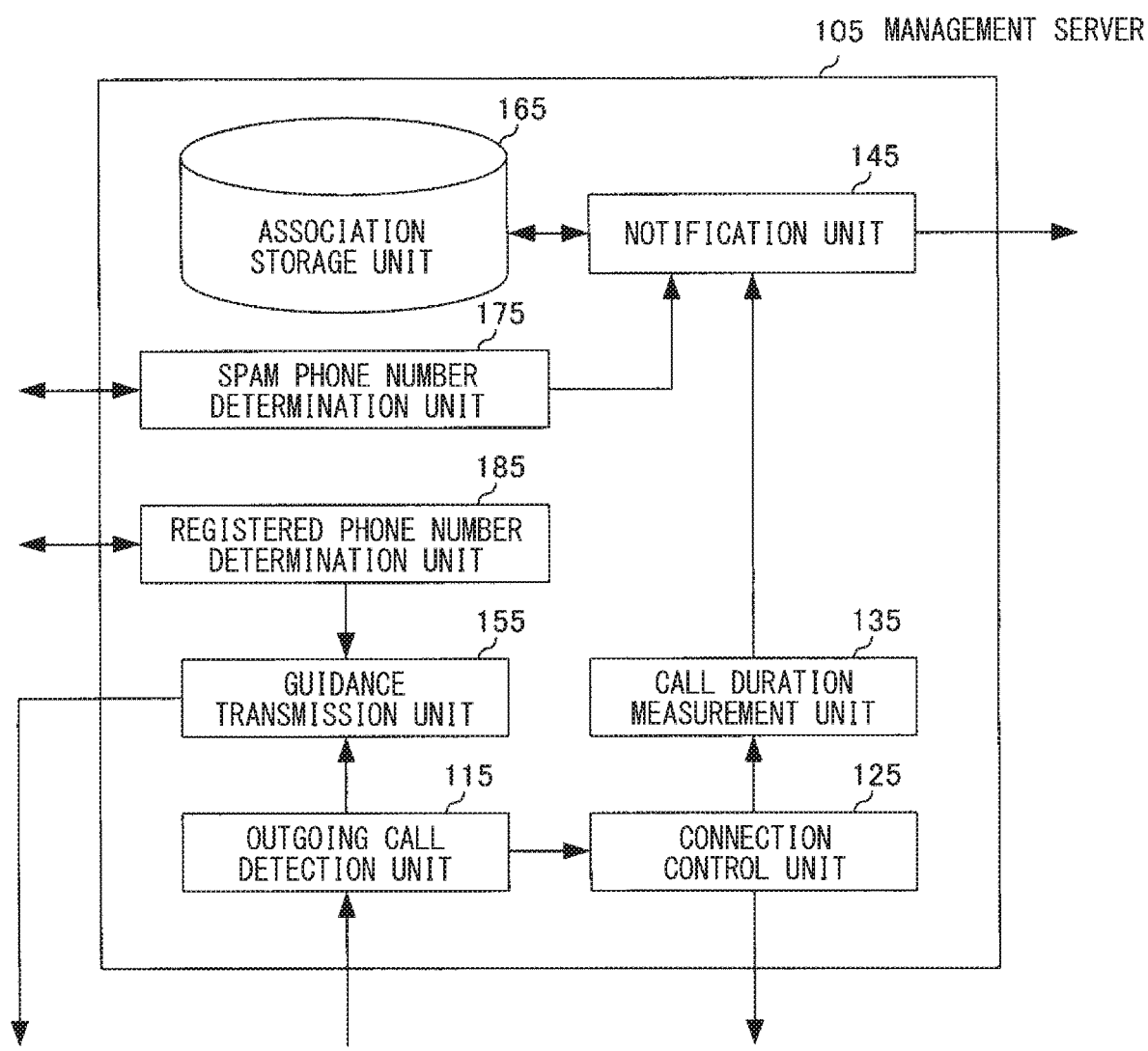
FIG. 24 is a view showing an example of an internal configuration of the management server shown in FIG. 23.

FIG. 24 is a view showing an example of an internal configuration of the management server 105 shown in FIG. 23. As shown in FIG. 24, the management server 105 shown in FIG. 23 includes an outgoing call detection unit 115, a connection control unit 125, a call duration measurement unit 135, a notification unit 145, a guidance transmission unit 155, an association storage unit 165, a spam phone number determination unit 175, and a registered phone number determination unit 185. Note that FIG. 24 shows an example of major components related to this embodiment among components of the management server 105 shown in FIG. 23.

The outgoing call detection unit 115 detects an outgoing call from the communication terminal 405-1 to the communication terminals 405-2 and 405-3 via the exchange 205. Further, the outgoing call detection unit 115 detects an outgoing call from the communication terminal 405-2 to the communication terminals 405-1 and 405-3 via the exchange 205. Furthermore, the outgoing call detection unit 115 detects an outgoing call from the communication terminal 405-3 to the communication terminals 405-1 and 405-2 via the exchange 205. In the following description, an example where the communication terminal 405-1 makes an outgoing call to the communication terminal 405-2 will be described.

When the outgoing call detection unit 115 detects an outgoing call, the spam phone number determination unit 175 determines whether the phone number of the communication terminal that is the call destination of the outgoing call, which is detected by the outgoing call detection unit 115, is the spam phone number registered in advance in the spam phone DB 705.

That is, when the outgoing call detection unit 115 detects the outgoing call from the communication terminal 405-1 to the communication terminal 405-2, the spam phone number determination unit 175 determines whether the phone number of the communication terminal 405-2 is registered in advance in the spam phone DB 705.

The registered phone number determination unit 185 determines whether the phone number of the communication terminal that is the destination of the outgoing call, which is detected by the outgoing call detection unit 115, is the phone number registered in advance in the cloud phone book 805.

That is, when the outgoing call detection unit 115 detects the outgoing call from the communication terminal 405-1 to the communication terminal 405-2, the registered phone number determination unit 185 determines whether the phone number of the communication terminal 405-2 is registered in advance in the cloud phone book 805.

When the outgoing call detection unit 115 detects an outgoing call from the communication terminal 405-1, the guidance transmission unit 155 transmits the predetermined guidance to the communication terminal 405-1. This guidance is, for example, a message that alerts the owner of the originating communication terminal such as "please beware of phone fraud". When the spam phone number determination unit 175 determines that the phone number of the communication terminal that is the destination of the outgoing call, which is detected by the outgoing call detection unit 115, is the spam phone number registered in advance in the spam phone DB 705, the guidance transmission unit 155 may transmit the predetermined guidance to the communication terminal 405-1 that has made the outgoing call. This guidance may be any message as long as it alerts the owner of the originating communication terminal, for example, "calling to a stranger, please beware". When the spam phone number determination unit 175 determines that the phone number of the communication terminal that is the destination of the outgoing call, which is detected by the outgoing call detection unit 115, is the spam phone number registered in advance in the spam phone DB 705, the guidance transmission unit 155 may transmit the predetermined guidance to the destination communication terminal 405-2 after the connection control unit 125 causes the outgoing call to arrive at the destination communication terminal 405-2. This guidance is, for example, a message of an alert such as "there is a possibility to notify this call to a family member/friend of the caller" and "this phone call is being recorded". When the registered phone number determination unit 185 determines that the phone number of the communication terminal that is the destination of the outgoing call, which is detected by the outgoing call detection unit 115, is not the phone number registered in advance in the cloud phone book 805, the guidance transmission unit 155 may transmit the predetermined guidance to the communication terminal 405-1 that has made the outgoing call. This guidance may be any message as long as it alerts the owner of the originating communication terminal, for example, "calling to a stranger, please beware". When the spam phone number determination unit 185 determines that the phone number of the communication terminal that is the destination of the outgoing call, which is detected by the outgoing call detection unit 115, is not the phone number registered in advance in the cloud phone book 805, the guidance transmission unit 155 may transmit the predetermined guidance to the destination communication terminal 405-2 after the connection control unit 125 causes the outgoing call to arrive at the destination communication terminal 405-2. This guidance is, for example, a message of an alert such as "there is a possibility to notify this call to a family member/friend of the caller" and "this phone call is being recorded".

The connection control unit 125 causes an outgoing call from the communication terminal 405-1 detected by the outgoing call detection unit 115 to arrive at the communication terminal 405-2, which is a call destination, via the exchange 205. At this time, when the guidance transmission unit 155 transmits the guidance to the communication terminal 405-1, the connection control unit 125 may cause the outgoing call to arrive at the communication terminal 405-2.

The call duration measurement unit 135 measures a duration of a phone call when the phone call is started between the communication terminal 405-1 as a call originator and the communication terminal 405-2 as a call destination.

When the spam phone number determination unit 175 determines that the phone number of the communication terminal that is the destination of the outgoing call, which is detected by the outgoing call detection unit 115, is the spam phone number registered in advance in the spam phone DB 705, the notification unit 145 transmits the predetermined notification to the communication terminal 405-3. Further, when the registered phone number determination unit 185 determines that the phone number of the communication terminal that is the destination of the outgoing call, which is detected by the outgoing call detection unit 115, is not the phone number registered in advance in the cloud phone book 805, the notification unit 145 transmits the predetermined notification to the communication terminal 405-3. At this time, the notification unit 145 transmits the notification to the communication terminal 405-3 stored in association with the communication terminal 405-1 in the association storage unit 165. This notification includes, for example, a content informing the communication terminal 405-3 that there has been an outgoing call on the spam phone, such as "there has been an outgoing call from your family's phone to a spam phone". The notification unit 145 transmits the predetermined notification to the communication terminal 405-3 when the duration measured by the call duration measurement unit 135 exceeds the preset duration before the phone call ends. At this time, when the duration measured by the call duration measurement unit 135 exceeds the preset duration before the phone call ends, the notification unit 145 transmits the notification to the communication terminal 405-3, which is stored in association with the communication terminal 405-1 in the association storage unit 165. When the notification unit 145 transmits the notification, it reads out a phone number of the communication terminal 405-3 from the association storage unit 165, and instructs the SMS server 505 to transmit a message using the SMS to the phone number. Further, when the mail server 301 as in the second embodiment is included in place of the SMS server 505, the notification unit 145 reads out an e-mail address of the communication terminal 405-3 from the association storage unit 165, and instructs the mail server 301 to transmit the e-mail to the e-mail address. The association storage unit 165 stores in advance a phone number of the originating communication terminal in association with a phone number of the communication terminal to which the notification unit 145 transmits the notification. Alternatively, the association storage unit 165 may store in advance the phone number of the originating communication terminal in association with an e-mail address of the communication terminal to which the notification unit 145 transmits the notification.

FIG. 25 is a view showing an example of the association between an outgoing phone number and a notification destination phone number stored in the association storage unit 165 shown in FIG. 24. As shown in FIG. 25, the association storage unit 165 shown in FIG. 24 stores an incoming phone number and a notification destination phone number in association with each other. This association is registered in advance. When there is an outgoing call to the phone number registered as the outgoing phone number, the notification destination phone number associated with this phone number becomes the notification destination phone number to which the notification unit 145 transmits the notification. For example, as shown in FIG. 25, the outgoing phone number "03-○○○○-△△△△" and the notification destination phone number "03-○○○○-△△△△" are associated with each other. Using this association, when there is an outgoing call from the phone number of "03-○○○○-△△△△", the notification unit 145 transmits a message using the SMS to the phone number of "03-△△△△-○○○○". Further, the outgoing phone number "04-□□□-xxxx" is associated with the notification destination phone number "04-xxxx-□□□□". Using this association, when there is an outgoing call from the phone number "04-□□□-xxxx", the notification unit 145 transmits a message using the SMS to the phone number of "04-xxxx-□□□". Note that the number of notification destination phone numbers associated with the outgoing phone number may not be only one and instead may be plural. In addition, this association can be changed from the outside.

FIG. 26 is a view showing an example of the associations between outgoing phone numbers and notification destination e-mail addresses stored in the association storage unit 165 shown in FIG. 24. As shown in FIG. 26, the association storage unit 165 shown in FIG. 24 stores an incoming phone number and a notification destination phone number in association with each other. This association is registered in advance. When there is an outgoing call from the phone number registered as the outgoing phone number, the notification destination e-mail address associated with this phone number becomes the notification destination e-mail address to which the notification unit 145 transmits the notification. For example, as shown in FIG. 26, the outgoing phone number "03-○○○○-ΔΔΔΔ" and the notification destination e-mail address "aaa@bbb.ne.jp" are associated with each other. Using this association, when there is an outgoing call from the phone number of "03-○○○○-ΔΔΔΔ", the notification unit 145 transmits a predetermined e-mail to the e-mail address of "aaa@bbb.ne.jp". Further, the outgoing phone number "04-□□□□-xxxx" is associated with the notification destination e-mail address "ccc@ddd.ne.jp". Using this association, when there is an outgoing call from the phone number "04-□□□□-xxxx", the notification unit 145 transmits a predetermined e-mail to the e-mail address of "ccc@ddd.ne.jp". The number of notification destination e-mail addresses associated with the outgoing phone number is not necessarily one and may be plural. In addition, this association can be changed from the outside.

Figure 27:
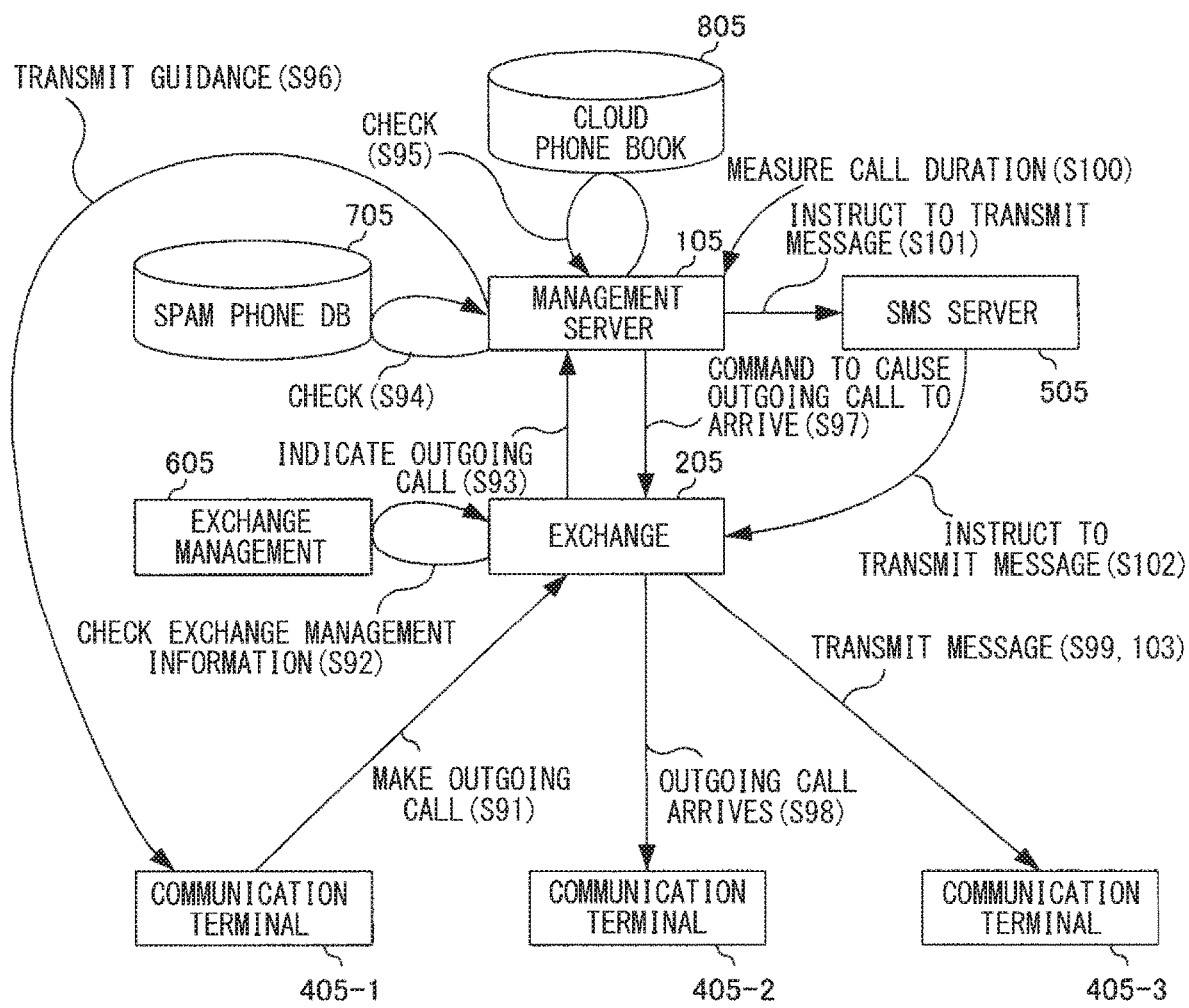
FIG. 27 is a view for explaining an example of a processing flow in a communication system shown in FIG. 23.

Hereinafter, the notification method in the communication system shown in FIG. 23 will be described. FIG. 27 is a view for explaining an example of a processing flow in the communication system shown in FIG. 23. The processing described with reference to FIG. 27 is processing when the phone number of the communication terminal 405-2 is not registered in the cloud phone book 805 and is the spam phone number registered in advance in the spam phone DB 705.

First, when the communication terminal 405-1 makes an outgoing call to the communication terminal 405-2 (Step S91), the exchange 205 checks exchange management information in the exchange management 605 (Step S92), and lets the management server 105 know that the outgoing call has been made (Step S93). In the management server 105, when the outgoing call detection unit 115 detects the outgoing call from the communication terminal 405-1 to the communication terminal 405-2, the spam phone number determination unit 175 determines whether the phone number of the communication terminal 405-2 is the spam phone number registered in advance in the spam phone DB 705 (Step S94). Further, the registered phone number determination unit 185 determines whether the phone number of the communication terminal 405-2 is the phone number registered in advance in the cloud phone book 805 (Step S95). The guidance transmission unit 155 transmits predetermined guidance to the communication terminal 405-1 (Step S96). At this point, the guidance transmission unit 155 may not transmit the predetermined guidance to the communication terminal 405-1.

Next, the connection control unit 125 transmits a command to the exchange 205 to cause the outgoing call detected by the outgoing call detection unit 115 to arrive at the communication terminal 405-2 (Step S97). Then, the exchange 205 causes the outgoing call from the communication terminal 405-1 to arrive at the communication terminal 405-2 (Step S98). The notification unit 145 transmits a message using the SMS to the communication terminal 405-3 via the SMS server 505 and the exchange 205 (Step S99). Alternatively, when a mail server is included, the notification unit 145 transmits an e-mail to the communication terminal 405-3 via the mail server. This message or e-mail includes a content informing the communication terminal 405-3 that there has been an outgoing call from the communication terminal 405-1 to the spam phone.

After that, when a phone call is started between the communication terminal 405-1 and the communication terminal 405-2, the call duration measurement unit 135 measures a duration of the phone call (Step S100). Next, when the duration measured by the call duration measurement unit 135 exceeds the preset duration before the phone call ends, the notification unit 145 instructs the SMS server 505 to transmit a message using the SMS (Step S101). Specifically, the notification unit 145 reads a phone number of the communication terminal 405-3 stored in association with the communication terminal 405-1 from the association storage unit 165, and instructs the SMS server 505 to transmit the message using the SMS to this phone number. Alternatively, when a mail server is included, the notification unit 145 reads an e-mail address of the communication terminal 405-3 stored in association with the communication terminal 405-1 from the association storage unit 165, and instructs the mail server to transmit an e-mail to this e-mail address. This message includes a content that lets an owner of the communication terminal 405-3 know that an owner of the communication terminal registered in advance may be talking for a long time or may be receiving a spam phone call like "your family is talking for a long time" or "your family may be receiving a spam phone call". Note that the time set in advance is preferably the time required for a phone call that does not commonly complete with only simple contents, such as three minutes. This time set in advance can be set and changed by an input operation from the outside. Further, this time may be changed according to the time of day at which the phone call is being made. In other words, associations between a plurality of times of day and a plurality of times (thresholds) may be created, and a threshold associated with the time of day at which a phone call is made may be used. For example, a threshold of "5 minutes" may be set in the time of day from 14:00 to 15:00, and a threshold of "3 minutes" may be set in the time of day other than 14:00 to 15:00. Thus, when the time at which the call is being made is 14:30, the threshold of "5 minutes" may be used.

When the notification unit 145 transmits the notification, it may notify the communication terminal 405-3 in real time of the destination phone number and the duration of the phone call measured by the call duration measurement unit 135.

The SMS server 505, which have been instructed to transmit the message, outputs, to the exchange 205, an instruction for transmitting the message using the SMS to the designated phone number (Step S102). Then, the exchange 205 transmits the message to the communication terminal 405-3 having the designated phone number (Step S103). After that, the communication terminal 405-3 outputs the transmitted message. This output may be output by a voice or may be displayed. This also applies to the notification using an e-mail.

As described above, when there is an outgoing call, and the phone number of the destination of the outgoing call is the spam phone number registered in advance or is not the phone number registered in advance in the phone book, the management server 105 transmits the guidance to the call originator. When the duration of the phone call between the originating communication terminal and the destination communication terminal exceeds the predetermined duration, the management server 105 transmits the notification to the communication terminal associated in advance with the originating communication terminal. This further prevents the processing load from increasing and can attempt to prevent the damage of the owner of the destination communication terminal from phone fraud from expanding.

The notification may include the location information indicating a current location of the communication terminal 405-1. The communication terminal 405-1 uses a GPS (Global Positioning System) function included in the communication terminal 405-1 to acquire the location information indicating the current location of the communication terminal 405-1. The method by which the communication terminal 405-1 obtains the location information is not limited to the one using the GPS function and instead may be acquired from a wireless base station connected to the communication terminal 405-1 as long as the information indicating the location of the communication terminal 405-1 can be acquired. Examples of other methods include a method of acquiring the location information using WiFi, BLE, Bluetooth or infrared communication function, and a method of acquiring the location information from Beacon signals, and a method of acquiring the location information using a Cell-ID.

The communication terminal 405-1 transmits the acquired location information to the management server 105 via the exchange 205. At this time, the communication terminal 405-1 transmits date and time information indicating the date and time when the location information is acquired in the location information. When the notification unit 145 of the management server 105 instructs the SMS server 505 to transmit the message using the SMS, it instructs the SMS server 505 to transmit the location information transmitted from the communication terminal 405-1 in the message. At this time, the notification unit 145 may transmit, to the mail server 505, URL information of a site that can acquire map information including the location information and may instruct the SMS server 505 to transmit the URL information in the message instead of transmitting the location information to the SMS server 505. The URL information may have various authentications such as phone number authentication and may have restrictions such that the URL can be accessed (can be viewed) only by the receiver of the massage or only by the receiver of the massage and his/her family. Further alternatively, the notification unit 145 may transmit, to the SMS server 505, information that enables the location information to be displayed on a map application that the communication terminal 405-3 can activate, and instruct the SMS server 505 to transmit this information in the SMS message.

Further, the communication terminal 405-1 may transmit a plurality of pieces of the location information acquired in a time series at predetermined timings to the management server 105 via the exchange 205. In this case, the notification unit 145 of the management server 105 instructs the SMS server 505 to transmit the plurality of pieces of location information transmitted from the communication terminal 405-1 in the SMS message. When the SMS server 505 transmits the plurality of pieces of location information in SMS message, the communication terminal 405-3 can output information indicating how the communication terminal 405-1 has moved (e.g., a moving route displayed on the map).

Furthermore, the notification unit 145 may instruct the SMS server 505 to transmit phone call information (the phone number of the communication terminal 405-2, the call duration, call history such as the number of times and the times at which the communication terminal 405-1 makes phone calls to the phone number of the communication terminal 405-2) in the SMS message. The SMS server 505 transmits the SMS message including the notification and the location information to the communication terminal 405-3.

The communication terminal 405-3 which have received the location information of the communication terminal 405-1 together with the notification displays the received SMS message and the location information based on an operation of the owner of the communication terminal 405-3.

FIG. 28 is a view showing a first display form of the location information displayed by the communication terminal 405-3. As shown in FIG. 28, the communication terminal 405-3 displays the location information of the communication terminal 405-1 together with the date and time when the location information is acquired, the phone number of the phone call partner, and phone call history and phone call partners in the past.

The timing at which the communication terminal 405-1 transmits the location information to the management server 105 may be after the phone call ends. In this case, the location information acquired by the communication terminal 405-1 is location information indicating the location of the communication terminal 405-1 after the phone call ends. The management server 105 transmits the location information to the SMS server 505 at a timing different from the notification. Then, the SMS server 505 transmits the location information transmitted from the management server 105 to the communication terminal 405-3. The communication terminal 405-3 which have received the location information of the communication terminal 405-1 displays the received SMS message and the location information based on an operation of the owner of the communication terminal 405-3.

Figure 29:
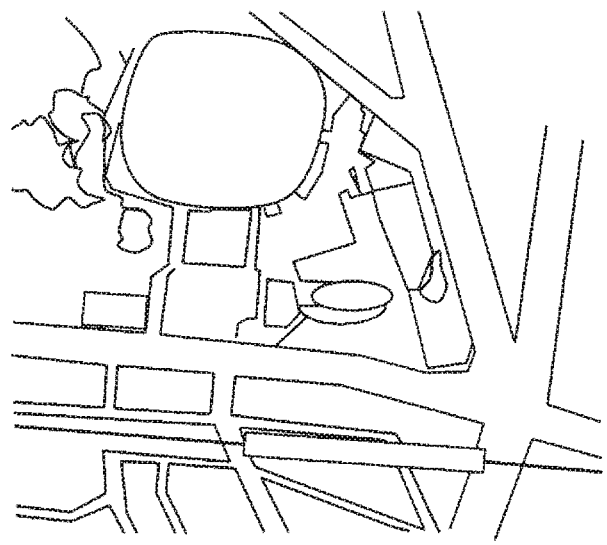
FIG. 29 is a view showing a second display form of the location information displayed by the communication terminal shown in FIG. 23.

FIG. 29 is a view showing a second display form of the location information displayed by the communication terminal 405-3. As shown in FIG. 29, the communication terminal 405-3 displays the location information of the communication terminal 405-1 together with the date and time when the location information is acquired, the phone number of the phone call partner, and phone call history and phone call partners in the past.

As described above, when the SMS server 505 transmits the plurality of pieces of location information in the e-mail, the communication terminal 405-3 can output the information indicating how the communication terminal 405-1 has moved.

Figure 30:
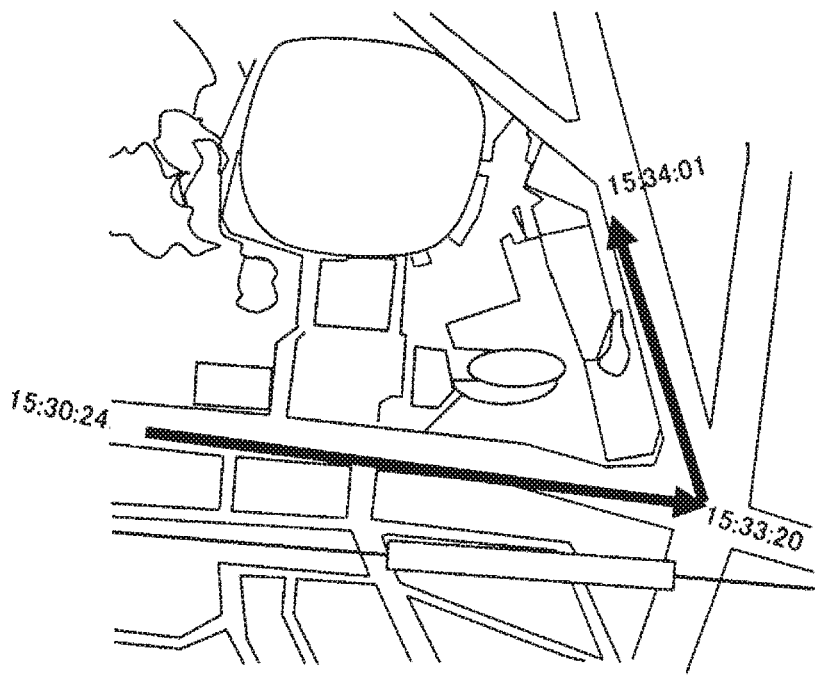
FIG. 30 is a view showing a third display form of the location information displayed by the communication terminal shown in FIG. 23.

FIG. 30 is a view showing a third display form of the location information displayed by the communication terminal 405-3. As shown in FIG. 30, the communication terminal 405-3 displays the plurality of pieces of location information acquired by the communication terminal 405-1 together with the date and time when the location information is acquired, the phone number of the phone call partner, and phone call history and phone call partners in the past.

Note that the communication terminal 405-3 is not limited to the one possessed by the family or relatives of the owner possessing the communication terminal 405-1 but may be a communication apparatus installed in a facility for conducting business related to police and crime prevention.

Further, in this embodiment, an example in which the notification is transmitted using an SMS message has been described. However, the notification may be transmitted using a postal mail or facsimile, or the above-described e-mail.

Seventh Embodiment

Figure 31:
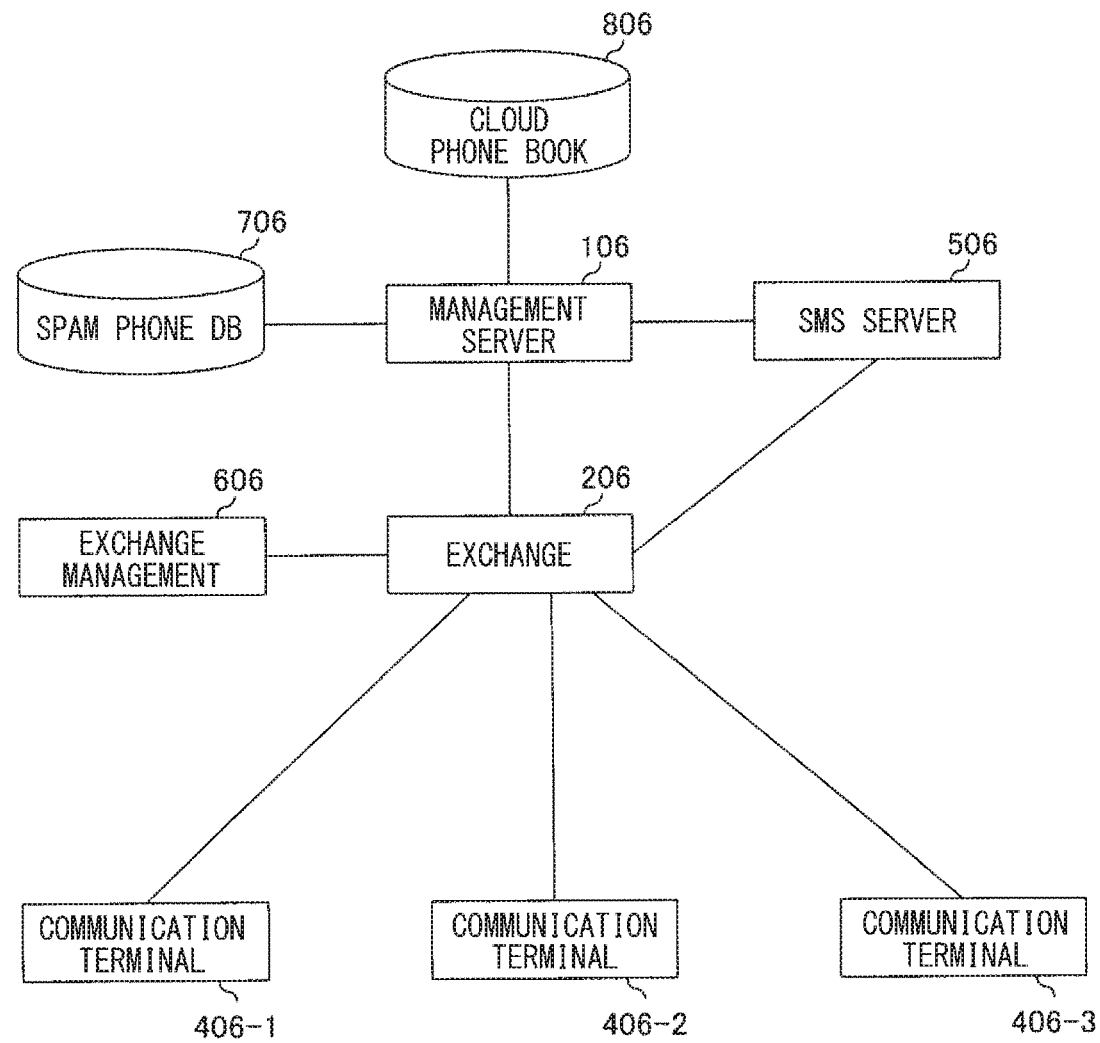
FIG. 31 is a view showing a management server according to a seventh embodiment of the present invention.

FIG. 31 is a view showing a management server according to a seventh embodiment of the present invention.

As shown in FIG. 31, a communication system in which a management server 106 according to this embodiment is provided includes the management server 106, an exchange 206, an SMS server 506, and communication terminals 406-1 to 406-3, an exchange management 606, a spam phone DB 706, and a cloud phone book 806. In this embodiment, the SMS server 506 is disposed. However, like the second embodiment, the mail server 301 may be disposed. The management server 106 is connected to the exchange 206, the SMS server 506, the spam phone DB 706, and the cloud phone book 806. The exchange 206 is connected to the management server 106, the communication terminals 406-1 to 406-3, the SMS server 506, and the exchange management 606.

The communication terminals 406-1 to 406-3 are communication apparatuses capable of transmitting and receiving messages using phone, e-mail, and SMS. Further, the communication terminals 406-1 to 406-3 may be fixed apparatuses or movable portable apparatuses. FIG. 31 shows an example where there are three communication terminals. This configuration is employed for convenience of explanation, which will be given later. However, the number of the communication terminals is not limited to this number.

The exchange 206 is a phone exchange which performs general circuit exchange. The SMS server 506 is a server apparatus used for general message transmission/reception using an SMS.

When the SMS server 506 receives an instruction to transmit a message to the designated phone number from the management server 106, the SMS server 506 outputs, to the exchange 206, an instruction to transmit a message using the SMS to the designated phone number. When the mail server 301 as in the second embodiment is included in place of the SMS server 506, the mail server 301 transmits an e-mail to the designated e-mail address in response to an instruction to transmit a message to a designated e-mail address from the management server 106.

The exchange management 606 manages the exchange 206. The spam phone DB 706 stores pre-registered spam phone numbers. The spam phone number here is, for example, the phone number of the call originator who has made an outgoing call to a victim who has suffered from phone fraud or who has been about to be scammed. Such a phone number is registered in advance in the spam phone DB 706 according to a report from this victim. The cloud phone book 806 is a database present on a communication network to which the management server 106 is connected, and corresponds to a common phone book. That is, the cloud phone book is a list of phone numbers registered for each of the communication terminals 406-1 to 406-3. Commonly, this list is set by the owners of the communication terminals 406-1 to 406-3 through an input operation from the outside. This list includes phone numbers that the owners of the communication terminals 406-1 to 406-3 may usually contact such as family, relatives, friends, workplaces, schools, etc. That is, there is a high possibility that the phone number not registered in the cloud phone book 806 is the phone number of a person unknown to the owners of the communication terminals 406-1 to 406-3.

Figure 32:
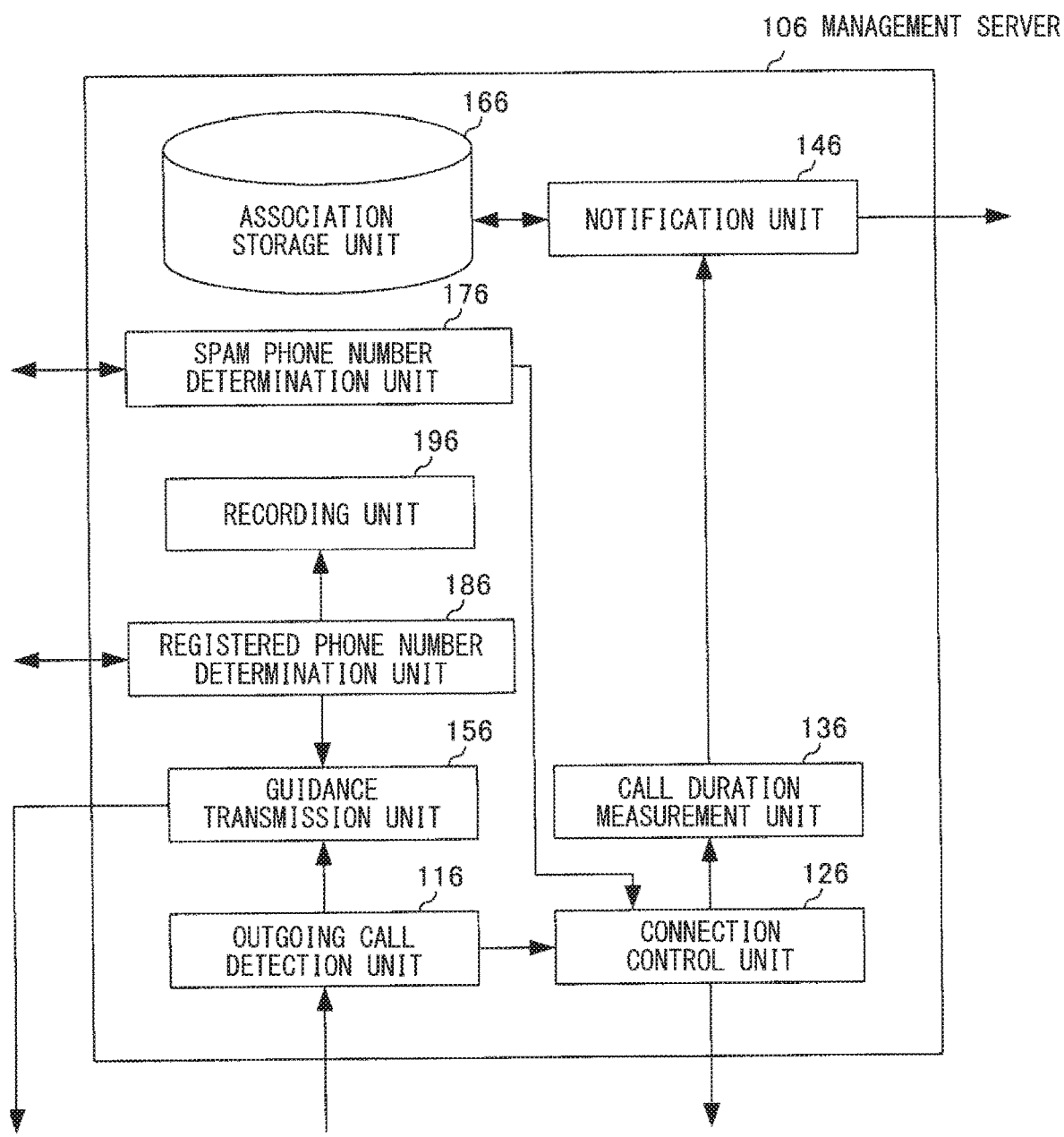
FIG. 32 is a view showing an example of an internal configuration of the management server shown in FIG. 31.

FIG. 32 is a view showing an example of an internal configuration of the management server 106 shown in FIG. 31. As shown in FIG. 32, the management server 106 shown in FIG. 31 includes an outgoing call detection unit 116, a connection control unit 126, a call duration measurement unit 136, a notification unit 146, a guidance transmission unit 156, an association storage unit 166, a spam phone number determination unit 176, a registered phone number determination unit 186, and a recording unit 196. Note that FIG. 32 shows an example of major components related to this embodiment among components of the management server 106 shown in FIG. 31.

The outgoing call detection unit 116 detects an outgoing call from the communication terminal 406-1 to the communication terminals 406-2 and 406-3 via the exchange 206. Further, the outgoing call detection unit 116 detects an outgoing call from the communication terminal 406-2 to the communication terminals 406-1 and 406-3 via the exchange 206. Furthermore, the outgoing call detection unit 116 detects an outgoing call from the communication terminal 406-3 to the communication terminals 406-1 and 406-2 via the exchange 206. In the following description, an example where the communication terminal 406-1 makes an outgoing call to the communication terminal 406-2 will be described.

When the outgoing call detection unit 116 detects an outgoing call, the spam phone number determination unit 176 determines whether the phone number of the communication terminal that is the call destination of the outgoing call, which is detected by the outgoing call detection unit 116, is the spam phone number registered in advance in the spam phone DB 706.

The registered phone number determination unit 186 determines whether the phone number of the communication terminal that is the destination of the outgoing call, which is detected by the outgoing call detection unit 116, is the phone number registered in advance in the cloud phone book 806.

The recording unit 196 records phone calls between the communication terminals 406-1 to 406-3. Note that the recording unit 196 may be provided outside the management server 106.

When the outgoing call detection unit 116 detects an outgoing call from the communication terminal 406-1, the guidance transmission unit 156 transmits the predetermined guidance to the communication terminal 406-1. This guidance is, for example, a message that alerts the owner of the originating communication terminal such as "please beware of phone fraud".

When the registered phone number determination unit 186 determines that the phone number of the communication terminal that is the destination of the outgoing call, which is detected by the outgoing call detection unit 116, is not the phone number registered in advance in the cloud phone book 806, the guidance transmission unit 156 transmits the predetermined guidance to the communication terminal 406-1. That is, when the phone number of the communication terminal that is the destination of the outgoing call, which is detected by the outgoing call detection unit 116, is not registered in advance in the cloud phone book 806, the guidance transmission unit 156 transmits the predetermined guidance to the communication terminal 406-1. This guidance may be any message as long as it alerts the owner of the originating communication terminal, for example, "calling to a stranger, please beware". Further, when the registered phone number determination unit 186 determines that the phone number of the communication terminal that is the destination of the outgoing call, which is detected by the outgoing call detection unit 116, is not the phone number registered in advance in the cloud phone book 806, the guidance transmission unit 156 may transmit the predetermined guidance to the communication terminal 406-2 after the connection control unit 126 causes the outgoing call to arrive at the communication terminal 406-2. This guidance is, for example, a message of an alert such as "there is a possibility to notify this call to a family member/friend of the caller" and "this phone call is being recorded". When the spam phone number determination unit 176 determines that the phone number of the communication terminal 406-1 that is the destination of the outgoing call, which is detected by the outgoing call detection unit 116, is the spam phone number registered in advance in the spam phone DB 706, the guidance transmission unit 156 may transmit the predetermined guidance to the communication terminal that has made the outgoing call. This guidance may be any message as long as it alerts the owner of the originating communication terminal, for example, "calling to a stranger, please beware". When the spam phone number determination unit 176 determines that the phone number of the communication terminal that is the destination of the outgoing call, which is detected by the outgoing call detection unit 116, is the spam phone number registered in advance in the spam phone DB 706, the guidance transmission unit 156 may transmit the predetermined guidance to the destination communication terminal 406-2 after the connection control unit 126 causes the outgoing call to arrive at the destination communication terminal 406-2. This guidance is, for example, a message of an alert such as "there is a possibility to notify this call to a family member/friend of the caller" and "this phone call is being recorded".

The connection control unit 126 causes an outgoing call from the communication terminal 406-1 detected by the outgoing call detection unit 116 to arrive at the communication terminal 406-2, which is a call destination, via the exchange 206. At this time, when the guidance transmission unit 156 transmits the guidance, the connection control unit 126 may cause the outgoing call to arrive at the communication terminal 406-2. When the spam phone number determination unit 176 determines that the phone number of the communication terminal that is the destination of the outgoing call, which is detected by the outgoing call detection unit 116, is the spam phone number registered in advance in the spam phone DB 706, the connection control unit 126 disconnects the outgoing call. Note that when the spam phone number determination unit 176 determines that the phone number of the communication terminal that is the destination of the outgoing call, which is detected by the outgoing call detection unit 116, is the spam phone number registered in advance in the spam phone DB 706, the connection control unit 126 may disconnect the phone call when the predetermined duration has elapsed since the phone call is started.

The call duration measurement unit 136 measures a duration of a phone call when the phone call is started between the communication terminal 406-1 as a call originator and the communication terminal 406-2 as a call destination.

When the spam phone number determination unit 176 determines that the phone number of the communication terminal that is the destination of the outgoing call, which is detected by the outgoing call detection unit 116, is the spam phone number registered in advance in the spam phone DB 706, the notification unit 146 transmits the predetermined notification to the communication terminal 406-3. Further, when the registered phone number determination unit 186 determines that the phone number of the communication terminal that is the destination of the outgoing call, which is detected by the outgoing call detection unit 116, is not the phone number registered in advance in the cloud phone book 806, the notification unit 146 transmits the predetermined notification to the communication terminal 406-3. At this time, the notification unit 146 transmits the notification to the communication terminal 406-3 stored in association with the communication terminal 406-1 in the association storage unit 166. This notification includes, for example, a content informing the communication terminal 406-3 that there has been an outgoing call on the spam phone, such as "there has been an outgoing call from your family's phone to a spam phone". The notification unit 146 transmits the predetermined notification to the communication terminal 406-3 when the duration measured by the call duration measurement unit 136 exceeds the preset duration before the phone call ends. At this time, when the duration measured by the call duration measurement unit 136 exceeds the preset duration before the phone call ends, the notification unit 146 transmits the notification to the communication terminal 406-3, which is stored in association with the communication terminal 406-1 in the association storage unit 166. When the notification unit 146 transmits the notification, it reads out a phone number of the communication terminal 406-3 from the association storage unit 166, and instructs the SMS server 506 to transmit a message using the SMS to the phone number. Further, when the mail server 301 as in the second embodiment is included in place of the SMS server 506, the notification unit 146 reads out an e-mail address of the communication terminal 406-3 from the association storage unit 166, and instructs the mail server 301 to transmit the e-mail to the e-mail address.

The association storage unit 165 stores in advance a phone number of the originating communication terminal in association with a phone number of the communication terminal to which the notification unit 145 transmits the notification. Alternatively, the association storage unit 166 may store in advance the phone number of the originating communication terminal in association with an e-mail address of the communication terminal to which the notification unit 146 transmits the notification. These associations may be those shown in FIGS. 25 and 22.

Figure 33:
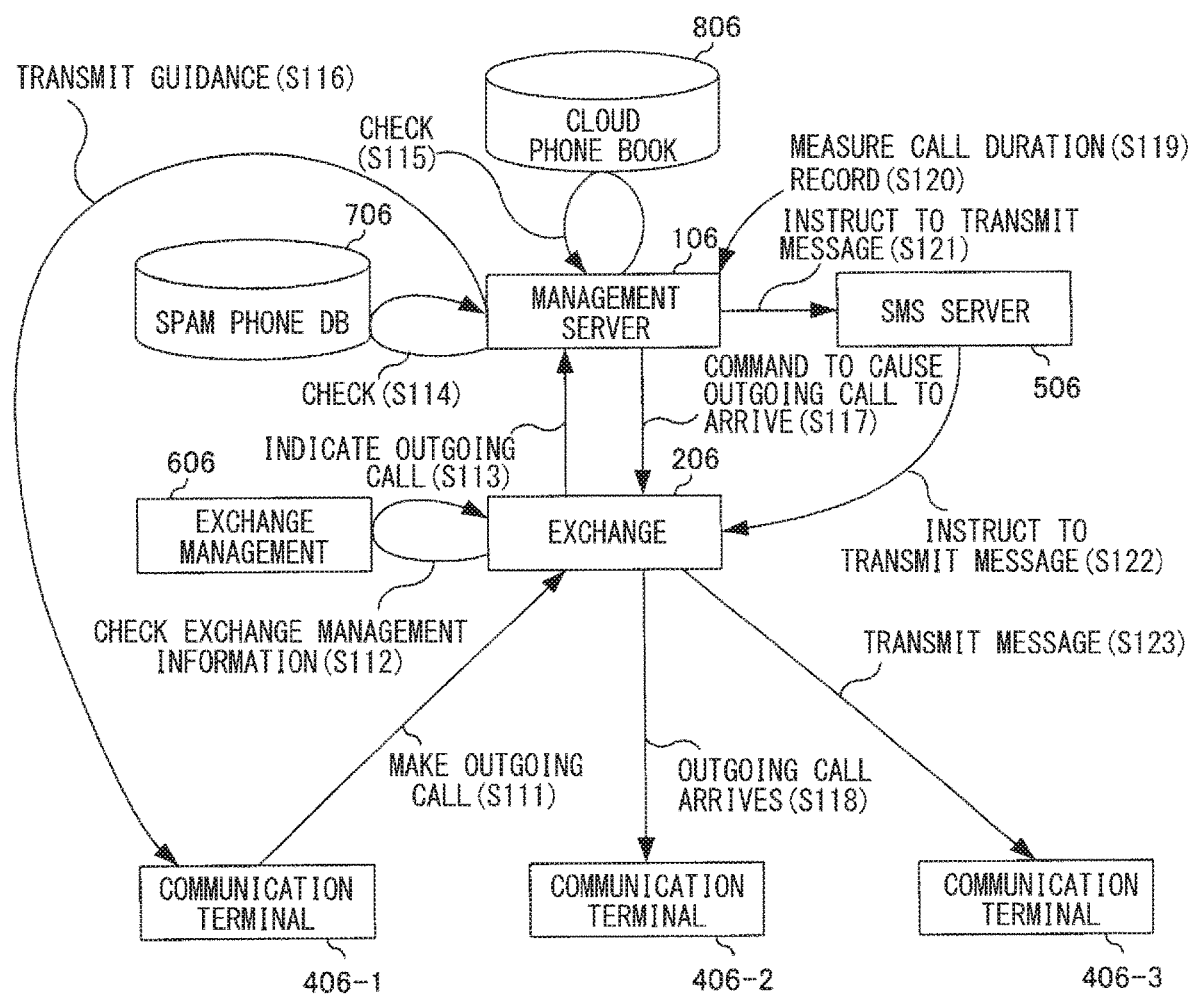
FIG. 33 is a view for explaining an example of a processing flow in a communication system shown in FIG. 31.

Hereinafter, the notification method in the communication system shown in FIG. 31 will be described. FIG. 33 is a view for explaining an example of a processing flow in the communication system shown in FIG. 31.

First, when the communication terminal 406-1 makes an outgoing call to the communication terminal 406-2 (Step S111), the exchange 206 checks exchange management information in the exchange management 606 (Step S112), and lets the management server 106 know that the outgoing call has been made (Step S113). In the management server 106, when the outgoing call detection unit 116 detects the outgoing call from the communication terminal 406-1 to the communication terminal 406-2, the spam phone number determination unit 176 determines whether the phone number of the communication terminal 406-2 is the spam phone number registered in advance in the spam phone DB 706 (Step S114). When the spam phone number determination unit 176 determines that the phone number of the communication terminal 406-2 is the spam phone number registered in advance in the spam phone DB 706, the connection control unit 126 disconnects the outgoing call. Note that when the spam phone number determination unit 176 determines that the phone number of the communication terminal 406-2 is the spam phone number registered in advance in the spam phone DB 706, the connection control unit 126 may disconnect the outgoing call when the predetermined duration has elapsed since the phone call is started.

On the other hand, when the spam phone number determination unit 176 determines that the phone number of the communication terminal 406-2 is not the spam phone number registered in advance in the spam phone DB 706, the registered phone number determination unit 186 determines whether the communication terminal 406-2 is the phone number registered in advance in the cloud phone book 806 (Step S115). When the registered phone number determination unit 186 determines that the phone number of the communication terminal 406-2 is not the phone number registered in advance in the cloud phone book 806, the guidance transmission unit 156 transmits the predetermined guidance to the communication terminal 406-1 (Step S116). At this point, the guidance transmission unit 156 may not transmit the predetermined guidance to the communication terminal 406-1.

Next, the connection control unit 126 transmits a command to the exchange 206 to cause the outgoing call detected by the outgoing call detection unit 116 to arrive at the communication terminal 406-2 (Step S117). Then, the exchange 206 causes the outgoing call from the communication terminal 406-1 to arrive at the communication terminal 406-2 (Step S118). At this time, the notification unit 146 may transmit the message using the SMS to the communication terminal 406-3 via the SMS server 506 and the exchange 206. Alternatively, when a mail server is included, the notification unit 146 may transmit an e-mail to the communication terminal 406-3 via the mail server. This message or e-mail includes a content informing the communication terminal 406-1 that there has been an incoming call from the spam phone.

After that, when a phone call is started between the communication terminal 406-1 and the communication terminal 406-2, the call duration measurement unit 136 measures a duration of the phone call (Step S119). The recording unit 196 records the phone call (Step S120). The phone call data recorded by the recording unit 196 is temporarily stored as a file.

When the duration measured by the call duration measurement unit 136 exceeds the preset duration before the phone call ends, the notification unit 146 instructs the SMS server 506 to transmit a message using the SMS (Step S121). Specifically, the notification unit 146 reads a phone number of the communication terminal 406-3 stored in association with the communication terminal 406-1 from the association storage unit 166, and instructs the SMS server 506 to transmit the message using the SMS to this phone number. Alternatively, when a mail server is included, the notification unit 146 reads an e-mail address of the communication terminal 406-3 stored in association with the communication terminal 406-1 from the association storage unit 166, and instructs the mail server to transmit an e-mail to this e-mail address. This message includes a content that lets an owner of the communication terminal 406-3 know that an owner of the communication terminal registered in advance may be talking for a long time or may be receiving a spam phone call like "your family is talking for a long time" or "your family may be receiving a spam phone call". Note that the time set in advance is preferably the time required for a call that does not commonly complete with only simple contents, such as three minutes. This time set in advance can be set and changed by an input operation from the outside. Further, this time may be changed according to the time of day at which the phone call is being made. In other words, associations between a plurality of times of day and a plurality of times (thresholds) may be created, and a threshold associated with the time of day at which a phone call is made may be used. For example, a threshold of "5 minutes" may be set in the time of day from 14:00 to 15:00, and a threshold of "3 minutes" may be set in the time of day other than 14:00 to 15:00. Thus, when the time at which the call is being made is 14:30, the threshold of "5 minutes" may be used.

When the notification unit 146 transmits the notification, it may notify the communication terminal 406-3 in real time of the originating phone number and the duration of the phone call measured by the call duration measurement unit 136.

The SMS server 506, which have been instructed to transmit the message, outputs, to the exchange 206, an instruction for transmitting the message using the SMS to the designated phone number (Step S122). Then, the exchange 206 transmits the message to the communication terminal 406-3 having the designated phone number (Step S123). The message to be transmitted may include link information indicating a storage location of a temporary storage folder of a recording file in which the recording unit 196 recorded the phone call.

After that, the communication terminal 406-3 outputs the transmitted message. This output may be output by a voice or may be displayed.

This also applies to the notification using an e-mail.

When the connection control unit 126 detects the end of the phone call, the recording unit 196 terminates the recording and stores the recorded call data as a file. This file can be reproduced from the communication terminal 406-3.

In this manner, when there is an outgoing call, and the phone number of the call destination of this outgoing call is the spam phone number registered in advance, the management server 106 disconnects the outgoing call, while when the phone number of the call destination of this outgoing call is neither the spam phone number nor the phone number registered in advance in the phone book, the management server 106 transmits the guidance to the call originator. Then, when the duration of the phone call between the originating communication terminal and the destination communication terminal exceeds the predetermined duration, the management server 106 transmits the notification to the communication terminal associated in advance with the destination communication terminal. The management server 106 records the phone call. This further prevents the processing load from increasing and can attempt to prevent the damage of the owner of the destination communication terminal from phone fraud from expanding.

Eighth Embodiment

Figure 34:
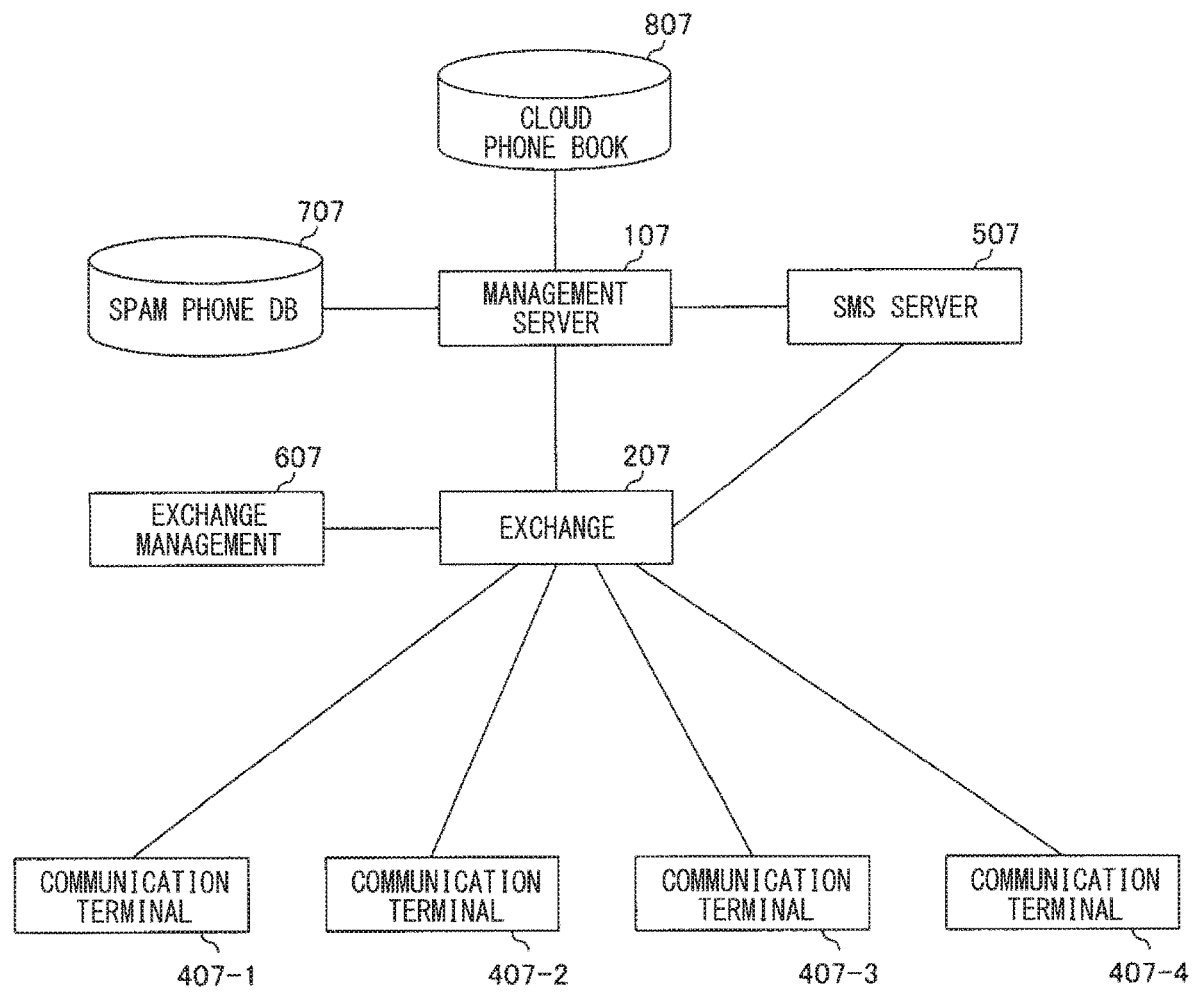
FIG. 34 is a view showing a management server according to an eighth embodiment of the present invention.

FIG. 34 is a view showing a management server according to an eighth embodiment of the present invention.

As shown in FIG. 34, a communication system in which a management server 107 according to this embodiment is provided includes the management server 107, an exchange 207, an SMS server 507, and communication terminals 407-1 to 407-4, an exchange management 607, a spam phone DB 707, and a cloud phone book 807. In this embodiment, the SMS server 507 is disposed. However, like the second embodiment, the mail server 301 may be disposed. Note that the SMS server 507 can cover all message tools such as e-mail and SNS (Social Networking Service).

This also applies to the above descriptions and the explanations, which will be given later. The management server 107 is connected to the exchange 207, the SMS server 507, the spam phone DB 707, and the cloud phone book 807. The exchange 207 is connected to the management server 107, the communication terminals 407-1 to 407-4, the SMS server 507, and the exchange management 607.

The communication terminals 407-1 to 407-4 are communication apparatuses capable of transmitting and receiving messages using phone, e-mail, and SMS. Further, the communication terminals 407-1 to 407-4 may be fixed apparatuses or movable portable apparatuses. FIG. 34 shows an example where there are four communication terminals. This configuration is employed for convenience of explanation, which will be given later. However, the number of the communication terminals is not limited to this number. In the following descriptions, the communication terminal 407-1 is a first communication terminal, the communication terminal 407-2 is a second communication terminal, the communication terminal 407-3 is a third communication terminal, the communication terminal 407-4 is a fourth communication terminal. A plurality of the fourth communication terminals may be used. Here, the fourth communication terminal is a communication terminal associated with the second communication terminal. However, the relationship between the second communication terminal and the fourth communication terminal is weaker than the relationship between the second communication terminal and the third communication terminal. For example, when the relationship between an owner of the second communication terminal and an owner of the third communication terminal is a family relationship or a relative relationship, the relationship between the owner of the second communication terminal and the owner of the fourth communication terminal may be an acquaintance relationship at, for example, a workplace.

The exchange 207 is a phone exchange which performs general circuit exchange. The SMS server 507 is a server apparatus used for general message transmission/reception using an SMS. When the SMS server 507 receives an instruction to transmit a message to the designated phone number from the management server 107, the SMS server 507 outputs, to the exchange 207, an instruction to transmit a message using the SMS to the designated phone number. When the mail server 301 as in the second embodiment is included in place of the SMS server 507, the mail server 301 transmits an e-mail to the designated e-mail address in response to an instruction to transmit a message to a designated e-mail address from the management server 107.

The exchange management 607 manages the exchange 207. The spam phone DB 707 stores pre-registered spam phone numbers. The spam phone number here is, for example, the phone number of the call originator who has made an outgoing call to a victim who has suffered from phone fraud or who has been about to be scammed. Such a phone number may be registered in advance in the spam phone DB 707 according to a report from this victim.

The cloud phone book 807 is a database present on a communication network to which the management server 107 is connected, and corresponds to a common phone book. That is, the cloud phone book is a list of phone numbers registered for each of the communication terminals 407-1 to 407-4. Commonly, this list is set by the owners of the communication terminals 407-1 to 407-4 through an input operation from the outside. This list includes phone numbers that the owners of the communication terminals 407-1 to 407-4 may usually contact such as family, relatives, friends, workplaces, schools, etc. That is, there is a high possibility that the phone number not registered in the cloud phone book 807 is the phone number of a person unknown to the owners of the communication terminals 407-1 to 407-4.

Figure 35:
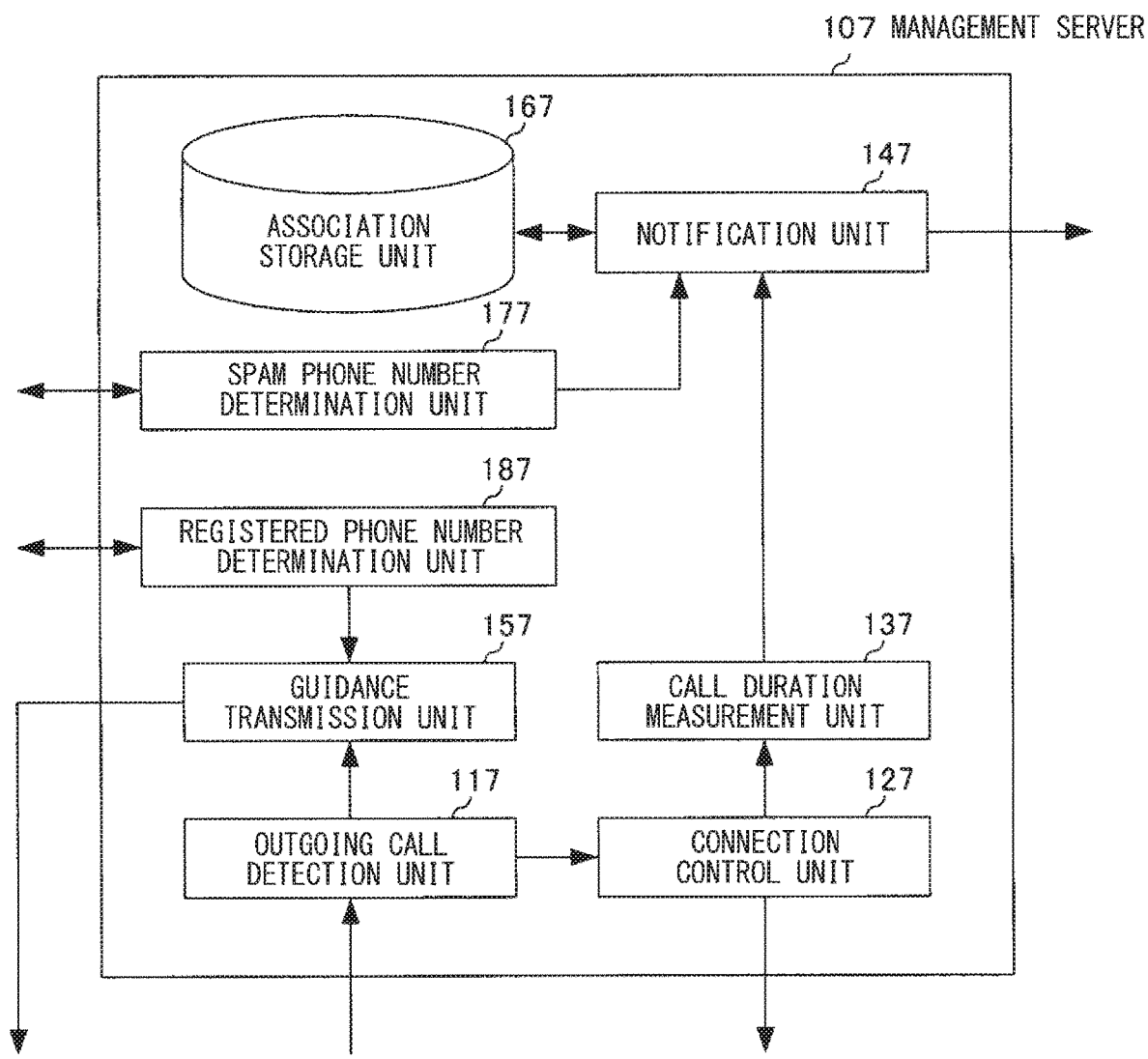
FIG. 35 is a view showing an example of an internal configuration of the management server shown in FIG. 34.

FIG. 35 is a view showing an example of an internal configuration of the management server 107 shown in FIG. 34. As shown in FIG. 35, the management server 107 shown in FIG. 34 includes an outgoing call detection unit 117, a connection control unit 127, a call duration measurement unit 137, a notification unit 147, a guidance transmission unit 157, an association storage unit 167, a spam phone number determination unit 177, and a registered phone number determination unit 187. Note that FIG. 35 shows an example of major components related to this embodiment among components of the management server 107 shown in FIG. 34.

The outgoing call detection unit 117 detects an outgoing call from the communication terminal 407-1 to the communication terminals 407-2 to 407-4 via the exchange 207. Further, the outgoing call detection unit 117 detects an outgoing call from the communication terminal 407-2 to the communication terminals 407-1, 407-3, and 407-4 via the exchange 207. Furthermore, the outgoing call detection unit 117 detects an outgoing call from the communication terminal 407-3 to the communication terminals 407-1, 407-2, and 407-4 via the exchange 207. Further, the outgoing call detection unit 117 detects an outgoing call from the communication terminal 407-4 to the communication terminals 407-1 to 407-3 via the exchange 207. In the following description, an example where the communication terminal 407-1 transmits to the communication terminal 407-2 will be described.

When the outgoing call detection unit 117 detects an incoming call, the spam phone number determination unit 177 determines whether the phone number of the communication terminal that is the originator of the outgoing call, which is detected by the outgoing call detection unit 117, is the spam phone number registered in advance in the spam phone DB 707. That is, when the outgoing call detection unit 117 detects the outgoing call from the communication terminal 407-1 to the communication terminal 407-2, the spam phone number determination unit 177 determines whether the phone number of the communication terminal 407-1 is registered in advance in the spam phone DB 707.

The registered phone number determination unit 187 determines whether the phone number of the communication terminal that is the originator of the outgoing call, which is detected by the outgoing call detection unit 117, is the phone number registered in advance in the cloud phone book 807. That is, when the outgoing call detection unit 117 detects the outgoing call from the communication terminal 407-1 to the communication terminal 407-2, the registered phone number determination unit 187 determines whether the phone number of the communication terminal 407-1 is registered in advance in the cloud phone book 807.

When the registered phone number determination unit 187 determines that the phone number of the communication terminal that has made the outgoing call, which is detected by the outgoing call detection unit 117, is not the phone number registered in advance in the cloud phone book 807, the guidance transmission unit 157 transmits the predetermined guidance to the communication terminal 407-1. That is, when the phone number of the communication terminal that has made the outgoing call, which is detected by the outgoing call detection unit 117, is not registered in advance in the cloud phone book 807, the guidance transmission unit 157 transmits the predetermined guidance to the communication terminal 407-1. This guidance is, for example, a message such as "there is a possibility to notify this call to a family/friend of the receiver" and "this phone call is being recorded". At this time, the guidance transmission unit 157 may transmit a signal for sounding an alarm to the communication terminal 407-1. Further, when the registered phone number determination unit 187 determines that the phone number of the communication terminal that has made the outgoing call, which is detected by the outgoing call detection unit 117, is not the phone number registered in advance in the cloud phone book 807, the guidance transmission unit 157 may transmit the predetermined guidance to the communication terminal 407-2 after the connection control unit 127 causes the outgoing call to arrive at the communication terminal 407-2. This guidance may be any message as long as it alerts the owner of the communication terminal 407-2, for example, "a phone call from an unknown person, please beware" and "this phone call is dangerous". Moreover, the guidance transmission unit 157 may transmit the guidance to the communication terminal 407-2 a plurality of times. For example, the guidance transmission unit 157 may transmit guidance "this phone call is dangerous" to the communication terminal 407-2 at the time of receiving the phone call and transmit guidance "watch out" to the communication terminal 407-2 a plurality of times or transmit a signal for sounding an alarm to the communication terminal 407-1 when a predetermined duration has elapsed during the phone call. The guidance transmission unit 157 may transmit guidance to the communication terminal 407-2 to make a future alert such as "this phone call was dangerous, this alert will be sent to you again" after the phone call ends. Note that such guidance may be transmitted from the guidance transmission unit 157 to the communication terminal 407-2 when the phone number of the communication terminal that has made the outgoing call, which is detected by the outgoing call detection unit 117, is neither the spam phone number registered in advance in the spam phone DB 707 nor the phone number registered in advance in the cloud phone book 807.

The guidance transmission unit 157 may transmit the predetermined guidance to the receiver communication terminal 407-2 when the registered phone number determination unit 187 determines that the phone number of the communication terminal that has made the outgoing call, which is detected by the outgoing call detection unit 117, is the phone number registered in advance in the cloud phone book 807. The guidance in this case may be guidance indicating that it is an incoming call from the registered phone number registered in advance in the cloud phone book 807, such as "the caller this time is your family, Mr./Ms. ∘∘". Further, the guidance transmission unit 157 may transmit the predetermined guidance to the caller communication terminal 407-1 while such guidance is being transmitted. The guidance in this case may be guidance indicating that the phone call partner is being called, such as "connecting to the customer, please wait for a while".

The guidance transmission unit 157 may transmit, to the communication terminals 407-1 and 407-2 guidance that gives a notice to disconnect the phone call (outgoing call), such as "as this phone call may be dangerous, this phone call is ended" when the connection control unit 127 disconnects the phone call (outgoing call). Further, the guidance transmission unit 157 may transmit a signal for sounding an alarm to the communication terminals 407-1 and 407-2 when the connection control unit 127 disconnects the phone call (outgoing call).

The connection control unit 127 causes an outgoing call from the communication terminal 407-1 detected by the outgoing call detection unit 117 to arrive at the communication terminal 407-2, which is a call destination, via the exchange 207. At this time, when the guidance transmission unit 157 transmits the guidance to the communication terminal 407-1, the connection control unit 127 may cause the outgoing call to arrive at the communication terminal 407-2. After the notification unit 147 notifies the communication terminals 407-3 and 407-4 of the phone number of the communication terminal 407-2, the connection control unit 127 connects the communication terminal, which has requested for the connection to the communication terminal 407-2 with the designated phone number of the communication terminal 407-2 between the communication terminals 407-3 and 407-4, to the communication terminal 407-1 and 407-2, which are communicating on the phone.

The call duration measurement unit 137 measures a duration of a phone call when the phone call is started between the communication terminal 407-1 as a call originator and the communication terminal 407-2 as a call destination. When the spam phone number determination unit 177 determines that the phone number of the communication terminal 407-1 that is the originator of the outgoing call, which is detected by the outgoing call detection unit 117, to the communication terminal 407-2 is the spam phone number registered in advance in the spam phone DB 707, the notification unit 147 transmits the predetermined notification to the communication terminal 407-3 and at least one communication terminal 407-4. Further, when the registered phone number determination unit 187 determines that the phone number of the communication terminal 407-1 that is the originator of the outgoing call, which is detected by the outgoing call detection unit 117, to the communication terminal 407-2 is not the phone number registered in advance in the cloud phone book 807, the notification unit 147 transmits the predetermined notification to the communication terminal 407-3 and at least one communication terminal 407-4. At this time, the notification unit 147 transmits the notification to the communication terminals 407-3 and 407-4 stored in association with the communication terminal 407-2 in the association storage unit 167. This notification includes, for example, a content informing the communication terminals 407-3 and 407-4 that there has been an outgoing call from the spam phone to the communication terminal 407-2, such as "there has been an outgoing call from a spam phone to your family's phone". The notification unit 147 transmits the predetermined notification to the communication terminal 407-3 and at least one communication terminal 407-4 when the duration measured by the call duration measurement unit 137 exceeds the preset duration before the phone call ends. At this time, when the duration measured by the call duration measurement unit 137 exceeds the preset duration before the phone call ends, the notification unit 147 transmits the notification to the communication terminal 407-3 and at least one communication terminal 407-4, which are stored in association with the communication terminal 407-2 in the association storage unit 167. When the notification unit 147 transmits the notification, it reads out a phone number of the communication terminal 407-3 and a phone number of at least one communication terminal 407-4 from the association storage unit 167, and instructs the SMS server 507 to transmit a message using the SMS to the phone number. Further, when the mail server 301 as in the second embodiment is included in place of the SMS server 507, the notification unit 147 reads out an e-mail address of the communication terminal 407-3 and at least one communication terminal 407-4 from the association storage unit 167, and instructs the mail server 301 to transmit the e-mail to the e-mail address. The notification unit 147 notifies the communication terminal 407-3 and at least one communication terminal 407-4 of the phone number of the communication terminal 407-2 when the duration measured by the call duration measurement unit 137 becomes longer than the predetermined duration since the phone call is started. This notification may be a notification for displaying a message of, for example, "there may have been an incoming call from a spam phone on Mr./Ms. ○○'s cellular phone", or "there has been an incoming call from 050-XXXX-XXXX on Mr./Ms. ○○'s cellular phone and the call lasted three minutes or longer. Please check Mr./Ms. ○○ immediately". At this time, the phone number of the communication terminal 407-2 may be displayed. The association storage unit 167 stores in advance a phone number of the destination communication terminal in association with a phone number of the communication terminal to which the notification unit 147 transmits the notification. In this embodiment, the communication terminal 407-2, the communication terminal 407-3, and at least one communication terminal 407-4 are associated with each other. Further, the association storage unit 167 may store in advance the phone number of the destination communication terminal in association with an e-mail address of the communication terminal to which the notification unit 147 transmits the notification.

Hereinafter, the notification method in the communication system shown in FIG. 34 will be described. Here, processing in which the notification unit 147 shown in FIG. 35 transmits the notification to a plurality of communication terminals will be described. The processing in the communication system other than the above processing shown in FIG. 34 is similar to that in the other embodiments.

Figure 36:
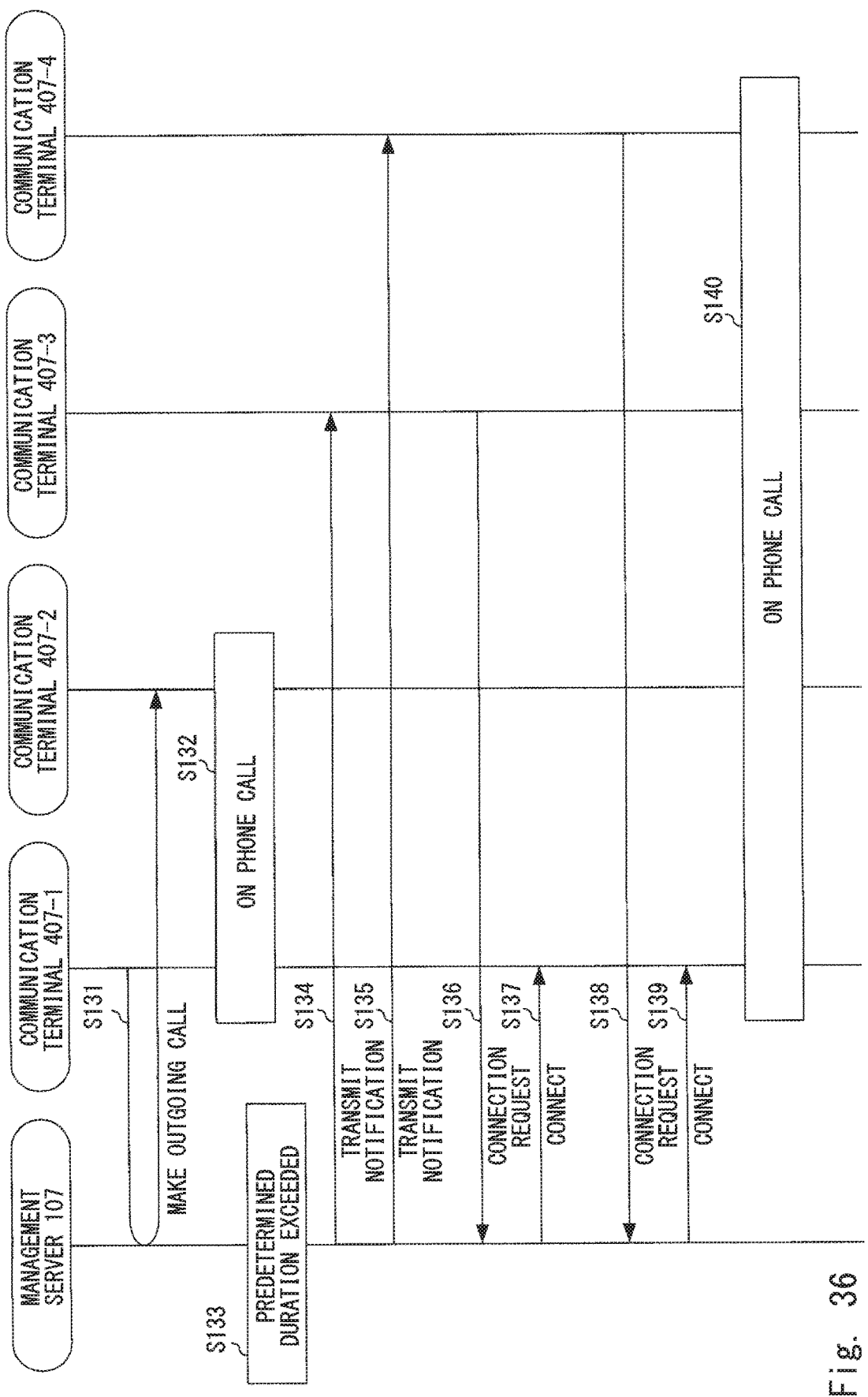
FIG. 36 is a sequence diagram for explaining an example of a processing flow in which a notification unit shown in FIG. 35 transmits notifications to a plurality of communication terminals in processing in a communication system shown in FIG. 34.

FIG. 36 is a sequence diagram for explaining an example of a processing flow in which the notification unit 147 shown in FIG. 35 transmits notifications to a plurality of communication terminals in the processing in the communication system shown in FIG. 34.

First, when there is an outgoing call from the communication terminal 407-1 to the communication terminal 407-2 (Step S131), the outgoing call detection unit 117 detects the outgoing call. Then, a phone call is made between the communication terminal 407-1 and the communication terminal 407-2 (Step S132). At this time, the call duration measurement unit 137 measures a duration of a phone call from when the phone call is started.

When the duration measured by the call duration measurement unit 137 exceeds the preset duration (Step S133), the notification unit 147 transmits the notification to the communication terminals 407-3 and 407-4 associated with the communication terminal 407-2 in the association storage unit 167 (Steps S134 and S135).

After that, when the communication terminal 407-3 requests for connection to the communication terminal 407-2 with the designated phone number of the communication terminal 407-2 (Step S136), the connection control unit 127 connects the communication terminal 407-3 to the communication terminals 407-1 and 407-2, which are communicating on the phone (Step S137). Further, when the communication terminal 407-4 requests for connection to the communication terminal 407-2 with the designated phone number of the communication terminal 407-2 (Step S138), the connection control unit 127 connects the communication terminal 407-4 to the communication terminals 407-1 and 407-2, which are communicating on the phone (Step S139). In this manner, a group phone call can be made possible between the communication terminals 407-1 to 407-4 (Step S140). Note that when the communication terminal requesting for the connection is made to connect to the communication terminal communicating on the phone, the connection control unit 127 may cause the communication terminal requesting for the connection to interrupt the phone call.

Modified Example

The management server may change the notification destination according to the time and date such as the time of day or the day of the week when the duration measured by the call duration measurement unit exceeds the predetermined duration before the phone call ends. For example, the management server may transmit the notification to Mr. A in the daytime and transmit the notification to Mr. B in the nighttime. The management server may transmit the notification to Mr. C on weekdays and transmit the notification to Mr. D on holidays.

FIG. 37 is a view showing an example of an association between an outgoing phone number and a notification destination phone number. As shown in FIG. 37, an outgoing phone number, a time of day, and a notification destination phone number are associated with each other. This association may be, for example, one stored in the association storage unit 166 of the management server 106 shown in FIG. 32. In this case, the association is registered in advance. When there is an outgoing call from the phone number registered as the outgoing phone number, the notification destination phone number associated with the time of day when the duration measured by the call duration measurement unit exceeds the predetermined duration before the phone call ends becomes the destination phone number to which the notification is transmitted. For example, as shown in FIG. 37, the outgoing phone number "03-○○○○-ΔΔΔΔ", the time of day "7: 00-19: 00", the notification destination phone number "03-ΔΔΔΔ-○○○○" are associated with each other. Using this association, when there is an outgoing call from the phone number of "03-□□□□-ΔΔΔΔ", the notification unit transmits a message using the SMS to the phone number of "03-□□□□-ΔΔΔΔ" if the time of day when the duration measured by the call duration measurement unit exceeds the predetermined duration before the phone call ends is between 7:00 and 19:00. Moreover, the incoming phone number "03-○○○○-ΔΔΔΔ", the time of day "19: 00 to 7: 00", and the notification destination phone number "03-xxxx-□□□□" are associated with each other. Using this association, when there is an outgoing call from the phone number of "03-□□□□-ΔΔΔΔ", the notification unit transmits a message using the SMS to the phone number of "03-xxxx-□□□□" if the time of day when the duration measured by the call duration measurement unit exceeds the predetermined duration before the phone call ends is between 19:00 and 7:00. Note that the number of notification destination phone numbers associated with the time of day may not be only one and instead may be plural.

The transmission of the message using the e-mail or SMS has been described as an example of means used for the notification. However, other communication tools may be used.

Further, a threshold for the call duration measurement unit to compare with the measured call duration may be set for each phone number registered in the cloud phone book. In this way, the notification unit can make flexible determination by reading the threshold associated with the call destination from the cloud phone book and using it for determining whether the notification is necessary.

Moreover, the content of the phone call may be converted into character information using a voice recognition function, and the character information may be transmitted to the originating terminal, receiving terminal, and a communication terminal associated with the originating terminal or receiving terminal at a predetermined timing. This predetermined timing is not defined in particular here, for example, at the end of a phone call and when a preset time has elapsed after the phone call ends. Further, the converted character information may be transmitted to an apparatus on the cloud side. The apparatus on the cloud side may store it in a state that it can be viewed by the communication terminal.

Furthermore, when the originating phone number is a special phone number (e.g., phone number starting from "0120"), the notification may not be transmitted.

A function that includes a content to inquire whether the phone number is to be registered in the cloud phone book in the message or e-mail for the notification and that can register this phone number in the cloud phone book may be provided. By using this function to register the phone number in the cloud phone book, it is possible to prevent the notification from being transmitted from the next outgoing call onward.

When the phone call is still being continued even after the notification is transmitted, a second notification may be transmitted after a predetermined duration has elapsed since the first notification.

A function of selecting the timing at which the guidance is transmitted to the call originator either before or after the phone call arrives at the call destination may be provided.

The message of the guidance to be transmitted may be changed according to the transmission destination. For example, a plurality of alert levels may be set up. A message corresponding to the highest alert level may be transmitted to the communication terminal registered in the spam phone DB, and a message corresponding to an intermediate alert level may be transmitted to the communication terminal not registered in both the spam phone DB and the cloud phone book. The content and level of this message may be set and changed by the user in the association storage unit.

Instead of the notification, a three-way phone call may be performed. That is, a three-way phone call between the originating communication terminal, the destination communication terminal, and the notification destination communication terminal may be performed. This may be achieved using a phone transfer function or the like. Alternatively, instead of a three-way phone call, a phone call may be transferred to a communication terminal different from the receiving communication terminal by merely using the phone transfer function, and a person who has been on the phone using the receiver communication terminal may continue the phone call.

Even when the phone transfer function is set in at least one of the originating communication terminal and the receiving communication terminal, the above-described transmission of the guidance or processing of measuring the time from when a phone call is started and processing of the notification may be performed when the communication terminal possessed by the owner using the system according to the present invention makes an outgoing call or receives an incoming call.

All phone numbers related to the phone call, such as the call originator, the call destination, the transfer destination, and the like are used to search for a phone number in the cloud phone book or spam phone DB.

When there is an incoming call to a landline phone, the notification may be transmitted to a cellular phone, a PC (Personal Computer), or the like.

When a specific voice can be recognized from voices of a phone call using a voiceprint authentication function, guidance including a predetermined message (e.g., "this phone call may be a fraud phone call, please beware") may be transmitted.

Examples of means for listening to recorded contents of a phone call are described below. There is means for transmitting an e-mail that displays a link to the notification destination communication terminal, and displaying a list of recorded files on the cloud when the link is selected. Another means is means for transmitting an e-mail to the notification destination communication terminal, and by means of "Click to dial application", automatically starting a phone call to a server that stores the recorded files when a link in the e-mail is selected. The e-mail to be transmitted to the notification destination communication terminal can also be addressed to the originating or destination communication terminal. Thus, the recorded contents can be listened to on the originating of destination communication terminal during the phone call or after the phone call ends.

Whether the notification is to be transmitted to a third party based on whether the phone number is registered in the cloud phone book or whether the phone number is registered in the spam phone DB can be changed from the outside, for example, based on a contract detail of the communication terminal.

Further, in the above-described examples, the predetermined notification is transmitted when the call duration exceeds the predetermined duration before the phone call ends. However, the notification may be transmitted at a predetermined timing between when the phone call is started and when the phone call ends. The notification may be transmitted, for example, at the time of making an outgoing call, at the time of receiving an incoming call, at the time of starting a phone call, at the time when a predetermined duration (e.g., 3 or 5 minutes) has elapsed since a phone call is started (several times), and at the time of ending a phone call. In this case, when the phone call is recorded, the recorded data may be transmitted together with the notification to the notification destination communication terminal. When the location information of the communication terminal that is communicating on the phone is acquired, the location information may be transmitted to the communication terminal of the notification destination together with the notification. Moreover, the management server, the communication terminal, or the like may hold the recorded data (e.g., the recorded data may be files separated based on a predetermined unit time) or the location information (the location information may be location information history in a predetermined period) and may transmit information for acquiring the recorded data and the location information to the notification destination communication terminal.

The notification unit may transmit the above-described notification when a phone number of a transfer source or a phone number of a transfer destination is registered in the spam phone DB or not registered in the cloud phone book, in addition to when the phone number of the call originator or the phone number of the call destination is registered in the spam phone DB or not registered in the cloud phone book.

Further, the management server may have a function of converting the voices of the phone call into characters, and may transmit the characterized text data to a third communication terminal. The management server may search preset keywords from the text data that has been converted into characters and performs processing (e.g., disconnection of a phone call, transmission of a notification to the third communication terminal, etc.) corresponding to the searched keyword. The preset keywords are, for example, those indicating an amount of money, or words used for so-called phone de fraud such as "money", "transfer", "bank", "lost", "settlement", "urgent", "attorney", "accident", and "police". The message used for the notification to the third communication terminal may be, for example, "Mr./Ms. ○○ was talking with someone not registered in the phone book for 5 minutes and 13 seconds. There were the following keywords: "money", "transfer", "immediately", and "bank". Please check Mr./Ms. ○○ immediately".

Moreover, the management server may include a function of learning the situations of phone calls based on phone call history of each communication terminal, and may transmit a notification, disconnect a phone call, and the like based on the learned content. For example, when the management server detects that the communication terminal usually takes about one minutes for a phone call has been on a phone call more than ten minutes with someone that the communication terminal has no history of a phone call, it determines that the level of urgency is high and may transmit the notification to the third communication terminal. In such a case, as described in the eighth embodiment, the management server may transmit the notification to a fourth communication terminal (family, etc.) and perform a group phone call between the plurality of communication terminals. The management server may extract a keyword such as "call a child" from the contents of the phone call and transmit information for the communication terminal to display information for causing the child to perform an appropriate operation based on the keyword.

Additionally, the management server may include a voice identification function and notify the third communication terminal of information (e.g., name, etc.) about a phone call partner that can be identified from voices of a phone call. The message used for transmitting the notification to the third communication terminal may be, for example, "Mr./Ms. ○○ is talking on the phone with a person who seems to be Mr./Ms. △△ for 10 minutes".

Furthermore, although the above-described phone call has been described as a voice phone call, it may be a television phone call (video phone call). In this case, the management server may transmit a moving or still image transmitted and received during the phone call to the third communication terminal after the phone call ends (or after a predetermined time has elapsed).

Moreover, when the management server transmits the notification to the third communication terminal and then receives the message from the third communication terminal, the management server may transmit the message to the communication terminal from which the third communication terminal has been searched. Note that the management server may transmit the message transmitted from the third communication terminal to another communication terminal associated with the communication terminal from which the third communication terminal has been searched.

Further, the management server may include a voice identification function, and may analyze an environmental sound from voices during a phone call using the voice identification function to estimate the location of the person on the phone. In this case, the management server notifies the third communication terminal of the estimated place (location). The management server may detect a dangerous sound (e.g., a scream, a screech, etc.) according to the frequency, the sound level, and the like of the sound using the sound identification function, and transmit information that can reproduce the detected sound on the third communication terminal to the third communication terminal.

A wearable device, a lighting device, a sound generating apparatus, a photo panel, or the like may be used as the third communication terminal. For example, when the third communication terminal is a wearable device, the third communication terminal may vibrate using a vibration function when the notification is transmitted from the management server. When the third communication terminal is a lighting device, light may be turned on or blink when the notification is transmitted from the management server. When the third communication terminal is a sound generation device, the third communication terminal may generate an alarm sound when the notification is transmitted from the management server. When the third communication terminal is a photo panel, an alert may be displayed on the screen of the photo panel when the notification is transmitted from the management server.

In addition, the management server may transmit the notification to the third communication terminal when it detects that the communication terminal accesses a Web site.

The management server may select the content of the notification and guidance in advance based on the relationship between the call originator/receiver and an owner of the third communication terminal. For example, the management server may refer to the call history saved by the management server based on a specific range (e.g., between families, between relatives, between acquaintances, etc.) and determine whether to transmit the call duration and location information and to set a message address and the like transmitted to something other than SMS. Additionally, the management server may create the content of the guidance (e.g., messages such as "very", "dangerous", "on the phone", and an alert can be combined) based on a specific range (e.g., between families, between relatives, or between acquaintances).

Although the embodiments of the present invention have been described above, a child (e.g., 12 years old or younger) can be assumed as a user using the present invention besides the elderly. For example, there may be a situation where a child contacts a suspicious person and is involved in a crime. In such a situation, the present invention is assumed to be used for the purpose of watching over the child, for example, when the child is talking on the phone for a predetermined duration (seconds) or longer (talking with someone other than his/her parent or family), a notification is transmitted to the parent, family etc., or the phone call is disconnected.

When the present invention is applied to a communication system, information can be provided to organizations that can promote security such as police, municipality, customer support, etc., and a system watched over by the surroundings can be constructed.

A plurality of embodiments and modified examples have been described above. These embodiments and modified examples may be combined.

The processing performed by each of the components provided in each of the above-described management servers 100 to 107 may be performed by a logic circuit that is created in accordance with the purpose. Further, a computer program (hereinafter referred to as a program) describing processing contents as procedures may be recorded on a recording medium readable by each of the management servers 100 to 107. Each of the management servers 100 to 107 may read this program recorded on the recording medium and execute it. The recording medium readable by each of the management servers 100 to 107 is, for example, a removable recording medium such as a floppy (registered trademark) disk, a magneto optical disk, a DVD (Digital Versatile Disc), a CD (Compact Disc), a Blu-ray (registered trademark) Disc, a memory such as a ROM (Read Only Memory) and a RAM (Random Access Memory) incorporated in the management servers 100 to 107, and a HDD (Hard Disc Drive). The program recorded on this recording medium is read by a CPU (Central Processing Unit) provided in each of the management servers 100 to 107, and the same processing as the one described above is performed under the control of the CPU. The CPU here operates as a computer that executes the program read from the recording medium on which the program is recorded.

The present invention has been described with reference to the embodiments. However, the present invention is not limited by the above-described embodiments. Various changes that can be understood by those skilled in the art within the scope of the invention can be made to the configurations and details of the present invention.

The present application is based upon and claims the benefit of priority from Japanese Patent Application No. 2016-97709, filed on May 16, 2016 and Japanese Patent Application No. 2016-164667 filed on Aug. 25, 2016, the entire contents of which are hereby incorporated by reference.

The whole or part of the embodiments disclosed above can be described as, but not limited to, the following supplementary notes.

(Supplementary note 1) A management server comprising:
an outgoing call detection unit configured to detect an outgoing call from a first communication terminal to a second communication terminal;
a connection control unit configured to cause the outgoing call detected by the outgoing call detection unit to arrive at the second communication terminal;
a call duration measurement unit configured to measure a time from when a phone call is started, which is a duration of the phone call, between the first communication terminal and the second communication terminal; and
a notification unit configured to transmit, when the duration measured by the call duration measurement unit exceeds a predetermined duration before the phone call ends, a predetermined notification to a third communication terminal.

(Supplementary note 2) The management server according to Supplementary note 1, wherein the notification unit transmits the notification by transmitting an e-mail to the third communication terminal.

(Supplementary note 3) The management server according to Supplementary note 1, wherein the notification unit transmits the notification by transmitting a message using an SMS (Short Message Service) to the third communication terminal.

(Supplementary note 4) The management server according to any one of Supplementary note 1 to 3, further comprising a recording unit configured to record the phone call.

(Supplementary note 5) The management server according to any one of Supplementary notes 1 to 4, wherein the notification unit transmits the notification to the third communication terminal according to date and time when the duration measured by the call duration measurement unit exceeds the predetermined duration before the phone call ends.

(Supplementary note 6) The management server according to any one of Supplementary notes 1 to 5, wherein the notification unit changes the predetermined duration according to time of day.

(Supplementary note 7) The management server according to any one of Supplementary notes 1 to 6, wherein the notification unit transmits the predetermined notification to the third communication terminal associated in advance with the second communication terminal.

(Supplementary note 8) The management server according to Supplementary note 7, wherein
when the duration measured by the call duration measurement unit exceeds the predetermined duration before the phone call ends, the notification unit notifies the third communication terminal and at least one fourth communication terminal of a phone number of the second communication terminal, and
when the connection control unit receives a request for connection to the second communication terminal with the designated phone number of the second communication terminal from at least one of the third communication terminal and the fourth communication terminal, it connects the communication terminal which has issued the request to the first communication terminal and the second communication terminal, which are communicating on the phone.

(Supplementary note 9) The management server according to Supplementary note 7 or 8, wherein the notification unit transmits location information indicating a location of the second communication terminal, which has been transmitted from the second communication terminal, to the third communication terminal.

(Supplementary note 10) The management server according to any one of Supplementary notes 1 to 9, further comprising a guidance transmission unit configured to transmit predetermined guidance to the first communication terminal when the outgoing call detection unit detects the outgoing call, wherein when the guidance transmission unit transmits the guidance, the connection control unit causes the outgoing to arrive at the second communication terminal.

(Supplementary note 11) The management server according to Supplementary note 10, further comprising a registered phone number determination unit configured to determine, when the outgoing call detection unit detects the outgoing call, whether a phone number of the first communication terminal that has made the detected outgoing call is a phone number registered in advance, wherein when the registered phone number determination unit determines that the phone number of the first communication terminal is not the registered phone number, the guidance transmission unit transmits the predetermined guidance to the first communication terminal.

(Supplementary note 12) The management server according to Supplementary note 11, wherein when the registered phone number determination unit determines that the phone number of the first communication terminal is not the registered phone number, the connection control unit causes the outgoing call to arrive at the second communication terminal, and then the guidance transmission unit transmits the predetermined guidance to the second communication terminal.

(Supplementary note 13) The management server according to any one of Supplementary notes 10 to 12, further comprising a spam phone number determination unit configured to determine, when the outgoing call detection unit detects the outgoing call, whether the phone number of the first communication terminal that has made the detected outgoing call is a spam phone number registered in advance, wherein when the spam phone number determination unit determines that the phone number of the first communication terminal is the spam phone number, the notification unit transmits the predetermined notification to the third communication terminal.

(Supplementary note 14) The management server according to Supplementary note 13, wherein when the spam phone number determination unit determines that the phone number of the first communication terminal is the spam phone number, the guidance transmission unit transmits the predetermined guidance to the first communication terminal.

(Supplementary note 15) The management server according to Supplementary note 13 or 14, wherein when the spam phone number determination unit determines that the phone number of the first communication terminal is the spam phone number, the connection control unit causes the outgoing call to arrive at the second communication terminal, and then the guidance transmission unit transmits the predetermined guidance to the second communication terminal.

(Supplementary note 16) The management server according to any one of Supplementary notes 1 to 12, further comprising a spam phone number determination unit configured to determine, when the outgoing call detection unit detects the outgoing call, whether the phone number of the first communication terminal that has made the detected outgoing call is a spam phone number registered in advance, wherein when the spam phone number determination unit determines that the phone number of the first communication terminal is the spam phone number, the connection control unit disconnects the outgoing call detected by the outgoing call detection unit.

(Supplementary note 17) The management server according to any one of Supplementary notes 1 to 6, wherein the notification unit transmits the predetermined notification to the third communication terminal associated in advance with the first communication terminal.

(Supplementary note 18) The management server according to Supplementary note 17, wherein when the duration measured by the call duration measurement unit exceeds the predetermined duration before the phone call ends, the notification unit notifies the third communication terminal and at least one fourth communication terminal of a phone number of the first communication terminal, and when the connection control unit receives a request for connection to the first communication terminal with the designated phone number of the first communication terminal from at least one of the third communication terminal and the fourth communication terminal, it connects the communication terminal which has issued the request to the first communication terminal and the second communication terminal, which are communicating on the phone.

(Supplementary note 19) The management server according to Supplementary note 17 or 18, wherein the notification unit transmits location information indicating a location of the second communication terminal, which has been transmitted from the first communication terminal, to the third communication terminal.

(Supplementary note 20) The management server according to any one of Supplementary notes 1 to 6 and 17 to 19, further comprising a guidance transmission unit configured to transmit predetermined guidance to the first communication terminal when the outgoing call detection unit detects the outgoing call, wherein when the guidance transmission unit transmits the guidance, the connection control unit causes the outgoing call to arrive at the second communication terminal.

(Supplementary note 21) The management server according to Supplementary note 20, further comprising a registered phone number determination unit configured to determine, when the outgoing call detection unit detects the outgoing call, whether a phone number of the second communication terminal is a phone number registered in advance, wherein when the registered phone number determination unit determines that the phone number of the second communication terminal is not the registered phone number, the guidance transmission unit transmits the predetermined guidance to the first communication terminal.

(Supplementary note 22) The management server according to Supplementary note 21, wherein when the registered phone number determination unit determines that the phone number of the second communication terminal is not the registered phone number, the connection control unit causes the outgoing call to arrive at the second communication terminal, and then the guidance transmission unit transmits the predetermined guidance to the second communication terminal.

(Supplementary note 23) The management server according to any one of Supplementary notes 20 to 22, further comprising a spam phone number determination unit configured to determine, when the outgoing call detection unit detects the outgoing call, whether the phone number of the second communication terminal is a spam phone number registered in advance, wherein when the spam phone number determination unit determines that the phone number of the second communication terminal is the spam phone number, the notification unit transmits the predetermined notification to the third communication terminal.

(Supplementary note 24) The management server according to Supplementary note 23, wherein when the spam phone number determination unit determines that the phone number of the second communication terminal is the spam phone number, the guidance transmission unit transmits the predetermined guidance to the first communication terminal.

(Supplementary note 25) The management server according to Supplementary note 23 or 24, wherein when the spam phone number determination unit determines that the phone number of the second communication terminal is the spam phone number, the connection control unit causes the outgoing call to arrive at the second communication terminal, and then the guidance transmission unit transmits the predetermined guidance to the second communication terminal.

(Supplementary note 26) The management server according to any one of Supplementary notes 1 to 6 and 17 to 22, further comprising a spam phone number determination unit configured to determine, when the outgoing call detection unit detects the outgoing call, whether the phone number of the second communication terminal is a spam phone number registered in advance, wherein when the spam phone number determination unit determines that the phone number of the second communication terminal is the spam phone number, the connection control unit disconnects the outgoing call detected by the outgoing call detection unit.

(Supplementary note 27) A communication system comprising:

a plurality of communication terminals; and a management server comprising:

an outgoing call detection unit configured to detect an outgoing call from a first communication terminal to a second communication terminal among the plurality of communication terminals;

a connection control unit configured to cause the outgoing call detected by the outgoing call detection unit to arrive at the second communication terminal;

a call duration measurement unit configured to measure a time from when a phone call is started, which is a duration of the phone call, between the first communication terminal and the second communication terminal; and a notification unit configured to transmit, when the duration measured by the call duration measurement unit exceeds a predetermined duration before the phone call ends, a predetermined notification to a third communication terminal.

(Supplementary note 28) The communication system according to Supplementary note 27, further comprising a guidance transmission unit configured to transmit predetermined guidance to the first communication terminal when the outgoing call detection unit detects the outgoing call, wherein when the guidance transmission unit transmits the guidance, the connection control unit causes the outgoing call to arrive at the second communication terminal.

(Supplementary note 29) A notification method comprising:

a process of detecting an outgoing call from a first communication terminal to a second communication terminal;

a process of causing the detected outgoing call to arrive at the second communication terminal;

a process of measuring a time from when a phone call is started, which is a duration of the phone call, between the first communication terminal and the second communication terminal; and a process of transmitting, when the measured duration exceeds a predetermined duration before the phone call ends, a predetermined notification to a third communication terminal.

(Supplementary note 30) The notification method according to Supplementary note 29, further comprising:

a process of transmitting predetermined guidance to the first communication terminal when the outgoing call is detected; and a process of causing the outgoing call to arrive at the second communication terminal after transmitting the guidance.

(Supplementary note 31) A program for causing a computer to execute:

a procedure of detecting an outgoing call from a first communication terminal to a second communication terminal;

a procedure of causing the detected outgoing call to arrive at the second communication terminal;

a procedure of measuring a time from when a phone call is started, which is a duration of the phone call, between the first communication terminal and the second communication terminal; and a procedure of transmitting, when the measured duration exceeds a predetermined duration before the phone call ends, a predetermined notification to a third communication terminal.

(Supplementary note 32) The program according to Supplementary note 31, further comprising:

a procedure of transmitting predetermined guidance to the first communication terminal when the outgoing call is detected; and a procedure of causing the outgoing call to arrive at the second communication terminal after transmitting the guidance.

What is claimed is:

1. A management server comprising:
   at least one processor configured to implement:
   an outgoing call detection unit configured to detect an outgoing call from a first communication terminal to a second communication terminal;
   a connection control unit configured to cause the outgoing call detected by the outgoing call detection unit to arrive at the second communication terminal;
   a call duration measurement unit configured to measure each time from when a phone call is started by the connection control unit, a duration of each phone call, between the first communication terminal and the second communication terminal; and
   a notification unit configured to transmit, when the duration measured by the call duration measurement unit exceeds a predetermined duration before the phone call ends, a predetermined notification to a third communication terminal.

2. The management server according to claim 1, wherein the notification unit is further configured to change the third communication terminal corresponding to a notification destination for performing the notification according to date and time when the duration measured by the call duration measurement unit exceeds the predetermined duration before the phone call ends.

3. The management server according to claim 1, wherein the notification unit is further configured to change the predetermined duration according to time of day.

4. The management server according to claim 1, wherein the notification unit is further configured to transmit the predetermined notification to the third communication terminal associated in advance with the second communication terminal.

5. The management server according to claim 4, wherein when the duration measured by the call duration measurement unit exceeds the predetermined duration before the phone call ends, the notification unit is further configured to notify the third communication terminal and at least one fourth communication terminal of a phone number of the second communication terminal, and
   when the connection control unit receives a request for connection to the second communication terminal with the designated phone number of the second communication terminal from at least one of the third communication terminal and the fourth communication terminal, the connection control unit is further configured to connect the communication terminal which has issued the request to the first communication terminal and the second communication terminal, which are communicating on the phone.

6. The management server according to claim 4, wherein the notification unit is further configured to transmit location information indicating a location of the second communication terminal, which has been transmitted from the second communication terminal, to the third communication terminal.

7. The management server according to claim 1, wherein the at least one processor is further configured to implement a guidance transmission unit configured to transmit predetermined guidance to the first communication terminal when the outgoing call detection unit detects the outgoing call, wherein when the guidance transmission unit transmits the guidance, the connection control unit is further configured to cause the outgoing to arrive at the second communication terminal.

8. The management server according to claim 7, wherein the at least one processor is further configured to implement a spam phone number determination unit configured to determine, when the outgoing call detection unit detects the outgoing call, whether the phone number of the first communication terminal that has made the detected outgoing call is a spam phone number registered in advance, wherein when the spam phone number determination unit determines that the phone number of the first communication terminal is the spam phone number, the notification unit is further configured to transmit the predetermined notification to the third communication terminal.

9. The management server according to claim 1, wherein the notification unit is further configured to transmit the predetermined notification to the third communication terminal associated in advance with the first communication terminal.

10. The management server according to claim 9, wherein
when the duration measured by the call duration measurement unit exceeds the predetermined duration before the phone call ends, the notification unit is further configured to notify the third communication terminal and at least one fourth communication terminal of a phone number of the first communication terminal, and
when the connection control unit receives a request for connection to the first communication terminal with the designated phone number of the first communication terminal from at least one of the third communication terminal and the fourth communication terminal, the connection control unit is further configured to connect the communication terminal which has issued the request to the first communication terminal and the second communication terminal, which are communicating on the phone.

11. The management server according to claim 9, wherein the notification unit is further configured to transmit location information indicating a location of the second communication terminal, which has been transmitted from the first communication terminal, to the third communication terminal.

12. The management server according to claim 1, wherein the at least one processor is further configured to implement a guidance transmission unit configured to transmit predetermined guidance to the first communication terminal when the outgoing call detection unit detects the outgoing call, wherein when the guidance transmission unit transmits the guidance, the connection control unit is further configured to cause the outgoing call to arrive at the second communication terminal.

13. The management server according to claim 12, wherein the at least one processor is further configured to implement a registered phone number determination unit configured to determine, when the outgoing call detection unit detects the outgoing call, whether a phone number of the second communication terminal is a phone number registered in advance, wherein when the registered phone number determination unit determines that the phone number of the second communication terminal is not the registered phone number, the guidance transmission unit is further configured to transmit the predetermined guidance to the first communication terminal.

14. The management server according to claim 13, wherein when the registered phone number determination unit determines that the phone number of the second communication terminal is not the registered phone number, the connection control unit is further configured to cause the outgoing call to arrive at the second communication terminal, and then the guidance transmission unit is further configured to transmit the predetermined guidance to the second communication terminal.

15. The management server according to claim 12, wherein the at least one processor is further configured to implement a spam phone number determination unit configured to determine, when the outgoing call detection unit detects the outgoing call, whether the phone number of the second communication terminal is a spam phone number registered in advance, wherein when the spam phone number determination unit determines that the phone number of the second communication terminal is the spam phone number, the notification unit is further configured to transmit the predetermined notification to the third communication terminal.

16. The management server according to claim 15, wherein when the spam phone number determination unit determines that the phone number of the second communication terminal is the spam phone number, the guidance transmission unit is further configured to transmit the predetermined guidance to the first communication terminal.

17. The management server according to claim 15, wherein when the spam phone number determination unit determines that the phone number of the second communication terminal is the spam phone number, the connection control unit is further configured to cause the outgoing call to arrive at the second communication terminal, and then the guidance transmission unit is further configured to transmit the predetermined guidance to the second communication terminal.

18. The management server according to claim 1, wherein the at least one processor is further configured to implement a spam phone number determination unit configured to determine, when the outgoing call detection unit detects the outgoing call, whether the phone number of the second communication terminal is a spam phone number registered in advance, wherein when the spam phone number determination unit is further configured to determine that the phone number of the second communication terminal is the spam phone number, the connection control unit is further configured to disconnect the outgoing call detected by the outgoing call detection unit.

19. A communication system comprising:
a plurality of communication terminals; and
a management server comprising:
at least one processor configured to implement:
an outgoing call detection unit configured to detect an outgoing call from a first communication terminal to a second communication terminal among the plurality of communication terminals;
a connection control unit configured to cause the outgoing call detected by the outgoing call detection unit to arrive at the second communication terminal;
a call duration measurement unit configured to measure each time from when a phone call is started by the connection control unit, a duration of each phone call, between the first communication terminal and the second communication terminal; and
a notification unit configured to transmit, when the duration measured by the call duration measurement unit exceeds a predetermined duration before the phone call ends, a predetermined notification to a third communication terminal.

20. A notification method comprising:
detecting an outgoing call from a first communication terminal to a second communication terminal;

causing the detected outgoing call to arrive at the second communication terminal;
measuring each time from when a phone call is started by the causing, a duration of each phone call, between the first communication terminal and the second communication terminal; and
transmitting, when the measured duration exceeds a predetermined duration before the phone call ends, a predetermined notification to a third communication terminal.

* * * * *